(12) United States Patent
Farmer et al.

(10) Patent No.: US 7,529,485 B2
(45) Date of Patent: May 5, 2009

(54) METHOD AND SYSTEM FOR SUPPORTING MULTIPLE SERVICES WITH A SUBSCRIBER OPTICAL INTERFACE LOCATED OUTSIDE A SUBSCRIBER'S PREMISES

(75) Inventors: James O. Farmer, Cumming, GA (US); Stephen A. Thomas, Marietta, GA (US)

(73) Assignee: Enablence USA FTTX Networks, Inc., Alpharetta, GA (US)

( * ) Notice: Subject to any disclaimer, the term of this patent is extended or adjusted under 35 U.S.C. 154(b) by 408 days.

(21) Appl. No.: 10/739,487

(22) Filed: Dec. 18, 2003

(65) Prior Publication Data

US 2004/0131357 A1    Jul. 8, 2004

Related U.S. Application Data

(63) Continuation-in-part of application No. 09/899,410, filed on Jul. 5, 2001, now Pat. No. 6,973,271.

(60) Provisional application No. 60/433,984, filed on Dec. 18, 2002.

(51) Int. Cl.
*H04B 10/00* (2006.01)

(52) U.S. Cl. .............. 398/72; 398/66; 398/71; 398/106; 398/113

(58) Field of Classification Search ............. 398/66–73, 398/106–114; 725/151
See application file for complete search history.

(56) References Cited

U.S. PATENT DOCUMENTS

| | | |
|---|---|---|
| 4,253,035 A | 2/1981 | Amitay |
| 4,295,005 A | 10/1981 | Daugherty et al. |
| 4,495,545 A | 1/1985 | Dufresne et al. |
| 4,500,990 A | 2/1985 | Akashi |
| 4,654,891 A | 3/1987 | Smith |
| 4,665,517 A | 5/1987 | Widmer |
| 4,733,398 A | 3/1988 | Shibagaki et al. |
| 4,763,317 A | 8/1988 | Lehman et al. |

(Continued)

FOREIGN PATENT DOCUMENTS

CA    2107922 A1    4/1995

(Continued)

OTHER PUBLICATIONS

Partial International Search Report dated Jan. 3, 2003 for PCT/US01/31032.

(Continued)

*Primary Examiner*—Agustin Bello
(74) *Attorney, Agent, or Firm*—King & Spalding LLP

(57) ABSTRACT

A system and method for tuning a broadcast receiver such as a television set with a subscriber optical interface (SOI) that can be located outside a subscriber's premises and can be adjacent to the subscriber's premises. For example, a subscriber optical interface can be mounted on a side of a home which converts optical data and optical video signals received from an optical waveguide to electrical signals. Because of the hardware contained in the subscriber optical interface, any video processing hardware that is present within the subscriber's premises for tuning video programs can be reduced or substantially eliminated without sacrificing a range of services available to a subscriber from a fiber-to-the-home optical network.

13 Claims, 26 Drawing Sheets

U.S. PATENT DOCUMENTS

| | | | |
|---|---|---|---|
| 4,805,979 A | 2/1989 | Bossard et al. | |
| 4,852,023 A | 7/1989 | Lee et al. | |
| 4,945,541 A | 7/1990 | Nakayama | |
| 4,956,863 A | 9/1990 | Goss | |
| 4,975,899 A | 12/1990 | Faulkner | |
| 5,105,336 A | 4/1992 | Jacoby et al. | |
| 5,132,992 A | 7/1992 | Yurt et al. | |
| 5,144,267 A | 9/1992 | West, Jr. | |
| 5,179,591 A | 1/1993 | Hardy et al. | |
| 5,189,725 A | 2/1993 | Bensel, III et al. | |
| 5,247,347 A | 9/1993 | Litteral et al. | |
| 5,249,194 A | 9/1993 | Sakanushi | |
| 5,253,250 A | 10/1993 | Schlafer et al. | |
| 5,253,275 A | 10/1993 | Yurt et al. | |
| 5,303,295 A | 4/1994 | West et al. | |
| 5,313,546 A | 5/1994 | Toffetti | |
| 5,325,223 A | 6/1994 | Bears | |
| 5,345,504 A | 9/1994 | West, Jr. | |
| 5,349,457 A | 9/1994 | Bears | |
| 5,365,585 A | 11/1994 | Puhl et al. | |
| 5,365,588 A | 11/1994 | Bianco et al. | |
| 5,378,174 A | 1/1995 | Brownlie et al. | |
| 5,402,315 A | 3/1995 | Reichle | |
| 5,412,498 A | 5/1995 | Arstein et al. | |
| 5,432,875 A | 7/1995 | Korkowski et al. | |
| 5,461,427 A * | 10/1995 | Duffield et al. | 348/555 |
| 5,469,507 A | 11/1995 | Canetti et al. | |
| 5,495,549 A | 2/1996 | Schneider et al. | |
| 5,509,099 A | 4/1996 | Hermsen et al. | |
| 5,510,921 A | 4/1996 | Takai et al. | |
| 5,528,455 A | 6/1996 | Miles | |
| 5,528,582 A | 6/1996 | Bodeep et al. | |
| 5,534,912 A | 7/1996 | Kostreski | |
| 5,541,917 A | 7/1996 | Farris | |
| 5,550,863 A | 8/1996 | Yurt et al. | |
| 5,557,317 A | 9/1996 | Nishio et al. | |
| 5,559,858 A | 9/1996 | Beveridge | |
| 5,566,099 A | 10/1996 | Shimada | |
| 5,572,347 A | 11/1996 | Burton et al. | |
| 5,572,348 A | 11/1996 | Carlson et al. | |
| 5,572,349 A | 11/1996 | Hale et al. | |
| 5,619,251 A * | 4/1997 | Kuroiwa et al. | 725/133 |
| 5,649,318 A * | 7/1997 | Lusignan | 725/70 |
| 5,666,487 A | 9/1997 | Goodman et al. | |
| 5,694,232 A | 12/1997 | Parsay et al. | |
| 5,701,186 A | 12/1997 | Huber | |
| 5,706,303 A | 1/1998 | Lawrence | |
| 5,715,020 A * | 2/1998 | Kuroiwa et al. | 348/734 |
| 5,731,546 A | 3/1998 | Miles et al. | |
| RE35,774 E | 4/1998 | Moura et al. | |
| 5,769,159 A | 6/1998 | Yun | |
| 5,778,017 A | 7/1998 | Sato et al. | |
| 5,790,523 A | 8/1998 | Ritchie, Jr. et al. | |
| 5,793,413 A | 8/1998 | Hylton et al. | |
| 5,793,506 A | 8/1998 | Schmid | |
| 5,799,088 A | 8/1998 | Raike | |
| 5,802,089 A | 9/1998 | Link | |
| 5,808,702 A * | 9/1998 | Yoshinobu et al. | 348/731 |
| 5,822,102 A | 10/1998 | Bodeep et al. | |
| 5,861,966 A | 1/1999 | Ortel | |
| 5,867,485 A | 2/1999 | Chambers et al. | |
| 5,875,430 A | 2/1999 | Koether | |
| 5,880,864 A | 3/1999 | Williams et al. | |
| 5,892,865 A | 4/1999 | Williams | |
| 5,936,660 A * | 8/1999 | Gurantz | 725/71 |
| 5,953,690 A | 9/1999 | Lemon et al. | |
| 5,969,836 A | 10/1999 | Foltzer | |
| 5,974,063 A | 10/1999 | Yoshida | |
| 6,002,692 A | 12/1999 | Wills | |
| 6,002,720 A | 12/1999 | Yurt et al. | |
| 6,041,056 A | 3/2000 | Bigham et al. | |
| 6,097,159 A | 8/2000 | Mogi et al. | |
| 6,097,515 A | 8/2000 | Pomp et al. | |
| 6,133,910 A * | 10/2000 | Stinebruner | 725/49 |
| 6,137,546 A * | 10/2000 | Shintani et al. | 348/731 |
| 6,144,702 A | 11/2000 | Yurt et al. | |
| 6,151,343 A | 11/2000 | Jurgensen | |
| 6,167,553 A | 12/2000 | Dent | |
| RE37,125 E | 4/2001 | Carlson et al. | |
| 6,215,939 B1 | 4/2001 | Cloud | |
| 6,229,701 B1 | 5/2001 | Kung et al. | |
| 6,295,148 B1 | 9/2001 | Atlas | |
| 6,300,562 B1 | 10/2001 | Daoud | |
| 6,330,155 B1 | 12/2001 | Remsburg | |
| 6,336,201 B1 | 1/2002 | Geile et al. | |
| 6,342,004 B1 | 1/2002 | Lattimore et al. | |
| 6,356,369 B1 | 3/2002 | Farhan | |
| 6,360,320 B1 | 3/2002 | Ishiguro et al. | |
| 6,369,861 B1 * | 4/2002 | Lownes | 348/731 |
| 6,385,366 B1 | 5/2002 | Lin | |
| 6,421,150 B2 | 7/2002 | Graves et al. | |
| 6,424,656 B1 | 7/2002 | Hoebeke | |
| 6,427,035 B1 | 7/2002 | Mahony | |
| 6,452,714 B1 | 9/2002 | Rollins | |
| 6,460,182 B1 * | 10/2002 | BuAbbud | 725/126 |
| 6,463,068 B1 | 10/2002 | Lin et al. | |
| 6,483,553 B1 * | 11/2002 | Jung | 348/731 |
| 6,483,635 B1 | 11/2002 | Wach | |
| 6,486,907 B1 | 11/2002 | Farber et al. | |
| 6,490,727 B1 | 12/2002 | Nazarathy et al. | |
| 6,493,335 B1 | 12/2002 | Darcie et al. | |
| 6,496,641 B1 | 12/2002 | Mahony | |
| 6,507,494 B1 | 1/2003 | Hutchison et al. | |
| 6,529,301 B1 | 3/2003 | Wang | |
| 6,546,014 B1 | 4/2003 | Kramer et al. | |
| 6,577,414 B1 | 6/2003 | Feldman et al. | |
| 6,611,522 B1 | 8/2003 | Zheng et al. | |
| 6,621,975 B2 | 9/2003 | Laporte et al. | |
| 6,622,308 B1 * | 9/2003 | Raiser | 725/151 |
| 6,654,565 B2 | 11/2003 | Kenny | |
| 6,674,967 B2 | 1/2004 | Skrobko et al. | |
| 6,680,948 B1 | 1/2004 | Majd et al. | |
| 6,682,010 B2 | 1/2004 | Pohl | |
| 6,687,376 B1 | 2/2004 | Yamaguchi | |
| 6,687,432 B2 | 2/2004 | Schemmann et al. | |
| 6,704,060 B2 * | 3/2004 | Levandowski | 348/725 |
| 6,707,024 B2 | 3/2004 | Miyamoto et al. | |
| 6,731,347 B1 * | 5/2004 | Takano et al. | 348/558 |
| 6,738,983 B1 | 5/2004 | Rao et al. | |
| 6,740,861 B2 | 5/2004 | Matsuda | |
| 6,771,614 B1 | 8/2004 | Jones, IV et al. | |
| 6,775,137 B2 | 8/2004 | Chu et al. | |
| 6,778,785 B2 | 8/2004 | Imajo | |
| 6,804,256 B2 | 10/2004 | Chang | |
| 6,804,354 B1 | 10/2004 | Driscoll | |
| 6,807,188 B1 | 10/2004 | Blahut et al. | |
| 6,814,328 B1 | 11/2004 | Li et al. | |
| 6,823,385 B2 | 11/2004 | McKinnon, III et al. | |
| 6,826,776 B1 * | 11/2004 | Takano et al. | 725/80 |
| 6,889,007 B1 | 5/2005 | Wang et al. | |
| 6,889,385 B1 * | 5/2005 | Rakib et al. | 725/119 |
| 6,912,075 B1 | 6/2005 | Ionov et al. | |
| 6,961,956 B2 * | 11/2005 | Bontempi | 725/151 |
| 6,970,127 B2 * | 11/2005 | Rakib | 341/173 |
| 6,973,271 B2 | 12/2005 | Farmer et al. | |
| 6,976,267 B1 * | 12/2005 | Takano et al. | 725/80 |
| 7,007,297 B1 * | 2/2006 | Woodward | 725/129 |
| 7,017,178 B1 * | 3/2006 | Hendricks et al. | 725/152 |
| 7,023,871 B2 | 4/2006 | Lind et al. | |
| 7,111,320 B1 * | 9/2006 | Novak | 725/139 |
| 7,190,901 B2 | 3/2007 | Farmer et al. | |
| 7,218,855 B2 | 5/2007 | Whittlesey et al. | |
| 7,222,358 B2 | 5/2007 | Levinson et al. | |
| 7,227,871 B2 | 6/2007 | Dworkin et al. | |

| | | |
|---|---|---|
| 7,242,694 B2 | 7/2007 | Beser |
| 2001/0002195 A1 | 5/2001 | Fellman et al. |
| 2001/0002196 A1 | 5/2001 | Fellman et al. |
| 2001/0002486 A1 | 5/2001 | Kocher et al. |
| 2001/0004362 A1 | 6/2001 | Kamiya |
| 2001/0030785 A1 | 10/2001 | Pangrac et al. |
| 2002/0006197 A1 | 1/2002 | Carroll et al. |
| 2002/0012138 A1 | 1/2002 | Graves et al. |
| 2002/0021465 A1 | 2/2002 | Moore, Jr. et al. |
| 2002/0027928 A1 | 3/2002 | Fang |
| 2002/0039218 A1 | 4/2002 | Farmer et al. |
| 2002/0063924 A1 | 5/2002 | Kimbrough et al. |
| 2002/0089725 A1 | 7/2002 | Farmer et al. |
| 2002/0105965 A1 | 8/2002 | Dravida et al. |
| 2002/0106178 A1 | 8/2002 | Bumgarner et al. |
| 2002/0116719 A1 | 8/2002 | Dapper et al. |
| 2002/0135843 A1 | 9/2002 | Gruia |
| 2002/0141159 A1 | 10/2002 | Bloemen |
| 2002/0164026 A1 | 11/2002 | Huima |
| 2002/0181925 A1 | 12/2002 | Hodge et al. |
| 2003/0007210 A1 | 1/2003 | Kenny |
| 2003/0007220 A1 | 1/2003 | Whittlesey et al. |
| 2003/0011849 A1 | 1/2003 | Farmer et al. |
| 2003/0016692 A1 | 1/2003 | Thomas et al. |
| 2003/0072059 A1 | 4/2003 | Thomas et al. |
| 2003/0086140 A1 | 5/2003 | Thomas et al. |
| 2003/0090302 A1 | 5/2003 | Skrobko et al. |
| 2003/0128983 A1 | 7/2003 | BuAbbud et al. |
| 2003/0154282 A1 | 8/2003 | Horvitz |
| 2003/0189587 A1 | 10/2003 | White et al. |
| 2003/0194241 A1 | 10/2003 | Farmer |
| 2003/0206564 A1 | 11/2003 | Mills et al. |
| 2003/0206634 A1 | 11/2003 | Rose |
| 2003/0223750 A1 | 12/2003 | Farmer et al. |
| 2004/0086277 A1 | 5/2004 | Kenny |
| 2004/0131357 A1 | 7/2004 | Farmer et al. |
| 2004/0141747 A1 | 7/2004 | Kenny et al. |
| 2004/0161217 A1 | 8/2004 | Hodge et al. |
| 2004/0199502 A1 | 10/2004 | Wong et al. |
| 2004/0221088 A1 | 11/2004 | Lisitsa et al. |
| 2004/0253003 A1 | 12/2004 | Farmer et al. |
| 2004/0264492 A1 | 12/2004 | Blahut |
| 2004/0267730 A1 | 12/2004 | Dumais et al. |
| 2005/0053350 A1 | 3/2005 | Hodge et al. |
| 2005/0074241 A1 | 4/2005 | Farmer et al. |
| 2005/0081244 A1 | 4/2005 | Barrett et al. |
| 2005/0123001 A1 | 6/2005 | Craven et al. |
| 2005/0125837 A1 | 6/2005 | Farmer et al. |
| 2005/0175035 A1 | 8/2005 | Neely et al. |
| 2006/0020975 A1 | 1/2006 | Kenny et al. |
| 2006/0039699 A1 | 2/2006 | Farmer et al. |
| 2006/0075428 A1 | 4/2006 | Farmer et al. |
| 2007/0076717 A1 | 4/2007 | Limb et al. |

FOREIGN PATENT DOCUMENTS

| | | |
|---|---|---|
| EP | 0713347 A2 | 5/1996 |
| EP | 0720322 A2 | 7/1996 |
| EP | 0 566 662 | 11/1999 |
| EP | 0955739 A2 | 11/1999 |
| EP | 0 933 892 | 10/2003 |
| JP | 7-20327 | 1/1995 |
| JP | 10-20123 | 1/1998 |
| JP | 11-305052 | 11/1999 |
| JP | 4-504433 | 3/2002 |
| ME | 180038 | 11/1995 |
| TW | 72821 | 8/1995 |
| WO | WO 01/27940 A2 | 4/2001 |
| WO | WO 02/30019 A3 | 4/2002 |
| WO | WO 02/30020 A2 | 4/2002 |
| WO | WO 02/060123 A2 | 8/2002 |
| WO | WO 03/001737 A3 | 1/2003 |
| WO | WO 03/005611 A2 | 1/2003 |
| WO | WO 03/005612 A1 | 1/2003 |
| WO | WO 03/019243 A2 | 3/2003 |
| WO | WO 03/021820 A2 | 3/2003 |
| WO | WO 03/023980 A2 | 3/2003 |
| WO | WO 03/079567 A1 | 9/2003 |
| WO | WO 03/090396 A2 | 10/2003 |
| WO | WO 2006/014433 A2 | 2/2006 |
| WO | WO 2006/020538 A2 | 2/2006 |
| WO | WO 2006/041784 A2 | 4/2006 |

OTHER PUBLICATIONS

International Search Report dated Apr. 22, 2003 for PCT/US01/50361.

L. Zhang et al., "Label-switching architecture for IP traffic over WDM networks", IEE Proc.-Commun., vol. 147, No. 5, Oct. 2000, pp. 269-275.

J. Masip-Torné, et al., "Providing Differentiated Service Categories in Optical Packet Networks", Proceedings of the International Teletraffic Congress. ITC-16. Teletraffic Engineering in a Competitive World. Edinburgh, UK, Jun. 7-11, 1999, Teletraffic Science and Engineering, Amsterdam: Elsevier, NL, vol. 3B, Jun. 7, 1999, pp. 1115-1126.

J. Bannister et al., "How Many Wavelengths Do We Really Need? A Study of the Performance Limits of Packet Over WaveLengths", Optical Networks Magazin, SPIE, Bellingham, WA, vol. 1, No. 2, Apr. 2000, pp. 17-28.

O. W.W. Yang, et al. , "All-Optical WDM/TDM Star-Bus Network Using Optical Amplifiers", Journal of Optical Communications, Fachverlage Schiele & Schon, Berlin, DE, vol. 16, No. 6, Dec. 1, 1995, pp. 216-226.

Walter Ciciora et al., "Modern Cable Television Technology: Video, Voice, and Data Communications", © 1999 by Morgan Kaufman Publishers, Inc., pp. 167-176.

International Search Report dated Apr. 21, 2003 for PCT/US02/28734.

Written Opinion dated May 6, 2003 for PCT/US01/21298.

Global Access™, Universal Services Gateway, USG100, ARRIS, pp. 1-2, Oct. 18, 2002.

Global Access™, Universal Access Switch, UAS4024, ARRIS, pp. 1-2, Aug. 28, 2002.

International Search Report dated Dec. 4, 2002 for PCT/US02/27398.

International Search Report dated Dec. 17, 2002 for PCT/US02/15861.

"Trading Update and Operational Review Presentation" Marconi, Sep. 4, 2001, pp. 1-35.

"Cable Market" 2 pgs, Marconi Corporation, PLC, 2000 at www.Marconi.com.

"Communications" 2 pgs, Marconi Corporation, PLC, 2000 at www.Marconi.com.

"Dalton Utilities" 9 pgs, Marconi Corporation, PLC, 2002 at www.Marconi.com.

"Deep Fiber Solutions" 3 pgs, Marconi Corporation, PLC, 2000 at www.Marconi.com.

"Deep Fiber HFC Features and Benefits" 1 pg, Marconi Corporation, PLC, 2002 at www.Marconi.com.

"Deep Fiber HFC Network Diagram" 1 pg, Marconi Corporation, PLC, 2002 at www.Marconi.com.

"Deep Fiber HFC Product Overview: New FITL Configuration" 2 pgs, Marconi Corporation, PLC, 2002 at www.Marconi.com.

"Deep Fiber HFC Technical Specifications" 2 pgs, Marconi Corporation, PLC, 2002 at www.Marconi.com.

"Deep Fiber HFC—New FITL Configuration" 1 pg, Marconi Corporation, PLC, 2002 at www.Marconi.com.

"En-Touch" at 5 pgs, Marconi Corporation, PLC, 2002 www.Marconi.com.

"Fiber to the Home" International Engineering Consortium (no date) pp. 1-10, available at www.iec.com.

"Deep Fiber HFC" Marconi Corporation PLC 2000, pp. 1-2.

"Integrated Voice, Video and Data Services Over a Single Fiber: A Compelling Opportunity for Cable Operators" Marconi Corporation PLC, May 2000, 6 pgs.

"Deep Fiber Solutions: Advanced Broadband Services" Marconi Corporation PLC, May 2000, 5 pgs.
"Deep Fiber HFC: A Next-Generation Integrated Access Solution Offering Significant Improvement Over Traditional HFC Architectures" Marconi Corporation PLC, May 2000, 8 pgs.
"A Gold Mine of Opportunities in the Face of Increasing Competition: Choices for Utilities Entering the Communications Marketplace" Marconi Corporation PLC, May 2000, 6 pgs.
"Fiber Optics on New Development MDUs: A Research Summary," Marconi Corporation PLC, May 2000, 5 pgs.
"Thermal Management Challenges: Small ONU Enclosures," Marconi Corporation PLC, May 2000, 9 pgs.
"Passive Optical Networks—Is There Light at the End of the Access Tunnel?" CIBC World Markets Inc., Jan. 11, 2001, pp. 1-66.
"36.2.4 8B/10B transmission code", IEEE 2000, pp. 966-969.
G. Khoe et al., "Coherent Multicarrier Technology for Implementation in the Customer Access," IEEE, May/Jun. 1993, pp. 695-713.
L. Linnell, " A Wide-Band Local Access System Using Emerging-Technology Components," IEEE, Jul. 1986, pp. 612-618.
"Digital Broadband Delivery System: Out of Band Transport—Mode B," Society of Cable Telecommunications Engineers, Inc., Aug. 10, 1998, 76 pgs.
"Digital Broadband Delivery System: Out of Band Transport—Mode A," Society of Cable Telecommunications Engineers, Inc., Aug. 26, 1998, 49 pgs.
B. Gaglianello & P. Thompson, "An Efficient MAC Layer Protocol for EPON," IEEE 802.3 EFM Nov. 2001, 9 pgs.
"Policing and Shaping Overview" *Quality of Service Solutions Configuration Guide*, Cisco Systems, Inc. (No Date).
"Cisco IOS™ Software Quality of Service Solutions," Cisco Systems, Inc. 1998, 28 pgs.
International Search Report for PCT/US01/21298, 2 pgs , mailed Jun. 17, 2002.
International Search Report for PCT/US02/03056, 1 pg, mailed Jun. 12, 2002.
"Ethernet—Accelerating the Standard for Speed," 7 pgs, Gigabit Ethernet Alliance, Nov. 2000 at www.gigabit-ethernet.org.
"eLuminant—Asynchronous Transfer Mode (ATM) Passive Optical Networks (PONS) Tutorial" 28 pgs, the International Engineering Consortium, 2000 at www.iec.org.
Bourne, John et al., "Heathrow—Experience and Evolution" IEEE, 1990, 1091-1095.
Miki, Tetsuya et al., "A Design Concept on Fiber-Optic Wavelength-Division-Multiplexing Subscriber Loop System" WTG—Fachber, 1980, pp. 41-45.
Yamaguchi, K. et al., "A Broadband Access Network Based on Optical Signal Processing: The Photonic Highway" IEEE, 1990, pp. 1030-1037.
International Search Report of Jul. 7, 2003 for PCT/US01/51350.
Angelopoulos, J.D. et al., "A Transport Mac Method for Bandwidth Sharing and CDV Control at the ATM Layer of Passive Optical Networks" Journal of Lightwave Technology, IEEE, 1996, pp. 2625-2634.
International Search Report of Jul. 2, 2003 for PCT/US03/07814.
International Search Report of Oct. 3, 2003 for PCT/US03/12231.
Ciciora, Walter S. et al., "Modern Cable Television Technology: Video, Voice, and Data Communications", ©1999, pp. 162-214, Chapter 4, Morgan Kaufmann Publishers, Inc., San Francisco, California.
Glaesemann, G. Scott et al., "The Mechanical Reliability of Corning® Optical Fiber in Bending White Paper", Sep. 2002, pp. 1-4.
Corning® SMF-28™ Optical Fiber Product Information, "Corning ® Single-Mode Optical Fiber", Apr. 2002, pp. 1-4.
Companie Deutsch, Components for Fiber Optics, "Triplexers—WDM:FSAN—TPM Series", pp. 1-6.
CEDaily Direct News, "Today's Report", Mar. 19, 2001, pp. 1-5.
Lucent Technologies, "Lucent Technologies Introduces Single-Fiber Network Access Devices for Voice, Video, and Data Services to the Home or Curb", Jun. 6, 2000, pp. 1-2.
Lucent Technologies, "Agere Systems Introduces Single-Fiber Network Access Devices for Voice, Video and Data Services to the Home or Curb", Mar. 19, 2001, pp. 1-3.
Optical Networks Daily, a Publication of Optical Keyhole, Aug. 26, 2003, pp. 1-13.
McDevitt et al., Switched vs Broadcast Video for Fiber-to-the Home Systems, Alcatel Network Systems, 1990, IEEE, CH2829-0/90/0000-1109, pp. 1109-1119.
Mangun et al., Fiber to the Home Experience in Southern Bell, BellSouth Services and Northern Telecom, 1988, IEEE, CH2536-1/88/0000-0208, pp. 208-212.
Han et al., Burst-Mode Penalty of AC-Coupled Optical Receivers Optimized for 8B/10B Line Code, 2004, IEEE.
Coppinger et al., Nonlinear Raman Cross-Talk in a Video Overlay Passive Optical Network, 2003, Tuesday Afternoon, OFC 2003, vol. 1, pp. 285-286.
Piehler et al., Nonlinear Raman Crosstalk in a 125-Mb/s CWDM Overlay on a 1310-nm Video Access Network, 2003, Optical Society of America.
Wong et al., 50-dB Nonlinear Crosstalk Suppression in a WDM Analog Fiber System by Complementary Modulation and Balanced Detection, 2003, IEEE, pp. 500-505.
Perkins, The Art of Overlaying Video Services on a BPON, 2004, Bechtel Corporation, pp. 1-9.
Title: Spectral Grids for WDM Applications: CWDM Wavelength Grid, Publ: *International Telecommunications Union*, pp. i-iii and 1-4, Date: Dec. 1, 2003.
Title: PCT International Search Report—PCT/US01/50361, pp. 1-3, Date: Apr. 22, 2003.
Title: PCT International Search Report—PCT/US03/07814, pp. 1-2, Date: Jul. 2, 2003.
Title: PCT International Search Report—PCT/US01/51350, pp. 1-4, Date: Jul. 7, 2003.
Title: PCT International Search Report—PCT/US05/23847, pp. 1, Date: Apr. 18, 2006.
Title: PCT International Search Report—PCT/US05/28020, pp. 1, Date: Nov. 8, 2006.
Title: PCT International Search Report—PCT/US05/46419, pp. 1, Date: Feb. 14, 2007.
Title: PCT International Search Report—PCT/US006/11159, pp. 1, Date: Feb. 21, 2007.
Title: PCT Internationa Search Report—PCT/US03/12231, pp. 1, Date: Oct. 3, 2003.
Title: PCT International Search Report—PCT/US05/35512, pp. 1, Date: Oct. 25, 2006.
Author: Coppinger et al., Title: Nonlinear Raman Cross-Talk in a Video Overlay Passive Optical Network, Publ: *OFC 2003* vol./Iss: 1, pp. 285-286, Date: Jan. 1, 2003.
Author: Effenberger, Title: G.983. Video Return Path, Publ: *International Telecommunications Union*, pp. 1-18, Date Oct. 1, 2004.
Author: Fludger et al., Title: Pump to Signal RIN Transfer in Raman Fiber Amplifiers, Publ: *Journal of Lightwave Technology*, vol./Iss: 19 (8), pp. 1140-1148, Date: Aug. 1, 2001.
Author: Tian et al., Title: Raman Crosstalk in Fiber-Optic Hybrid CATV Systems with Wide Channel Separations, Publ: *IEEE Photonics Technology Letters*, vol./Iss: 16 (1), pp. 344-346, Date: Jan. 1, 2004.

* cited by examiner

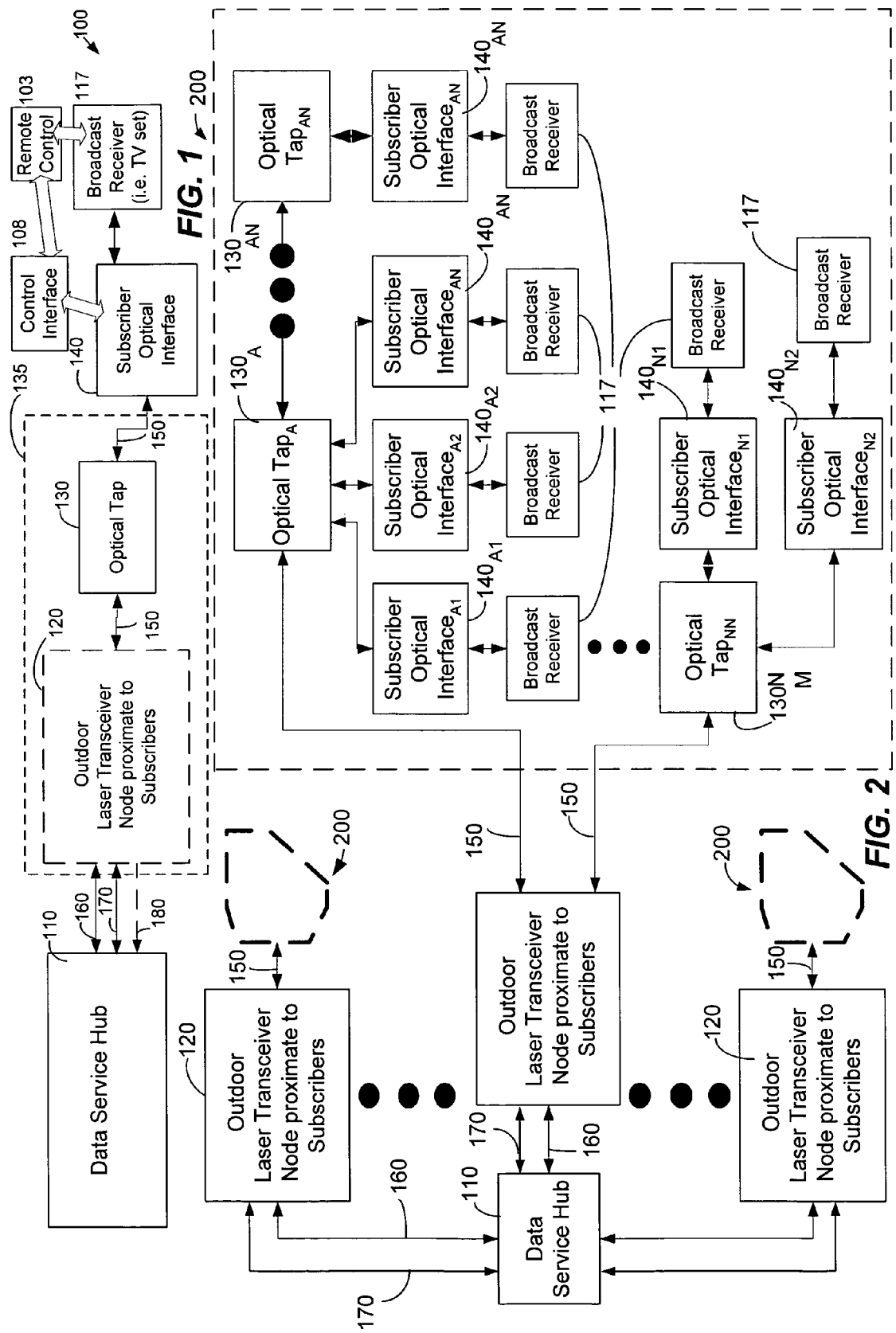

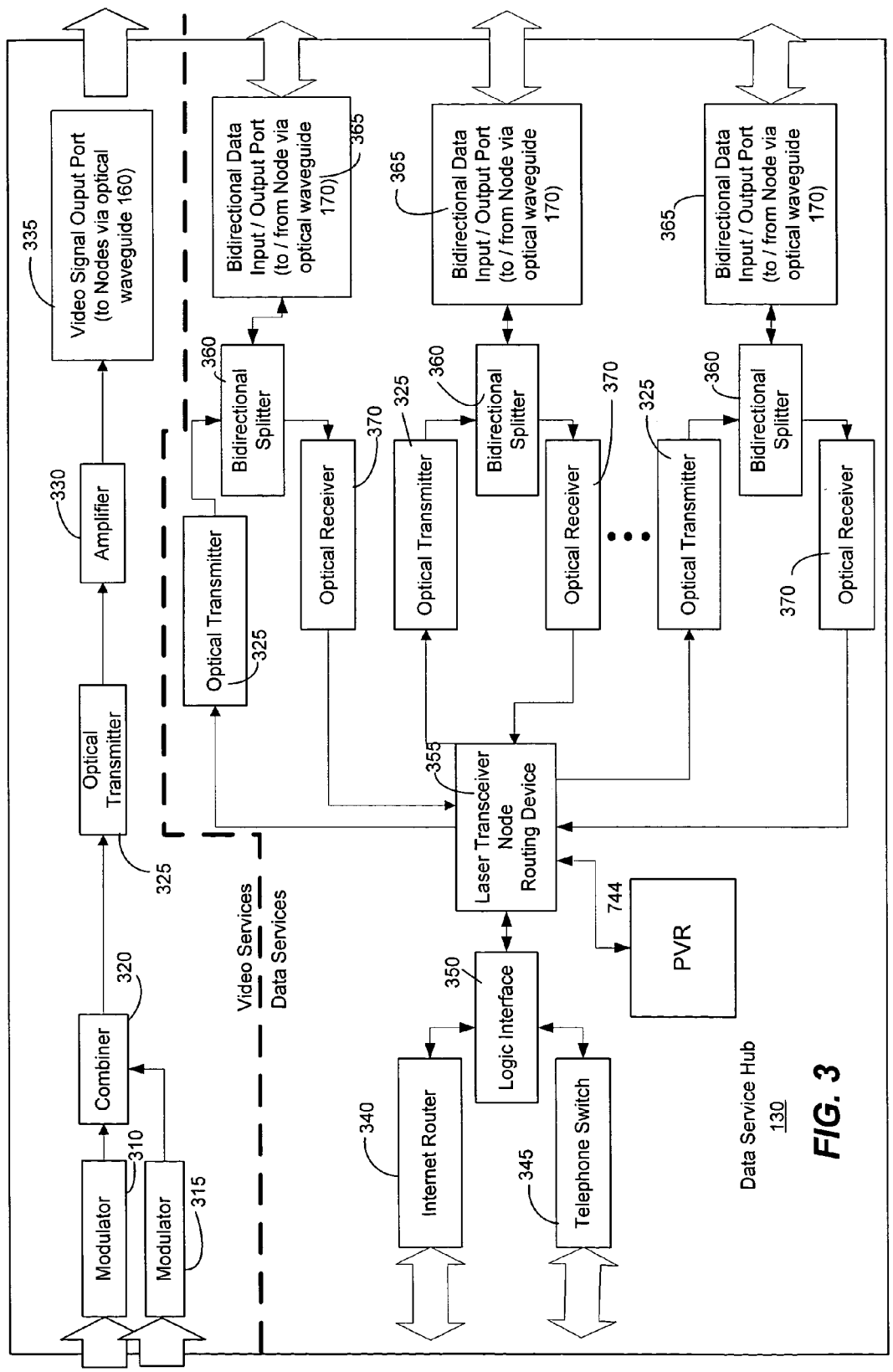

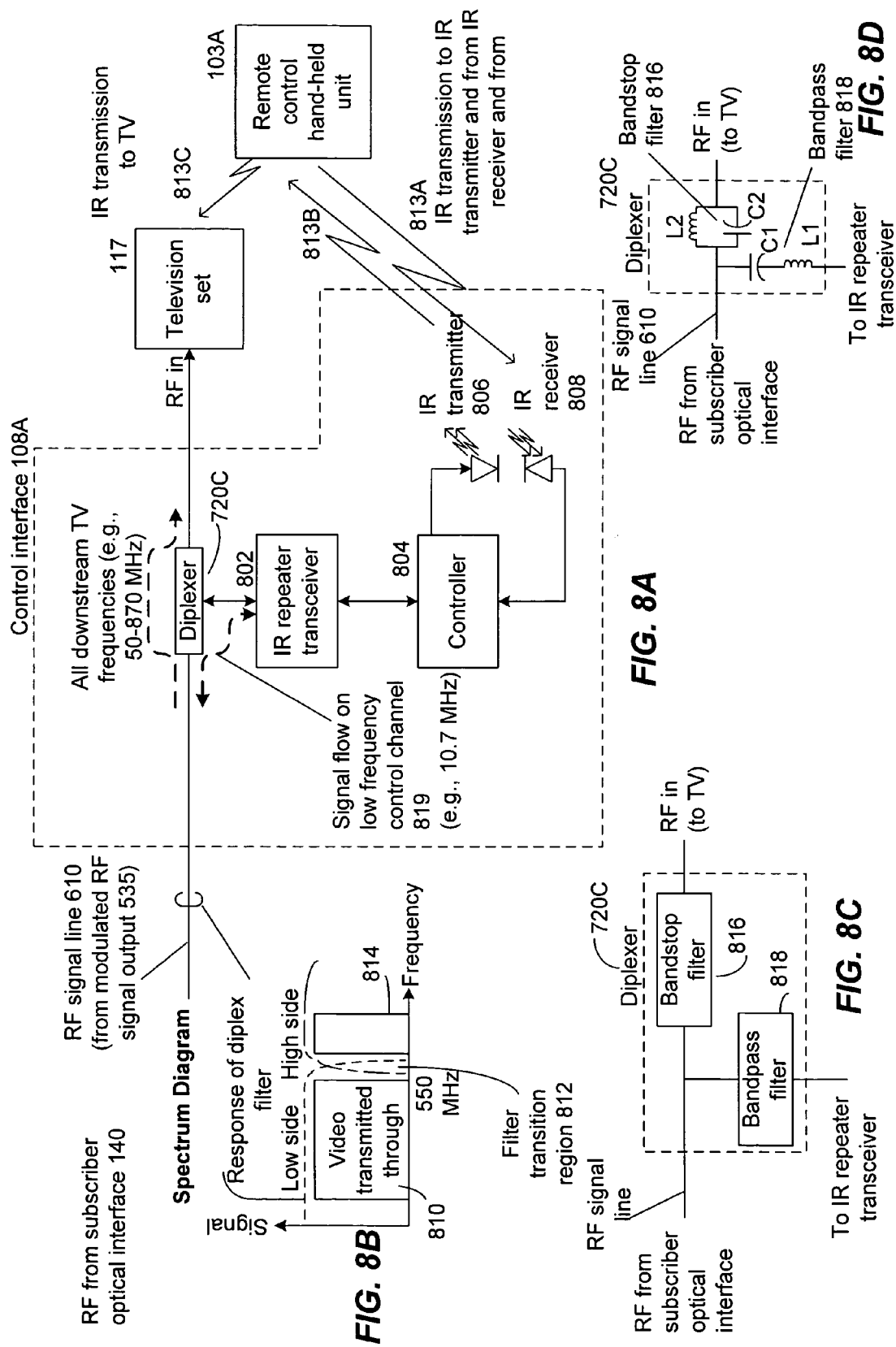

US 7,529,485 B2

METHOD AND SYSTEM FOR SUPPORTING MULTIPLE SERVICES WITH A SUBSCRIBER OPTICAL INTERFACE LOCATED OUTSIDE A SUBSCRIBER'S PREMISES

STATEMENT AND PRIORITY REGARDING RELATED APPLICATIONS

The present application is a continuation-in-part of non-provisional patent application entitled, "System and Method for Communicating Optical Signals Between A Data Service Provider and Subscribers," filed on Jul. 5, 2001 now U.S. Pat. No. 6,973,271 and assigned U.S. application Ser. No. 09/899,410; and the present application claims priority to provisional patent application entitled, "Home Interface Terminal for Multiple Services," filed on Dec. 18, 2002 and assigned U.S. application Ser. No. 60/433,984. The entire contents of both the Non-provisional and Provisional applications are hereby incorporated by reference.

TECHNICAL FIELD

The present invention relates to video, voice, and data communications. More particularly, the present invention relates to a fiber-to-the-home (FTTH) system that includes a subscriber optical interface with increased functionality that converts optical signals into the electrical domain for television viewing.

BACKGROUND OF THE INVENTION

The increasing reliance on communication networks to transmit more complex data, such as voice and video traffic, is causing a very high demand for bandwidth. To resolve this demand for bandwidth, communications networks are relying upon optical fiber to transmit this complex data. Conventional communication architectures that employ coaxial cables are slowly being replaced with communication networks that comprise only fiber optic cables. One advantage that optical fibers have over coaxial cables is that a much greater amount of information can be carried on an optical fiber.

While fiber-to-the-home systems using optical signals offer significant benefits in communication bandwidth over traditional coaxial cable systems, some FTTH systems still have some minor drawbacks that are common with coaxial cable systems. At some location proximate to the subscriber, the optical signals of an FTTH system must be converted to the electrical domain so that subscriber equipment such as televisions, telephones, and computers can be used. However, many conventional TV sets operating alone cannot do all the things necessary to support modem services. For instance, they usually cannot receive digital signals, nor can they descrambled programming. This can be troublesome for both FTTH systems and coaxial cable systems.

Once the optical signals of an FTTH system are converted into the electrical domain, additional electrical signal processing may be required for most conventional televisions. Most conventional televisions cannot handle digital video programming. In order to alleviate these signal processing problems, a service provider must provide a set-top box that can process the digital video programming and that can convert the digital video programming into a format that can be used by a television (TV) set.

These set top boxes can create many problems for the service provider. One problem is that the service provider has limited access to any equipment that may be located within a subscriber's premises. Therefore, a service provider often must have its service personnel coordinate with subscribers in order to gain access to equipment, such as the set top box, that may be located within the subscriber's premises.

Another problem with conventional set top boxes is that they usually contain very complex signal processing equipment. And because of this complex signal processing equipment, the set top boxes are usually very expensive. Because a subscriber has constant access to a set top box, it may become more susceptible to physical abuse or excessive wear and tear compared to equipment that may not be accessible to a subscriber. Another drawback of set top boxes is that they can be very large and at times, not aesthetically pleasing to the subscriber's premises. Another problem with set top boxes is that one is needed for each television component attempting to tune channels, such as TVs and Video Cassette Recorders (VCRs).

Accordingly, a need exists in the art to reduce the signal processing circuitry of set top boxes which, in turn, will likely decrease their size and cost. There is also a need in the art to eliminate set top boxes entirely so that service providers' equipment ends or terminates at locations outside of a subscriber's premises. A further need exists in the art to reduce exposure of complex signal processing circuitry to excessive wear and tear made by subscribers by positioning the circuitry in a permanent enclosure that is located outside of the subscriber's premises and is accessible only by the service provider's personnel.

SUMMARY OF THE INVENTION

The present invention is generally a system and method for tuning a broadcast receiver such as a television set with a subscriber optical interface (SOI) that can be located outside a subscriber's premises and can be adjacent to the subscriber's premises. For example, a subscriber optical interface mounted on a side of a home can convert optical data and optical video signals received from an optical waveguide to electrical signals. These electrical signals can then be propagated from the subscriber optical interface along traditional electrical cables of a subscriber's premises such as a household or office. These electrical cables can be coupled to various subscriber equipment such as a television (TV) set, a telephone, and a computer.

For TV applications, the present invention can reduce or minimize hardware that is present within the subscriber's premises for tuning video programs without sacrificing a range of services available to a subscriber from a fiber-to-the-home optical network. In other words, with the present invention, the size and complexity of a set-top box can be reduced and in some cases, the set-top box can be eliminated. It is recognized that set-top boxes are frequently needed because most conventional television sets, at the time of this writing, cannot tune digital channels or Internet Protocol (IP) broadcasts. When a majority of television sets become more sophisticated and contain the necessary hardware or software (or both) to receive digital channels or IP broadcasts, then the amount of hardware or software (or both) contained in the SOI of the present invention can then be scaled back accordingly.

For the present, reducing the complexity of a set top box or eliminating a complex set top box from a subscriber's premises gives a service provider several benefits: Any equipment that is part of the present invention and that would be physically located in a subscriber's premises would have the main purpose of relaying information back to the subscriber optical interface that is physically located external to a subscriber's premises such as a house. In this way, a service provider can update or maintain more complex network equipment that is accessible on the outside of a subscriber's premises such as a single family home or office. This can eliminate any dependency that a service provider may have had on a subscriber in the past when complex and costly equipment, such as digital set-top boxes, was located inside of the subscriber's premises.

SOI/Remote Controller Exemplary Aspects:

According to one exemplary aspect, the system and method can include a subscriber optical interface (SOI) that can respond to a subscriber desiring to view an analog channel containing programming. In response to signals received from a remote controller containing the subscriber's analog channel request, the SOI can verify that the TV can tune the requested analog channel and then instruct the remote controller to command the TV to tune to an analog channel that contains programming that is specifically earmarked or transmitted for the analog channel.

According to another exemplary aspect, the system and method can include a subscriber optical interface (SOI), in response to a subscriber desiring to view a digital channel or an Internet Protocol (IP) channel containing programming, determining if a subscriber's TV can tune the digital or IP channel. If the SOI determines that the TV can tune the digital or IP channel, then the SOI can instruct the remote controller to issue commands to the TV to tune to the desired digital or IP channel.

If the SOI determines that the subscriber's TV cannot tune to the digital or IP channel, the SOI can use a digital demodulator or use an IP converter contained in the SOI to receive the desired channel. The SOI can convert the digital or IP channel to the analog domain. Then, the SOI can identify an available analog channel that can be tuned by the TV. Once the analog channel is identified, the SOI can modulate the converted analog signal to the frequency of the available analog channel that can be tuned by the TV. This modulation of the converted analog signal can be achieved with an agile RF modulator according to one exemplary embodiment. The SOI can then instruct the remote controller to command the TV to tune to the analog channel that contains the converted digital or IP channel programming.

According to another exemplary aspect, similar to the digital or IP channel conversion method and system discussed above, in response to a subscriber's request, the SOI can transmit an electronic program guide (EPG) to the TV on an available analog channel that is tunable by the TV. In a similar manner to the EPG and in conjunction with the data service hub, the SOI can relay instant replays of live broadcasts and pre-recorded programming to the TV on an available analog channel that is tunable by the TV. In this way, and according to all of the exemplary aspects discussed above, the hardware or software (or both) that is needed to access many of the video services offered by a service provider is contained in the SOI that can be located outside of the subscriber's premises.

Minimal or Reduced Hardware Located in Subscriber's Premises for Communicating with SOI:

According to one exemplary aspect, a control interface positioned within a subscriber's premises can relay signals from the remote controller to the SOI. This control interface can include a wireless transceiver that allows communication with a remote controller that can also have a wireless transceiver. According to another exemplary aspect, the wireless transceiver can comprise an infrared transmitter and an infrared receiver. According to a further exemplary aspect, the transceiver can comprise a radio frequency (RF) transmitter and receiver.

In addition to the wireless transceiver, the control interface may also include a controller and a repeater transceiver. The repeater transceiver can communicate upstream RF signals over an electrical waveguide back to the SOI and it can receive downstream signals containing instructions for the remote controller made by the SOI. The control interface may also include a diplexer for separating video programming signals from remote controller signals that originate from the SOI. According to another exemplary aspect the control interface positioned in the subscriber's premises may include a block converter for converting programming signals that may not be tunable by a TV.

According to another exemplary aspect, the control interface positioned adjacent to the TV can be eliminated when an RF transceiver for communicating with the remote control and SOI is contained within or positioned adjacent to a power supply located within the subscriber's premises. The power supply can provide power to the SOI over an electrical waveguide such as a power cable. The RF transceiver can be coupled to the SOI by an electrical waveguide such as a data cable. According to another exemplary aspect in which the RF transceiver is contained within or positioned adjacent to a power supply located within the subscriber's premises, a control interface may include a block converter for converting programming signals that may not be tunable by a TV.

SOI/Personal Video Recorder Exemplary Aspects:

According to a further exemplary aspect, each SOI may include a personal video recorder. The personal video recorder can comprise hardware or software (or both) that can record television programming. According to one exemplary aspect, the personal video recorder can include, but is not limited to, a digital video recorder such as a device that can use a hard disk drive to record and to access recorded television programming. However, other types of video recorders that include magnetic tape recording devices or electronic memory devices could be employed.

According to an additional aspect, a data service hub that is coupled to the SOIs can track the programming being recorded by the personal video recorders in each SOI. In this way, when a subscriber fails to record a desired program, the data service hub can conduct a search of its database and identify which SOIs that may have recorded the desired program.

The data service hub then can establish a link between the subscriber desiring to view the recorded program with the SOI that may contain the program. Alternatively, the data service hub can retrieve the recorded program and send it in its entirety to the SOI of the subscriber desiring to view the program. As another alternative, the data service hub can retrieve and store the recorded program and play it back to the SOI of the subscriber desiring to view the program. Various other ways of retrieving and storing the desired program from an SOI different from the SOI of the subscriber are not beyond the scope and spirit of the present invention.

S-Video Exemplary Aspects of the SOI:

According to another exemplary aspect, an SOI can include an interface that transmits S-Video formatted signals over a single electrical waveguide such as a coaxial cable. The interface may be desirable and helpful for home theater systems of subscribers that have inputs designed to receive S-Video formatted signals. According to a first exemplary aspect, an S-Video interface that is part of the SOI and a control interface that is coupled to a TV can include a mixer, a local oscillator, a band pass filter, a diplexer, and one of an agile modulator (for the S-Video interface) and agile demodulator (for the control interface).

The agile modulator and demodulators can be used when a single electrical waveguide drop is designed to feed an entire subscriber's premises. With the agile modulator and agile demodulator, the S-Video formatted signals can use the same electrical waveguide as regular formatted video signals. According to a second exemplary aspect, in which a dedicated S-Video drop from the SOI is available and is coupled to a home theater system, the agile modulators and demodulators can be eliminated.

SOI Home/Office Event Manager:

According to other exemplary aspects, the SOI can manage home or office events that often occur during video viewing by a subscriber. According to one exemplary aspect, the SOI in combination with the remote controller can manage events such as telephone calls, intercom calls, and door bell rings. The SOI can be coupled to one or more cameras, door bells, intercoms, and other like devices. The SOI can interrupt video viewing of a subscriber and inform the subscriber of home events.

According to one exemplary aspect, the SOI can display video from the one or more cameras upon detecting an event that is being tracked by the cameras, such as doorbell ringing event. According to a further exemplary aspect, the SOI can display messages on a subscriber's TV when a video camera event or door bell ring is detected or if a phone call is received at the subscriber's premises. Similarly, the SOI can display messages on the subscriber's remote controller when any of these events occur. Alternatively, the messages can be displayed by both the TV and the remote controller.

According to additional exemplary aspects, the remote controller can be used in combination with the SOI to manage these home events. For example, a subscriber could answer a phone call with his remote controller that can be equipped with a microphone and speaker (or phone jack inputs) while the SOI mutes or pauses a video program being viewed by the subscriber. The remote controller equipped with the microphone and speaker (or phone jack) could also be used to answer door calls if the subscriber's premises is equipped with an intercom system. The remote controller could also be used to activate electric locks on the doors of the subscriber's premises. Other additional home events that can be managed by the SOI are not beyond the scope and spirit of the invention.

SOI Hardware Exemplary Aspects

According to one exemplary aspect, the SOI can include hardware such as a digital RF tuner and a digital demodulator. The digital tuner can be used to receive one of an array of digital channels that may be propagated across the network from a data service hub. The digital demodulator can convert received digital television programming into the analog domain. The SOI can also include an agile RF modulator. The agile RF modulator can modulate television programming received from the digital demodulators on to analog RF channels that can be tuned with a conventional television.

The SOI may also include one or more point of deployment (POD) modules for descrambling channels that are scrambled at the data service hub. The PODs of the SOI can also include an out-of-band (OOB) processing submodule that can support communications between the SOI and the data service hub. The out-of-band processing submodule can recover downstream control information originating from the data service hub. Each POD may further include security modules such as a copy protection module and a conditional access module. The copy protection module can verify the POD module is plugged into an acceptable host, such as an SOI. The conditional access module can descramble signals and authorize reception of individual channels and programs for a particular SOI. Other exemplary hardware for the SOI can include an MPEG decoder, diplexers, and a control interface transceiver for supporting communications between the control interface and the SOI.

BRIEF DESCRIPTION OF THE DRAWINGS

FIG. 1 is a functional block diagram of some core components of an exemplary optical network architecture according to an exemplary embodiment of the present invention that can include a subscriber optical interface coupled to a remote controller.

FIG. 2 is a functional block diagram illustrating additional aspects of an exemplary optical network architecture according to an exemplary embodiment of the present invention.

FIG. 3 is a functional block diagram illustrating an exemplary data service hub according to an exemplary embodiment of the present invention.

FIG. 8A is a functional block diagram illustrating an infrared control interface and an infrared remote controller according to one exemplary embodiment of the present invention.

FIG. 8B is a frequency spectrum diagram illustrating responses of a diplexer that may be part of a control interface according to the exemplary embodiment illustrated in FIG. 8A.

FIG. 8C is a functional block diagram illustrating a diplexer that may be part of the control interface illustrated in FIG. 8A.

FIG. 8D is a circuit diagram illustrating exemplary components of the diplexer illustrated in FIG. 8C.

DETAILED DESCRIPTION OF EXEMPLARY EMBODIMENTS OF THE INVENTION

Figure 4:
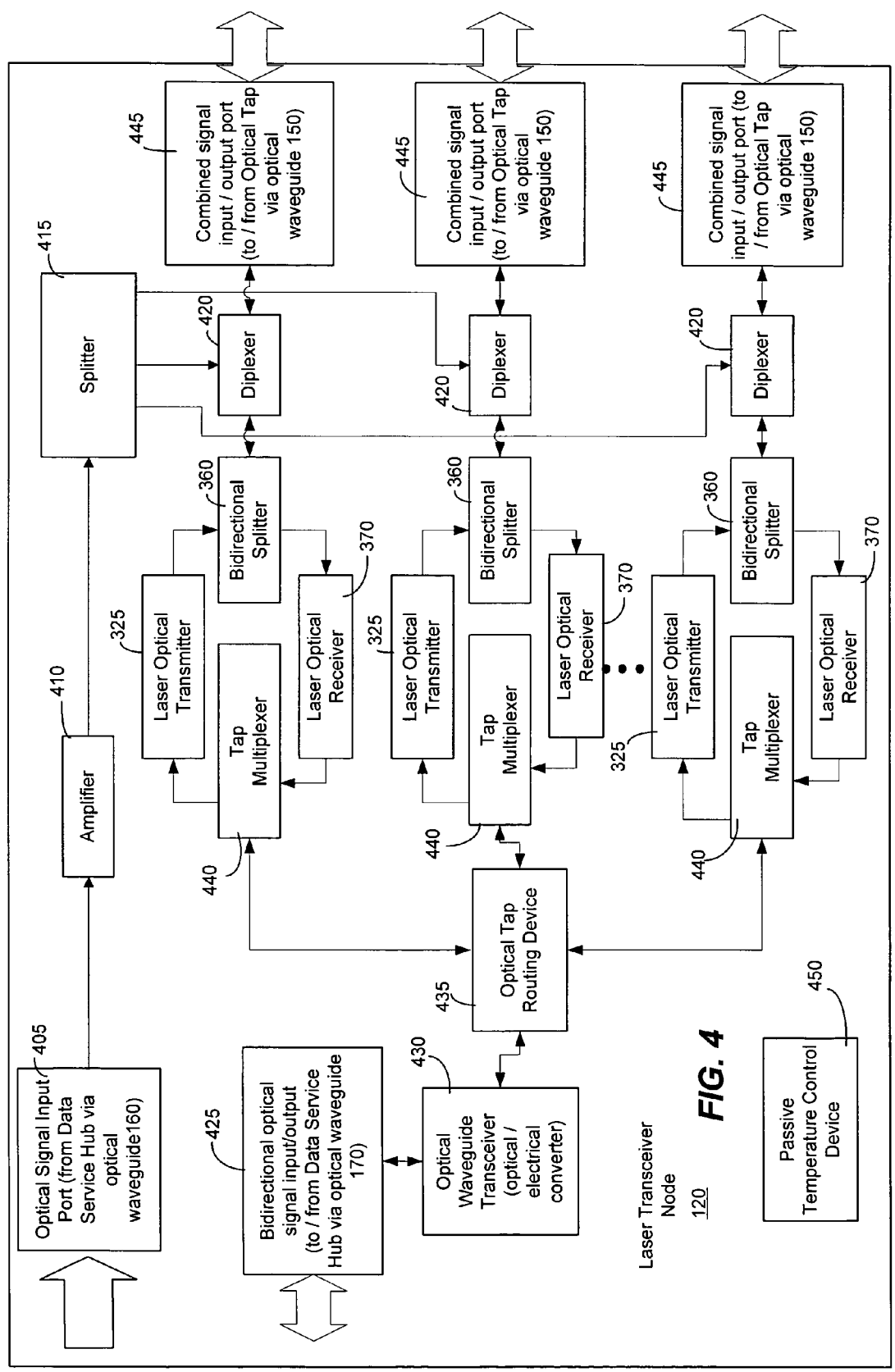
FIG. 4 is a functional block diagram illustrating an exemplary laser transceiver node according to an exemplary embodiment of the present invention.

With the present invention, video signaling processing hardware that is present within the subscriber's premises for tuning video programs can be minimized or reduced without sacrificing a range of services available to a subscriber from a fiber-to-the-home optical network. In other words, the size and complexity of a set-top box can be reduced and in some cases, the set-top box can be eliminated. It is recognized that set-top boxes are frequently needed because most conventional television sets, at the time of this writing, cannot tune digital channels or Internet Protocol (IP) broadcasts.

Some components of the present invention may be physically located in a subscriber's premises but would have the main purpose of relaying information back to the subscriber optical interface that is physically located external to a subscriber's premises such as a house. In this way, a service provider can update or maintain more complex network equipment that is accessible on the outside of a subscriber's premises such as a single family home or office.

Exemplary Base Optical Architecture

Referring now to the drawings, in which like numerals represent like elements throughout the several Figures, aspects of the present invention and the illustrative operating environment will be described.

FIG. 1 is a functional block diagram illustrating an exemplary optical network architecture 100 according to the present invention. The exemplary optical network architecture 100 comprises a data service hub 110. Further details of the data service hub 110 will be discussed in detail below with respect to FIG. 3.

The data service hub 110 is coupled to a plurality of outdoor laser transceiver nodes 120. The laser transceiver nodes 120, in turn, are each coupled to a plurality of optical taps 130. The optical taps 130 can be coupled to a plurality of subscriber optical interfaces 140. Coupled to each subscriber optical interface 140 can be a broadcast receiver 117 such as a television (TV) set, a remote control interface 108, and a remote control 108. One focus of the present invention is on the hardware and software used to support communications between the subscriber optical interface (SOI) 140, the remote control interface 108, and the remote control 103.

Between respective components of the exemplary optical network architecture 100 are optical waveguides such as optical waveguides 150, 160, 170, and 180. The optical waveguides 150-180 are illustrated by arrows where the arrowheads of the arrows illustrate exemplary directions of data flow between respective components of the illustrative and exemplary optical network architecture 100.

While only an individual laser transceiver node 120, an individual optical tap 130, and an individual subscriber optical interface 140 are illustrated in FIG. 1, as will become apparent from FIG. 2 and its corresponding description, a plurality of laser transceiver nodes 120, optical taps 130, and subscriber optical interfaces 140 can be employed without departing from the scope and spirit of the present invention. Typically, in many of the exemplary embodiments of the multiple service provider system of the present invention, several subscriber optical interfaces 140 can be coupled to one or more optical taps 130.

The outdoor laser transceiver node 120 can allocate additional or reduced bandwidth based upon the demand of one or more subscribers that use the subscriber optical interfaces 140. The outdoor laser transceiver node 120 can be designed to withstand outdoor environmental conditions and can be designed to hang on a strand or fit in a pedestal or "hand hole (underground vault)." The outdoor laser transceiver node can operate in a temperature range between minus 40 degrees Celsius to plus 60 degrees Celsius. The laser transceiver node 120 can operate in this temperature range by using passive cooling devices that do not consume power.

Unlike the conventional routers disposed between the subscriber optical interface 140 and data service hub 110, the outdoor laser transceiver node 120 does not require active cooling and heating devices that control the temperature surrounding the laser transceiver node 120. The RF system of the present invention attempts to place more of the decision-making electronics at the data service hub 110 instead of the laser transceiver node 120. Typically, the decision-making electronics are larger in size and produce more heat than the electronics placed in the laser transceiver node of the present invention. Because the laser transceiver node 120 does not require active temperature controlling devices, the laser transceiver node 120 lends itself to a compact electronic packaging volume that is typically smaller than the environmental enclosures of conventional routers. Further details of the components that make up the laser transceiver node 120 will be discussed in further detail below with respect to FIG. 4.

In one exemplary embodiment of the present invention, three trunk optical waveguides 160, 170, and 180 (that can comprise optical fibers) can propagate optical signals from the data service hub 110 to the outdoor laser transceiver node 120. It is noted that the term "optical waveguide" used in the present application can apply to optical fibers, planar light guide circuits, and fiber optic pigtails and other like optical waveguide components that are used to form an optical architecture.

A first optical waveguide 160 can carry downstream broadcast analog video and control signals. The analog signals can be carried in a traditional cable television format wherein the broadcast signals are modulated onto analog optical carriers with an optical transmitter (not shown in this Figure) in the data service hub 110. The first optical waveguide 160 can also carry upstream RF signals that are generated by respective video Broadcast receivers 117.

A second optical waveguide 170 can carry upstream and downstream targeted services such as data and telephone services to be delivered to or received from one or more subscriber optical interfaces 140. In addition to carrying subscriber-specific optical signals, the second optical waveguide 170 can also propagate internet protocol broadcast packets, as is understood by those skilled in the art.

In one exemplary embodiment, a third optical waveguide 180 can transport data signals upstream from the outdoor laser transceiver node 120 to the data service hub 110. The optical signals propagated along the third optical waveguide 180 can also comprise data and telephone services received from one or more subscribers. Similar to the second optical waveguide 170, the third optical waveguide 180 can also carry IP broadcast packets, as is understood by those skilled in the art.

The third or upstream optical waveguide 180 is illustrated with dashed lines to indicate that it is merely an option or part of one exemplary embodiment according to the present invention. In other words, the third optical waveguide 180 can be removed. In another exemplary embodiment, the second optical waveguide 170 propagates optical signals in both the upstream and downstream directions as is illustrated by the double arrows depicting the second optical waveguide 170.

In such an exemplary embodiment where the second optical waveguide 170 propagates bidirectional optical signals, only two optical waveguides 160, 170 would be needed to support the optical signals propagating between the data server's hub 110 in the outdoor laser transceiver node 120. In another exemplary embodiment (not shown), a single optical waveguide can be the only link between the data service hub 110 and the laser transceiver node 120. In such a single optical waveguide embodiment, three different wavelengths can be used for the upstream and downstream signals. Alternatively, bi-directional data could be modulated on one wavelength.

In one exemplary embodiment, the optical tap 130 can comprise an 8-way optical splitter. This means that the optical tap 130 comprising an 8-way optical splitter can divide downstream optical signals eight ways to serve eight different subscriber optical interfaces 140. In the upstream direction, the optical tap 130 can combine the optical signals received from the eight subscriber optical interfaces 140.

In another exemplary embodiment, the optical tap 130 can comprise a 4-way splitter to service four subscriber optical interfaces 140. Yet in another exemplary embodiment, the optical tap 130 can further comprise a 4-way splitter that is also a pass-through tap meaning that a portion of the optical signal received at the optical tap 130 can be extracted to serve the 4-way splitter contained therein while the remaining optical energy is propagated further downstream to another optical tap or another subscriber optical interface 140.

The present invention is not limited to 4-way and 8-way optical splitters. Other optical taps having fewer or more than 4-way or 8-way splits are not beyond the scope of the present invention. The outdoor laser transceiver node 120, the optical tap 130, and the optical waveguide disposed between the laser transceiver node and the optical tap 130 can form and can be referred to as a proximate optical network 135 that is close to subscribers.

Referring now to FIG. 2, this Figure is a functional block diagram illustrating an exemplary optical network architecture 100 that further includes subscriber groupings 200 that correspond with a respective outdoor laser transceiver node 120. FIG. 2 illustrates the diversity of the exemplary optical network architecture 100 where a number of optical waveguides 150 coupled between the outdoor laser transceiver node 120 and the optical taps 130 is minimized. FIG. 2 also illustrates the diversity of subscriber groupings 200 that can be achieved with the optical tap 130.

Each optical tap 130 can comprise an optical splitter. The optical tap 130 allows multiple subscriber optical interfaces 140 to be coupled to a single optical waveguide 150 that is coupled to the outdoor laser transceiver node 120. In one exemplary embodiment, six optical fibers 150 are designed to be coupled to the outdoor laser transceiver node 120. Through the use of the optical taps 130, sixteen subscribers can be assigned to each of the six optical fibers 150 that are coupled to the outdoor laser transceiver node 120.

In another exemplary embodiment, twelve optical fibers 150 can be coupled to the outdoor laser transceiver node 120 while eight subscriber optical interfaces 140 are assigned to each of the twelve optical fibers 150. Those skilled in the art will appreciate that the number of subscriber optical interfaces 140 assigned to a particular waveguide 150 that is coupled between the outdoor laser transceiver node 120 and a subscriber optical interface 140 (by way of the optical tap 130) can be varied or changed without departing from the scope and spirit of the present invention. Further, those skilled in the art recognize that the actual number of subscriber optical interfaces 140 assigned to the particular fiber optic cable is dependent upon the amount of power available on a particular optical fiber 150.

As depicted in subscriber grouping 200, many configurations for supplying communication services to subscribers are possible. For example, while optical tap 130$_A$ can connect subscriber optical interfaces 140$_{A1}$ through subscriber optical interface 140$_{AN}$ to the outdoor laser transmitter node 120, optical tap 130$_A$ can also connect other optical taps 130 such as optical tap 130$_{AN}$ to the laser transceiver node 120. The combinations of optical taps 130 with other optical taps 130 in addition to combinations of optical taps 130 with subscriber optical interfaces 140 are limitless. With the optical taps 130, concentrations of distribution optical waveguides 150 at the laser transceiver node 120 can be reduced. Additionally, the total amount of fiber needed to service a subscriber grouping 200 can also be reduced.

With the active laser transceiver node 120 of the present invention, the distance between the laser transceiver node 120 and the data service hub 110 can comprise a range between 0 and 80 kilometers. However, the present invention is not limited to this range. Those skilled in the art will appreciate that this range can be expanded by selecting various off-the-shelf components that make up several of the devices of the present system.

Those skilled in the art will appreciate that other configurations of the optical waveguides disposed between the data service hub 110 and outdoor laser transceiver node 120 are not beyond the scope of the present invention. Because of the bi-directional capability of optical waveguides, variations in the number and directional flow of the optical waveguides disposed between the data service hub 110 and the outdoor laser transceiver node 120 can be made without departing from the scope and spirit of the present invention.

Referring now to FIG. 3, this functional block diagram illustrates an exemplary data service hub 110 of the present invention for an individual service provider. If an optical network supports another individual service provider within the data service hub 110 as illustrated in FIG. 3, then all of the components illustrated in FIG. 3 would be replicated to support the other service provider. That is, each service provider would include its own modulators 310, 315, an internet router 340, a telephone switch 345, laser transceiver node routing device 355, and optical transmitters 325 and receivers 370.

For data services that will be modulated on a single digital optical carrier by time division multiplexed electrical digital data signals received from different service providers, the service providers can share much of the equipment illustrated in FIG. 3. That is, equipment between the laser transceiver node routing device 355 and the ports 365 and including the laser transceiver node routing device 355 can have inputs for each service provider (not shown in FIG. 3).

The exemplary data service hub 110 illustrated in FIG. 3 is also designed for a two trunk optical waveguide system. That is, this data service hub 110 of FIG. 3 is designed to send and receive optical signals to and from the outdoor laser transceiver node 120 along the first optical waveguide 160. With this exemplary embodiment, only the second optical waveguide 170 supports bi-directional data flow. In this way, the third optical waveguide 180 discussed above is not needed.

The data service hub 110 can comprise one or more modulators 310, 315 that are designed to support television broadcast services. The one or more modulators 310, 315 can be analog or digital type modulators. In one exemplary embodiment, there can be at least 78 modulators present in the data service hub 110. Those skilled in the art will appreciate that the number of modulators 310, 315 can be varied without departing from the scope and spirit of the present invention.

The signals from the modulators 310, 315 are combined in a first combiner 320. The combined video services controller signals and broadcast video signals are supplied to an optical transmitter 325 where these signals are converted into optical form.

Those skilled in the art will recognize that a number of variations of this signal flow are possible without departing from the scope and spirit of the present invention. For example, some portion of the video signals may be generated and converted to optical form at a remote first data service hub 110. At a second data service hub 110, they may be combined with other signals generated locally.

The optical transmitter 325 can comprise one of Fabry-Perot (F-P) laser, distributed feedback laser (DFB), or Vertical Cavity Surface Emitting Laser (VCSEL). However, other types of optical transmitters are possible and are not beyond the scope of the present invention. With the aforementioned optical transmitters 325, the data service hub 110 lends itself to efficient upgrading by using off-the-shelf hardware to generate optical signals.

The optical signals generated by the optical transmitter 325 are propagated to amplifier 330 such as an Erbium Doped Fiber Amplifier (EDFA) where the optical signals are amplified. The amplified optical signals are then propagated out of the data service hub 110 via a video signal input/output port 335 which is coupled to one or more first optical waveguides 160.

The data service hub 110 illustrated in FIG. 3 can further comprise an Internet router 340. The data service hub 110 can further comprise a telephone switch 345 that supports telephony service to the subscribers of the optical network system 100. However, other telephony service such as Internet Protocol telephony can be supported by the data service hub 110. If only Internet Protocol telephony is supported by the data service hub 110, then it is apparent to those skilled in the art that the telephone switch 345 could be eliminated in favor of lower cost VoIP equipment. For example, in another exemplary embodiment (not shown), the telephone switch 345 could be substituted with other telephone interface devices such as a soft switch and gateway. But if the telephone switch 345 is needed, it may be located remotely from the data service hub 110 and can be coupled through any of several conventional methods of interconnection.

The data service hub 110 can further comprise a logic interface 350 that is coupled to a laser transceiver node routing device 355. The logic interface 350 can comprise a Voice over Internet Protocol (VOIP) gateway when required to support such a service. The laser transceiver node routing device 355 can comprise a conventional router that supports an interface protocol for communicating with one or more laser transceiver nodes 120. This interface protocol can comprise one of gigabit or faster Ethernet, Internet Protocol (IP) or SONET protocols. However, the present invention is not limited to these protocols. Other protocols can be used without departing from the scope and spirit of the present invention.

The logic interface 350 and laser transceiver node routing device 355 can read packet headers originating from the laser transceiver nodes 120 and the internet router 340. The logic interface 350 can also translate interfaces with the telephone switch 345. After reading the packet headers, the logic interface 350 and laser transceiver node routing device 355 can determine where to send the packets of information.

The laser transceiver node routing device 355 can also supply downstream data signals to respective optical transmitters 325. The data signals converted by the optical transmitters 325 can then be propagated to a bi-directional splitter 360. The optical signals sent from the optical transmitter 325 into the bi-directional splitter 360 can then be propagated towards a bi-directional data input/output port 365 that is coupled to a second optical waveguide 170 that supports bi-directional optical data signals between the data service hub 110 and a respective laser transceiver node 120.

Upstream optical signals received from a respective laser transceiver node 120 can be fed into the bi-directional data input/output port 365 where the optical signals are then forwarded to the bi-directional splitter 360. From the bi-directional splitter 360, respective optical receivers 370 can convert the upstream optical signals into the electrical domain. The upstream electrical signals generated by respective optical receivers 370 are then fed into the laser transceiver node routing device 355. As noted above, each optical receiver 370 can comprise one or more photoreceptors or photodiodes that convert optical signals into electrical signals.

When distances between the data service hub 110 and respective laser transceiver nodes 120 are modest, the optical transmitters 325 can propagate optical signals at 1310 nm. But where distances between the data service hub 110 and the laser transceiver node are more extreme, the optical transmitters 325 can propagate the optical signals at wavelengths of 1550 nm with or without appropriate amplification devices.

According to one exemplary embodiment, most of the data services are transported by a digital optical carrier having a wavelength of 1310 nm. Meanwhile, the broadcast services are transported by analog optical carriers in the 1550 nm wavelength region. An optical diplexer 515 (discussed below and illustrated in FIG. 5) will separate the digital optical carrier from the one or more analog optical carriers according to the carriers respective wavelength.

Those skilled in the art will appreciate that the selection of optical transmitters 325 for each circuit may be optimized for the optical path lengths needed between the data service hub 110 and the outdoor laser transceiver node 120. Further, those skilled in the art will appreciate that the wavelengths discussed are practical but are only illustrative in nature. In some scenarios, it may be possible to use communication windows at 1310 and 1550 nm in different ways without departing from the scope and spirit of the present invention. Further, the present invention is not limited to a 1310 and 1550 nm wavelength regions. Those skilled in the art will appreciate that smaller or larger wavelengths for the optical signals are not beyond the scope and spirit of the present invention.

Referring now to FIG. 4, this Figure illustrates a functional block diagram of an exemplary outdoor laser transceiver node 120 of the present invention. In this exemplary embodiment, the laser transceiver node 120 can comprise an optical signal input port 405 that can receive optical signals propagated from the data service hub 110 that are propagated along a first optical waveguide 160. The optical signals received at the optical signal input port 405 can comprise downstream broadcast video data.

The downstream broadcast video data can also comprise downstream video service control signals. The downstream broadcast video data is typically modulated on an analog optical carrier.

The downstream optical signals received at the input port 405 are propagated through an amplifier 410 such as an Erbium Doped Fiber Amplifier (EDFA) in which the optical signals are amplified. The amplified optical signals are then propagated to an optical splitter 415 that divides the downstream broadcast video optical signals (that may also include video service control signals if sent on modulated carriers) among diplexers 420 that are designed to forward optical signals to predetermined subscriber groups 200.

The laser transceiver node 120 can further comprise a bi-directional optical signal input/output port 425 that connects the laser transceiver node 120 to a second optical waveguide 170 that supports bi-directional data flow between the data service hub 110 and laser transceiver node 120. Downstream optical signals flow through the bi-directional optical signal input/output port 425 to an optical waveguide transceiver 430 that converts downstream optical signals into the electrical domain.

The optical waveguide transceiver 430 further converts upstream electrical signals into the optical domain. The optical waveguide transceiver 430 can comprise an optical/electrical converter and an electrical/optical converter. Downstream and upstream electrical signals are communicated between the optical waveguide transceiver 430 and an optical tap routing device 435.

The optical tap routing device 435 can manage the interface with the data service hub optical signals and can route or divide or apportion the data service hub signals according to individual tap multiplexers 440 that communicate optical signals with one or more optical taps 130 and ultimately one or more subscriber optical interfaces 140. It is noted that tap multiplexers 440 operate in the electrical domain to modulate laser transmitters in order to generate optical signals that are assigned to groups of subscribers coupled to one or more optical taps.

Optical tap routing device 435 is notified of available upstream data packets and upstream RF packets as they arrive, by each tap multiplexer 440. The optical tap routing device is coupled to each tap multiplexer 440 to receive these upstream data and RF packets. The optical tap routing device 435 can relay upstream video control return packets and information packets that can comprise data and/or telephony packets to the data service hub 110 via the optical waveguide transceiver 430 and bidirectional optical signal input/output 425. The optical tap routing device 435 can build a lookup table from these upstream data packets coming to it from all tap multiplexers 440 (or ports), by reading the source IP address of each packet, and associating it with the tap multiplexer 440 through which it came.

The aforementioned lookup table can be used to route packets in the downstream path. As each downstream data packet comes in from the optical waveguide transceiver 430, the optical tap routing device looks at the destination IP address (which is the same as the source IP address for the upstream packets). From the lookup table the optical tap routing device 435 can determine which port (or, tap multiplexer 440) is coupled to that IP address, so it sends the packet to that port. This can be described as a normal layer 3 router function as is understood by those skilled in the art.

The optical tap routing device 435 can assign multiple subscribers to a single port. More specifically, the optical tap routing device 435 can service groups of subscribers with corresponding respective, single ports. The optical taps 130 coupled to respective tap multiplexers 440 can supply downstream optical signals to pre-assigned groups of subscribers who receive the downstream optical signals with the subscriber optical interfaces 140.

In other words, the optical tap routing device 435 can determine which tap multiplexers 440 is to receive a downstream electrical signal, or identify which tap multiplexer 440 propagated an upstream optical signal (that is received as an electrical signal). The optical tap routing device 435 can format data and implement the protocol required to send and receive data from each individual subscriber coupled to a respective optical tap 130. The optical tap routing device 435 can comprise a computer or a hardwired apparatus that executes a program defining a protocol for communications with groups of subscribers assigned to individual ports. Exemplary embodiments of programs defining the protocol is discussed in the following copending and commonly assigned non-provisional patent applications, the entire contents of which are hereby incorporated by reference: "Method and System for Processing Downstream Packets of an Optical Network," filed on Oct. 26, 2001 in the name of Stephen A. Thomas et al. and assigned U.S. Ser. No. 10/045,652; and "Method and System for Processing Upstream Packets of an Optical Network," filed on Oct. 26, 2001 in the name of Stephen A. Thomas et al. and assigned U.S. Ser. No. 10/045,584.

The single ports of the optical tap routing device 435 are coupled to respective tap multiplexers 440. With the optical tap routing device 435, the laser transceiver node 120 can adjust a subscriber's bandwidth on a subscription basis or on an as-needed or demand basis. The laser transceiver node 120 via the optical tap routing device 435 can offer data bandwidth to subscribers in pre-assigned increments. For example, the laser transceiver node 120 via the optical tap routing device 435 can offer a particular subscriber or groups of subscribers bandwidth in units of 1, 2, 5, 10, 20, 50, 100, 200, and 450 Megabits per second (Mb/s). Those skilled in the art will appreciate that other subscriber bandwidth units are not beyond the scope of the present invention.

Electrical signals are communicated between the optical tap routing device 435 and respective tap multiplexers 440. The tap multiplexers 440 propagate optical signals to and from various groupings of subscribers by way of laser optical transmitter 525 and laser optical receiver 370. Each tap multiplexer 440 is coupled to a respective optical transmitter 325. As noted above, each optical transmitter 325 can comprise one of a Fabry-Perot (F-P) laser, a distributed feedback laser (DFB), or a Vertical Cavity Surface Emitting Laser (VCSEL). The optical transmitters produce the downstream optical signals that are propagated towards the subscriber optical interfaces 140. Each tap multiplexer 440 is also coupled to an optical receiver 370. Each optical receiver 370, as noted above, can comprise photoreceptors or photodiodes. Since the optical transmitters 325 and optical receivers 370 can comprise off-the-shelf hardware to generate and receive respective optical signals, the laser transceiver node 120 lends itself to efficient upgrading and maintenance to provide significantly increased data rates.

Each optical transmitter 325 and each optical receiver 370 are coupled to a respective bi-directional splitter 360. Each bi-directional splitter 360 in turn is coupled to a diplexer 420 which combines the optical signals received from the splitter 415 with the downstream optical signals received from respective optical receivers 370. In this way, broadcast video services as well as data services can be supplied with a single optical waveguide such as a distribution optical waveguide 150 as illustrated in FIG. 2. In other words, optical signals can be coupled from each respective diplexer 420 to a combined signal input/output port 445 that is coupled to a respective distribution optical waveguide 150.

Unlike the conventional art, the laser transceiver node 120 does not employ a conventional router. The components of the laser transceiver node 120 can be disposed within a compact electronic packaging volume. For example, the laser transceiver node 120 can be designed to hang on a strand or fit in a pedestal similar to conventional cable TV equipment that is placed within the "last," mile or subscriber proximate portions of a network. It is noted that the term, "last mile," is a generic term often used to describe the last portion of an optical network that connects to subscribers.

Also because the optical tap routing device 435 is not a conventional router, it does not require active temperature controlling devices to maintain the operating environment at a specific temperature. Optical tap routing device 435 does not need active temperature controlling devices because it can be designed with all temperature-rated components. In other words, the laser transceiver node 120 can operate in a temperature range between minus 40 degrees Celsius to 60 degrees Celsius in one exemplary embodiment.

While the laser transceiver node 120 does not comprise active temperature controlling devices that consume power to maintain temperature of the laser transceiver node 120 at a single temperature, the laser transceiver node 120 can comprise one or more passive temperature controlling devices 450 that do not consume power. The passive temperature controlling devices 450 can comprise one or more heat sinks or heat pipes that remove heat from the laser transceiver node 120. Those skilled in the art will appreciate that the present invention is not limited to these exemplary passive temperature controlling devices. Further, those skilled in the art will also appreciate the present invention is not limited to the exemplary operating temperature range disclosed. With appropriate passive temperature controlling devices 450, the operating temperature range of the laser transceiver node 120 can be reduced or expanded.

In addition to the laser transceiver node's 120 ability to withstand harsh outdoor environmental conditions, the laser transceiver node 120 can also provide high speed symmetrical data transmissions. In other words, the laser transceiver node 120 can propagate the same bit rates downstream and upstream to and from a network subscriber. This is yet another advantage over conventional networks, which typically cannot support symmetrical data transmissions as discussed in the background section above. Further, the laser transceiver node 120 can also serve a large number of subscribers while reducing the number of connections at both the data service hub 110 and the laser transceiver node 120 itself.

The laser transceiver node 120 also lends itself to efficient upgrading that can be performed entirely on the network side or data service hub 110 side. That is, upgrades to the hardware forming the laser transceiver node 120 can take place in locations between and within the data service hub 110 and the laser transceiver node 120. This means that the subscriber side of the network (from distribution optical waveguides 150 to the subscriber optical interfaces 140) can be left entirely intact during an upgrade to the laser transceiver node 120 or data service hub 110 or both.

The following is provided as an example of an upgrade that can be employed utilizing the principles of the present invention. In one exemplary embodiment of the invention, the subscriber side of the laser transceiver node 120 can service six groups of 16 subscribers each for a total of up to 96 subscribers. Each group of 16 subscribers can share a data path of about 450 Mb/s speed. Six of these paths represents a total speed of 6×450=2.7 Gb/s. In the most basic form, the data communications path between the laser transceiver node 120 and the data service hub 110 can operate at 1 Gb/s. Thus, while the data path to subscribers can support up to 2.7 Gb/s, the data path to the network can only support 1 Gb/s. This means that not all of the subscriber bandwidth is useable. This is not normally a problem due to the statistical nature of bandwidth usage.

An upgrade could be to increase the 1 Gb/s data path speed between the laser transceiver node 120 and the data service hub 110. This may be done by adding more 1 Gb/s data paths.

Adding one more path would increase the data rate to 2 Gb/s, approaching the total subscriber-side data rate. A third data path would allow the network-side data rate to exceed the subscriber-side data rate. In other exemplary embodiments, the data rate on one link could rise from 1 Gb/s to 2 Gb/s then to 10 Gb/s, so when this happens, a link can be upgraded without adding more optical links.

The additional data paths (bandwidth) may be achieved by any of the methods known to those skilled in the art. It may be accomplished by using a plurality of optical waveguide transceivers 430 operating over a plurality of optical waveguides, or they can operate over one optical waveguide at a plurality of wavelengths, or it may be that higher speed optical waveguide transceivers 430 could be used as shown above. Thus, by upgrading the laser transceiver node 120 and the data service hub 110 to operate with more than a single 1 Gb/s link, a system upgrade is effected without having to make changes at the subscribers' premises.

Figure 5:
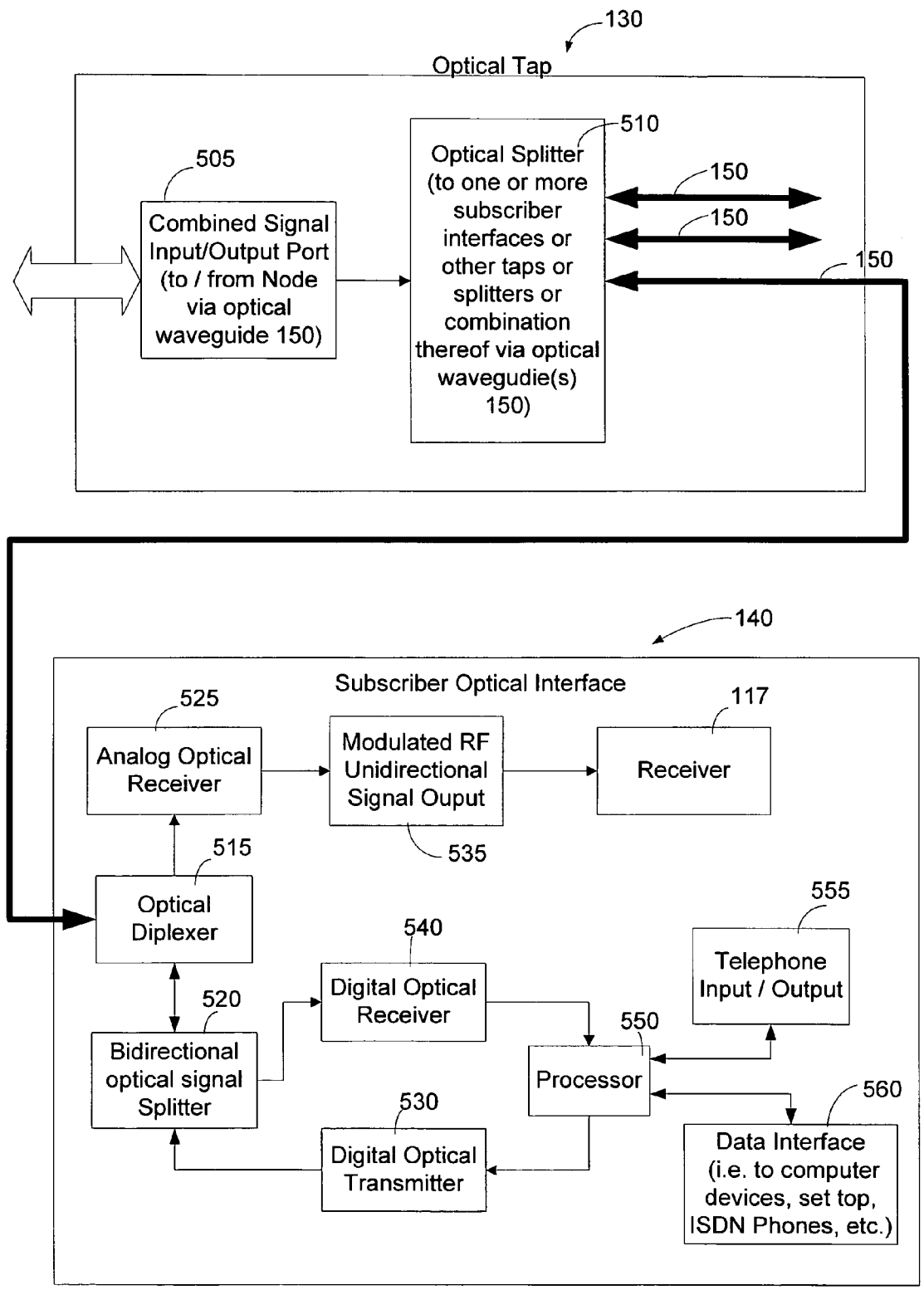
FIG. 5 is a functional block diagram illustrating an optical tap coupled to a subscriber optical interface according to an exemplary embodiment of the present invention.

Referring now to FIG. 5, this Figure is a functional block diagram illustrating an optical tap 130 coupled to a subscriber optical interface 140 by a single optical waveguide 150 according to one exemplary embodiment of the present invention. The optical tap 130 can comprise a combined signal input/output port 505 that is coupled to another distribution optical waveguide that is coupled to a laser transceiver node 120. As noted above, the optical tap 130 can comprise an optical splitter 510 that can be a 4-way or 8-way optical splitter. Other optical taps having fewer or more than 4-way or 8-way splits are not beyond the scope of the present invention.

The optical tap can divide downstream optical signals to serve respective subscriber optical interfaces 140. In the exemplary embodiment in which the optical tap 130 comprises a 4-way optical tap, such an optical tap can be of the pass-through type, meaning that a portion of the downstream optical signals is extracted or divided to serve a 4-way splitter contained therein, while the rest of the optical energy is passed further downstream to other distribution optical waveguides 150.

The optical tap 130 is an efficient coupler that can communicate optical signals between the laser transceiver node 120 and a respective subscriber optical interface 140. Optical taps 130 can be cascaded, or they can be coupled in a star architecture from the laser transceiver node 120. As discussed above, the optical tap 130 can also route signals to other optical taps that are downstream relative to a respective optical tap 130.

The optical tap 130 can also connect to a limited or small number of optical waveguides so that high concentrations of optical waveguides are not present at any particular laser transceiver node 120. In other words, in one exemplary embodiment, the optical tap can connect to a limited number of optical waveguides 150 at a point remote from the laser transceiver node 120 so that high concentrations of optical waveguides 150 at a laser transceiver node can be avoided. However, those skilled in the art will appreciate that the optical tap 130 can be incorporated within the laser transceiver node 120.

The subscriber optical interface 140 functions to convert downstream optical signals received from the optical tap 130 into the electrical domain that can be processed with appropriate communication devices. The subscriber optical interface illustrated in FIG. 5 is a basic unit. Further details of a preferred unit will be described below with respect to FIG. 7. The subscriber optical interface 140 functions to convert upstream electrical signals into upstream optical signals that can be propagated along a distribution optical waveguide 150 to the optical tap 130. The subscriber optical interface 140 can comprise an optical diplexer 515 that divides the downstream optical signals received from the distribution optical waveguide 150 between a bi-directional optical signal splitter 520 and an analog optical receiver 525.

The optical diplexer 515 can separate or divide downstream optical signals based on wavelength. Typically, digital optical carriers will be propagated at a first wavelength while analog optical carriers will be propagated at second and third wavelengths different from the first wavelength.

The optical diplexer 515 can receive upstream optical signals generated by a digital optical transmitter 530. The digital optical transmitter 530 converts electrical binary/digital signals to optical form so that the optical signals can be transmitted back to the data service hub 110. Conversely, the digital optical receiver 540 converts optical signals into electrical binary/digital signals so that the electrical signals can be handled by processor 550.

The analog optical receiver 525 can convert the downstream, analog broadcast optical video signals into modulated RF television signals that are propagated out of the modulated RF signal output 535. The modulated RF signal output 535 can feed Broadcast receivers 117 such as video service terminals like television sets and radios. The analog optical receiver 525 could process analog modulated RF transmission as well as digitally modulated RF transmissions for digital TV applications.

The bi-directional optical signal splitter 520 can propagate combined optical signals in their respective directions. That is, downstream optical signals entering the bi-directional optical splitter 520 from the optical diplexer 515, are propagated to the digital optical receiver 540. Upstream optical signals entering the splitter 520 from the digital optical transmitter 530 are sent to optical diplexer 515 and then to optical tap 130. The bi-directional optical signal splitter 520 is coupled to a digital optical receiver 540 that converts downstream data optical signals into the electrical domain. Meanwhile the bi-directional optical signal splitter 520 is also coupled to a digital optical transmitter 530 that converts upstream electrical signals into the optical domain.

The digital optical receiver 540 can comprise one or more photoreceptors or photodiodes that convert optical signals into the electrical domain. The digital optical transmitter can comprise one or more lasers such as the Fabry-Perot (F-P) Lasers, distributed feedback lasers, and Vertical Cavity Surface Emitting Lasers (VCSELs).

The digital optical receiver 540 and digital optical transmitter 530 are coupled to a processor 550 that selects data intended for the instant subscriber optical interface 140 based upon an embedded address. The data handled by the processor 550 can comprise one or more of telephony and data services such as an Internet service. The processor 550 is coupled to a telephone input/output 555 that can comprise an analog interface.

The processor 550 is also coupled to a data interface 560 that can provide a link to computer devices, set top boxes, ISDN phones, and other like devices. Alternatively, the data interface 560 can comprise an interface to a Voice over Internet Protocol (VoIP) telephone or Ethernet telephone. The data interface 560 can comprise one of Ethernet's (10BaseT, 100BaseT, Gigabit) interface, HPNA interface, a universal serial bus (USB) an IEEE1394 interface, an ADSL interface, and other like interfaces.

Exemplary Equipment Supported by SOI

Figure 6:
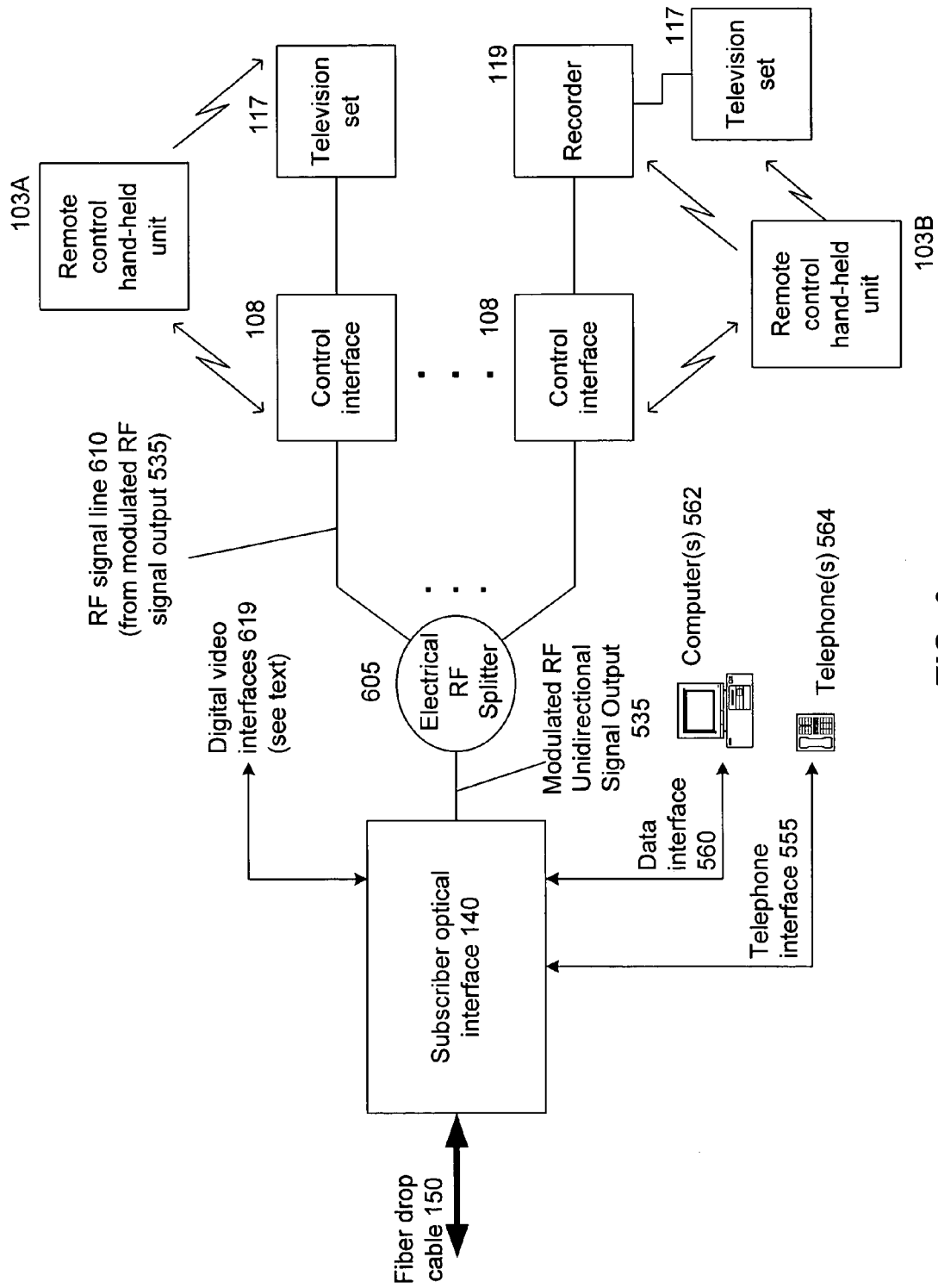
FIG. 6 is a functional block diagram illustrating exemplary subscriber equipment that can be serviced by the subscriber optical interface according to an exemplary embodiment of the present invention.

Referring now to FIG. 6, this Figure is a functional block diagram illustrating exemplary subscriber equipment that can be serviced by the subscriber optical interface 140 according to an exemplary embodiment of the present invention. The subscriber optical interface 140 may service data equipment such as computers 562 and telephones 564. For video equipment, the subscriber optical interface 104 can support digital video interfaces 619 that relay signals between the SOI 140 and a TV. For other video equipment, the output from the modulated RF signal output 535 may be split among a plurality of TV sets 117 and other devices such as recorders 119 that can include personal video recorders or video cassette recorders and other like equipment. An electrical splitter 605 can be used to split or divide the RF signals, and to combine return control signals as described below.

The signals propagating along the electrical waveguide may comprise analog-modulated RF carriers that may be tuned directly by a TV 117. In certain cases, control interfaces 108 between the Subscriber Optical Interface 140 and the TV may be used. Their operation will be described in greater detail below.

In order to effect control of a TV 117 and the decoding and tuning devices in the Subscriber Optical Interface 140, a remote control handheld unit 103 can be used. The remote control 103 may communicate with the TV 117 using the TV's remote control receiver (usually but not necessarily, the remote control operates using infrared—IR—signals. Other signaling, such as RF or ultrasonic, may be used and is not beyond the scope and spirit of the present invention).

The remote control handheld unit 103 is designed to communicate with the Subscriber Optical Interface 140, and may do so via a control interface 108 connected to the RF cable 610 from the Subscriber Optical Interface 140 to the TV 117. A number of variations on the construction and operation of the remote control handheld unit 103 and the control interface 108 will be described in greater detail below. According to one preferred and exemplary embodiment, a control interface 108 is not used.

Those skilled in the art will appreciate that the same remote control hand-held unit 103 that controls the TV 117 can control the recorder 119 and other consumer electronics devices. This detailed description will primarily discuss controlling the TV, but it is understood that other devices may also be controlled by the same remote control hand-held unit 103.

Exemplary Hardware of the Subscriber Optical Interface 140

Figure 7:
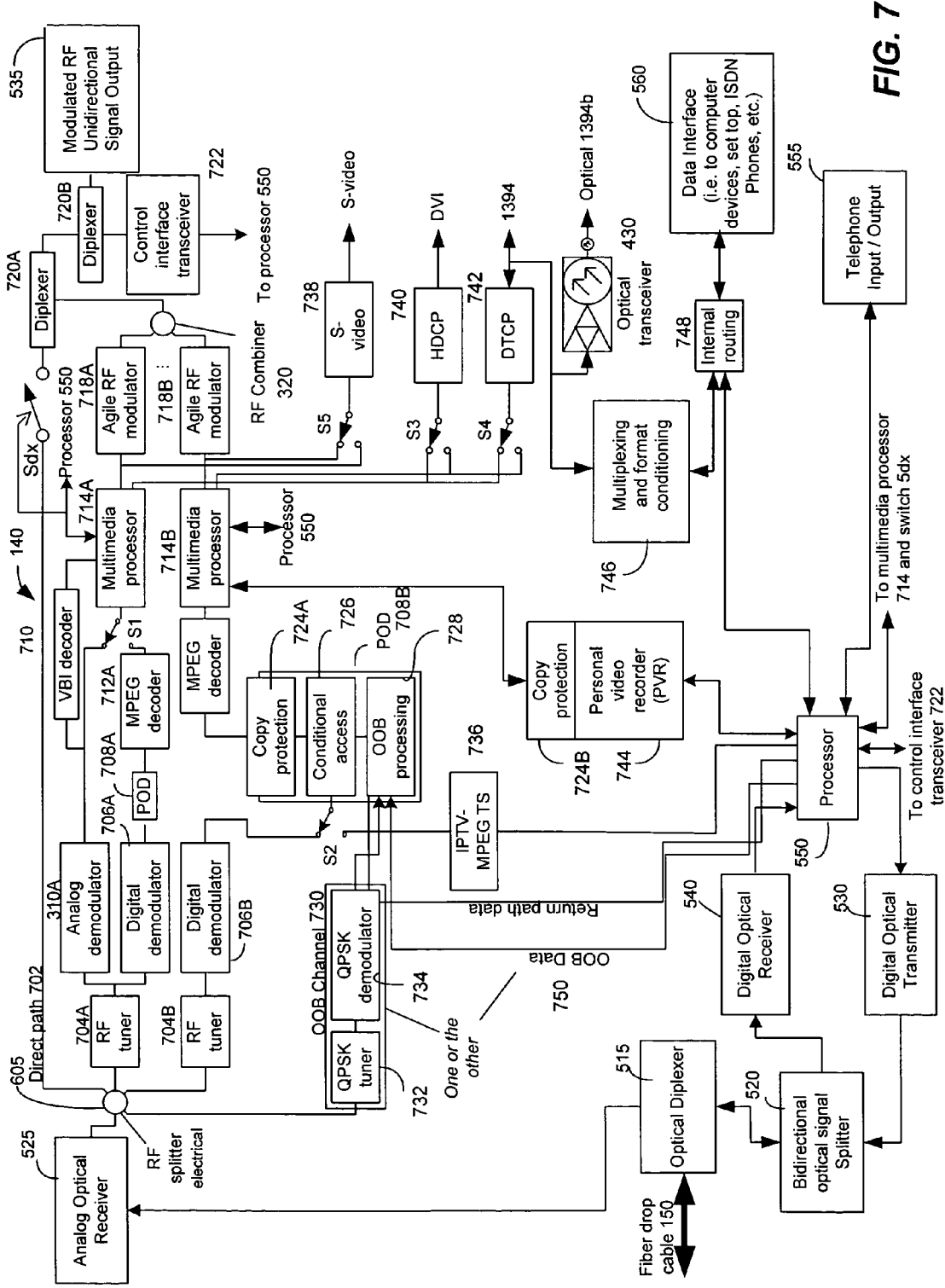
FIG. 7 is a functional block diagram illustrating a several exemplary components that may be contained in the subscriber optical interface according to one exemplary embodiment of the present invention.

Referring now to FIG. 7, this Figure is a functional block diagram illustrating a several additional exemplary components that may be contained in the subscriber optical interface 140 according to one preferred and exemplary embodiment of the present invention. From analog optical receiver 525, the modulated RF signals may be split along several paths of which three are shown by way of example but not limitation. The splitting is performed in an electrical RF splitter 605 that can split or divide the RF signals. The top direct path 702 is for signals that are to be tuned directly by the TV set 117. As of this writing, these signals are standard analog-modulated TV signals according to the NTSC standard in North America, and according to either the PAL or SECAM standards in other countries. These standards are well known to those skilled in the art.

These signals are supplied directly to the TV set(s) 117 by way of diplexers 720A and 720B. The functionality of these two diplexers 720A, 720B will be described below, where a plurality of embodiments will be shown. The signals are output to the TV set(s) 117 through the Modulated Signal Output 535. (In rare cases a set top terminal, STT, may be used at the TV 117, but in general, this invention removes the need for a conventional STT.)

The second signal path is supplied to an RF tuner 704A, which converts the modulated RF signal to baseband for further processing. The tuner 704A may be used for either analog-modulated or digital-modulated RF signals as is understood by those skilled in the art. Analog-modulated signals are demodulated in analog demodulator 310A. The main reason why an analog signal may be modulated at this point is if it is to be displayed on a TV 117 that is not capable of tuning the channel in question. Another reason would be if it is desired to display the channel on a display, such as a home theater, that is connected via a digital interface and does not have an RF tuner associated with it.

The demodulated analog signal from analog demodulator 310A is supplied to a VBI decoder 710, which is used to recover VBI data such as closed captioning information, well known to those skilled in the art. This data is used primarily to add captioning for hearing impaired viewers. The VBI decoder 710 recovers the VBI data and supplies it to a multimedia processor 714A that can add the closed captioning information to the programming signal. The multimedia processor 714A is also capable of adding text and graphics to the video signal, among other tasks. It is also connected to processor 550, and can be used to supply messages to viewers in the form of on-screen text and graphics as will be described below.

From the multimedia processor 714A, the signal is supplied to an agile RF modulator 718A, another component well known to those skilled in the art. It modulates the video and audio signals onto an RF carrier for transmission to the TV set 117.

The signal from RF tuner 704A may also go to digital demodulator 706A, which is used in place of analog demodulator 310A if the tuned signal is digitally modulated. From the digital demodulator 706A, the signal may be supplied to a POD 708A, or Point of Deployment module 708A. This module 708A can descramble a signal if it is transmitted scrambled over the fiber optic plant. The inner functionality of the POD module 708A is shown for POD module 708B, and will be explained below. A POD module is also known commercially as a CableCard.

The descrambled digital signal from POD module 708A can be passed to an MPEG decoder 712A that can recover an analog picture from the digital signal. Alternatively, it can output an MPEG-decoded digital signal ready to have any overlay information added in the multimedia processor 714A and passed through to a digital display output such as the DVI interface (HDCP) 740. As another option, the video signal can be outputted to an S-video interface 738. Further details of the S-Video interface will be described below with respect to FIG. 19. Finally, the MPEG decoder 712A may do nothing except to pass through the MPEG encoded signal, if that signal is to be delivered on an interface designed to accommodate MPEG signals to the display device. Such an output is the DTCP 742 and 1394 interface. These output types are understood by those skilled in the art, and will be explained more fully below.

To explain in more detail, Cable Television Laboratories (CableLabs), has specified standard interfaces between a host device, which the Subscriber Optical Interface 140 is acting as in this case, and a display device such as a TV. The Open-Cable™ Host Device core Functional Requirements document, OC-SP-HOST-CFR-I11-021126, calls for analog and two (including HDTV) types of digital video connections. The first digital interface is the DVI interface 740, specified as applying only for a high definition display.

The high definition display requires the compressed MPEG signal to be decompressed and converted to video components by the host device, in this case, the Subscriber Optical Interface 140. This requirement includes the requirement to verify the display device to show that it is permitted to display the output, and then to encrypt the display data so that it cannot be supplied to any other devices. This specification requires that the multimedia processor 714 to add any graphic elements to the video. The interface is called the DVI interface, and the verification and encryption is called HDCP.

The other digital video interface is called 1394, after the IEEE specification used for communications. The corresponding verification and encryption system is known as DTCP 742. This interface 1394 is transmitted in MPEG compressed format, relying on the using device, such as a TV or VCR, to decompress the video. This specification also allows for transmission of a separate graphic to overlay the video, relying on the TV to merge the overlay with the picture.

Thus, MPEG decoder 712A and multimedia processor 714A are not needed for output material intended for output on the 1394/DTCP output 742, but they are required for material intended for output on the DVI/HDCP output 740. They also would be required for output on any analog outputs, such as that going to an agile RF modulator 718A. (Other analog outputs such as composite and YPrPb are not shown, but are within the scope of the invention. They are well known to those skilled in the art.) The output going to the multiplexing and format conditioning 746 is video and audio display data that is to be delivered over a data path, such as data interface 560. This is possible and is within the scope of the instant invention, but as of this writing, there are no industry standards for doing so.

A second RF tuner 704B is illustrated and is intended to allow the Subscriber Optical Interface 140 to serve two or more TVs simultaneously, one being served via tuner 704A and one being served by tuner 704B. Yet another one or more TVs can be served directly via the direct path 702. Furthermore, more than two RF tuners 704 may be used. It is possible to provide some tuners 704 built into the Subscriber Optical Interface 140, and to provide provisions for additional tuners 704 and associated components to be plugged in for those subscribers demanding more service.

The second tuner 704B is connected to a second digital demodulator 706B. It could also be connected to another analog demodulator 310A. However, in most instances, few analog signals would be handled on other than the direct path 702, so it is generally not necessary to provide for a lot of analog demodulators 310A. The output of digital demodulator 706B is supplied to a second POD module 708B.

This second module 708B is identical to POD module 708A described above. The POD module 708B is defined in the specifications OpenCable™ POD Copy Protection System, OC-SP-PODCP-IF-I08-021126 and OpenCable™ Host-POD Interface Specification, OC-SP-HOSTPOD-IF-I11-021126, well known to those skilled in the art. The purpose of the POD modules 708 is to provide for communications between the Subscriber Optical Interface 140 and control systems located at the data service hub 110. It also provides descrambling of the incoming digital modulated signal when it is scrambled, and handles copy protection for the descrambled MPEG signal it passes to the remainder of the Subscriber Optical Interface 140.

The POD module 708B comprises an out-of-band (OOB) processing submodule 728 that handles communications between the data service hub 110 and the Subscriber Optical Interface 140. This is done via the OOB channel 730. The OOB channel 730 comprises QPSK tuner 732 and QPSK demodulator 734. These components recover downstream control information transmitted according to one of two SCTE specifications, SCTE-167 or SCTE 178. These specifications are well known to those skilled in the art, and prescribe ways to transmit control data to set top terminals, STTs. The same control channel can transmit control data to the Subscriber Optical Interface 140 in the instant invention.

The two SCTE specifications also prescribe upstream communications paths that are not practical in FTTH systems such as the instant system. Rather, upstream communications may be effected or achieved by putting the upstream data in packets and sending them back to the data service hub 110 on the normal data path. At the data service hub 110 the data packets are converted to RF signals for delivery to the control system. A similar technology is taught in the commonly-owned application, entitled, "Method and System for Providing a Return Path for Signals Generated by Legacy Terminals in an Optical Network," Non-provisional patent application Ser. No. 10/041,299. For these communications to take place, the return data path 752 from the OOB processing module 728 to processor 550 is utilized. There is no need in the instant invention to actually generate the RF signal at the Subscriber Optical Interface 140.

Besides the OOB processing submodule 728, the POD module comprises a conditional access module 726, which handles authorization of reception of individual channels and programs, including descrambling the signal transmitted over the fiber. Finally, the second POD module 708B also comprises copy protection module 724A, which verifies that the POD module 708B is plugged into an acceptable host (in this case the Subscriber Optical Interface 140), and which encrypts the video at its output to prevent unauthorized detection of the output. All of this is described in the document, OpenCable™ HOST-POD Interface Specification, cited above.

Operation of the signal flow from second POD module 708B is identical to that described above for the first POD module 708A. Additional signal chains may be added as desired.

In addition to the delivery of broadcast material over RF carriers as described above, it is possible within the scope of the invention to deliver video over Internet Protocol, or IPTV (Internet protocol television). This may be accommodated by transmitting packets of encoded video and audio information via digital optical receiver 540, with the required upstream signals going through digital optical transmitter 530. FIG. 7 shows the IP video and audio packets coming through processor 550 and to IPTV-MPEG TS (transmit stream) converter 736.

This converter 736 makes the IPTV packets look the same as packets transmitted via the RF modulated path described above. Switch S2 selects the input to the POD module 708B, which input may either be from digital demodulator 706B or from the processor 550. Again, more than one POD module 708 may be connected to receive inputs from either source.

Data being delivered to the subscriber via data interface 560 comes through processor 550 as described above in FIG. 5. It is possible to deliver video to the home via the data interface 560, and this is accommodated via router 748, which combines data from processor 550 with video and audio data from multiplexing and format conditioning block 746. This conditioning block 746 can be used to make sure the video and audio data is in the proper format, and is routed to the proper device inside the home. Remote control information may be transmitted via data interface 560, or it may be transmitted via the transmission methods taught below.

Switch Sdx is a service disconnect switch that can be used to deny basic analog programming to the subscriber if he has not ordered it, or if he has not paid his bill. Switch Sdx is actuated by processor 550 in response to signals sent from the data service hub 110. It may also be used to enforce a start-up mode in the case where a new subscriber moves to a dwelling which features this Subscriber Optical Interface 140. For example, it may be that a new subdivision has put Subscriber Optical Interfaces 140 at every house. When the subscriber moves in, he can only receive one channel on his TV because switch Sdx is open, and because no signals are being processed in the Subscriber Optical Interface 140. But processor 550 may be programmed to work such that when the subscriber turns on his TV and uses his remote control hand-held unit 103, all he receives are instructions on his TV to put in his credit card information, which he does by pressing the appropriate buttons on his remote control hand-held unit 103.

The subscriber can also be presented a menu of services from which he can select those he wishes to purchase. When the subscriber makes his selections, the information is relayed from processor 550 to the data service hub 110, where the subscriber is authorized to receive service. The data service hub 110 then notifies the processor 550 of the acceptance of the subscriber's credit card and service request. Processor 550 can then turn on switch Sdx to allow analog TV broadcasts and can permit such other requested services as the subscriber has ordered.

Most of the functionality of the expanded Subscriber Optical Interface 140 has been addressed, but additional discussion is needed on possible output of the SOI 140. For many applications, the most satisfactory way to send recovered signals from the Subscriber Optical Interface 140 to the subscriber's TV set(s) is by modulating them on an RF carrier using an RF agile modulator 718. The word "agile" means that the modulator may be tuned to different frequencies, or channels, under control of processor 550. The use of this feature will become apparent in the descriptions below.

In a few cases it may be beneficial to not use agile modulators, but rather to use fixed frequency modulators. But in the more general case, it is useful to have agile modulators.

Since tuning and other program selection functions are performed in the Subscriber Optical Interface 140, it is necessary to send signals from each TV location to the Subscriber Optical Interface 140, in order to effect these functions. This is accomplished via diplexer 720B and control interface transceiver 722.

Coupling signals between the Subscriber Optical Interface 140 and the subscriber's TV set(s) 117 will now be described. These teachings involve various configurations for diplexer 720A which controls the TV channels transmitted via direct path 702 and the RF modulators 718. The teachings also involve diplexer 720B, which determines frequencies used for all TV channels and those used for control signals to and from control interface transceiver 722. Those skilled in the art understand that diplexers 720 may comprise diplex filters are used to separate different frequency bands of signals, routing them in different directions. The diplex filter 720 also provides filtering, or removal, of incoming signals at frequencies that are not intended to pass through the diplex filter 720.

When an RF agile modulator 718 is used to deliver signals to the home, it is important to provide for stereo audio modulation. This may be done by building in a low cost DSP-based stereo encoder, which is known to those skilled in the art. The encoder is not needed so long as the original signal comes from an analog source and if the audio is not demodulated below the sum, difference and pilot carrier level. Preferably, though, the audio signal may be handled at its intercarrier frequency, 4.5 MHz in North America. These issues are known to those skilled in the art.

When the signal arrives in any digital form, the stereo-encoded signal is not normally available and must be generated in the modulator 718. The process may be simplified somewhat by pre-encoding in the data service hub 110, and transmitting the pre-encoded components. These pre-encoded component include the sum signal and the compounded difference signal. This technique is known to those skilled in the art.

Exemplary Remote Control 103A and Control Interface 108A

Referring now to FIG. 8A, this Figure is a functional block diagram illustrating an infrared control interface 108A and an infrared remote control 103A according to one exemplary embodiment of the present invention. The control interface 108A may comprise an IR transmitter 806, and IR receiver 808, a controller 804, an IR repeater transceiver 802, and a diplexer 720C.

The remote control handheld unit 103 can comprise a modification of a conventional remote control handheld unit. As with common remote controls, it transmits a signal to the TV 117, usually using infrared (IR) transmission 813C. Other forms of transmission are possible and known to those skilled in the art. These include supersonic sound and RF signals. Other wireless mediums and wire-based systems are not beyond the scope and spirit of the present invention. The remote control 103 transmits channel tuning and volume control commands to the TV, in addition to other commands as provided for by the TV manufacturer. In the instant invention, the remote control handheld unit 103 also transmits signals to, and receives signals from, the control interface 108. These signals may be transmitted using the same transmission technique used to transmit to the TV. As shown in FIG. 8A, IR transmissions 813B to the control interface 108 are received on IR receiver 808.

Transmission 813B to the handheld unit 103 are transmitted by IR transmitter 806. Both IR transmitter 806 and IR receiver 808 are connected to controller 804. The function of the controller 804 and IR repeater transceiver 802 is to modulate the IR commands onto an RF carrier at the frequency used for remote control communications, 10.7 MHz in the exemplary embodiment. It also receives communications from the control interface transceiver 802 on the same frequency, and sends them as IR signals to the remote control 103, by way of IR transmitter 816. In addition, controller 804 must switch communications between the two directions, and it must arbitrate occasional collisions as described below. All of these functions are understood by those skilled in the art.

Referring now to FIG. 8B, this Figure is a frequency spectrum diagram illustrating responses of the diplexer 720C that may be part of a control interface 108A according to the exemplary embodiment illustrated in FIG. 8A. The frequency spectrum diagram shows that frequencies below a certain frequency are transmitted through diplexer 720C. These signals are called "video transmitted through" 810, and propagate through direct path 702 of FIG. 7. These signals may be tuned by the TV 117. Video inserted at the Subscriber Optical Interface 140 occupies the high side of diplexer 720C, shown as 814. As taught above, video inserts may be any program that is processed through RF tuners 704 of FIG. 7 or which comes through the IPTV path through IPTV to MPEG TS converter 736.

This may include analog programs that also come through direct path 702 if the subscriber so desires. It may be that the subscriber desires analog programs delivered this way because a particular TV set cannot tune to all the analog modulated channels being used. Another reason for having analog signals delivered this way is to allow the addition of graphics overlays, inserted by multimedia processor 714A. One reason for having graphics added is to take advantage of closed captioning data on older TVs that don't have closed captioning decoders built in. Another reason would be for added benefits. For example, when the phone rings, it is possible to have multimedia processor 714 put caller identification (number and/or name of caller) on the TV screen, so the viewer may decide whether to answer the phone. In some later embodiments of the invention, it is possible to use the remote control as a telephone instrument, as taught below. These and other applications involving other video sources are taught below.

FIG. 8B also illustrates the use of frequencies toward the high end of the UHF band for transmission of signals from the Subscriber Optical Interface 140 to the TV(s) 117. All TVs 117 sold in North America are usually required to tune up to at least Channel 69 off-air (800-806 MHz). Thus, each TV 117 may be expected to be able to tune to signals transmitted from agile RF modulators 718, so long as the frequency of the modulator 718 doesn't exceed this channel. Those skilled in the art know that it is common practice in cable TV networks to transmit analog modulated TV programs, in which all TVs can tune without STTs or any other equipment, at frequencies up to about 550 MHz.

Cable TV systems usually transmit digital modulated channels, which will require the Subscriber Optical Interface 140 to convert to analog signals. Since the digital signals above 550 MHz cannot be consumed directly by the subscriber's TVs 117, it is possible to filter or remove those signals, and to use the frequency band between 550 MHz and channel 69 off-air, to insert signals generated by agile RF modulators 718.

Referring now to FIG. 8C, this Figure is a functional block diagram illustrating a diplexer 720C that may be part of the control interface 108A illustrated in FIG. 8A. This diplex filter 720C operates in conjunction with diplex filter 720B in the Subscriber Optical Interface 140 (See FIG. 7), to couple remote control signals to the control interface transceiver 722, and from there to the processor 550 (and to couple control signals in the opposite direction, as described below). The diplexer 720C may comprise a bandstop function 816 that can prevent signals from passing through to the TV 117 at the frequency used for remote control communications. A preferred frequency for this function is 10.7 MHz, a frequency at which many low cost components are built. This is a standard intermediate frequency for FM receivers. Other suitable frequencies range from 5 MHz to 50 MHz.

The other section of diplex filter 720C may comprise a bandpass filter 818, which couples the frequency used for remote control communications to the RF signal line 610. It is tuned to the same frequency as is the bandstop section 816.

Referring now to FIG. 8D, this Figure is a circuit diagram illustrating exemplary components of the diplexer 720C illustrated in FIG. 8C. This diagram, and variations of it, are well known to those skilled in the art. According to this diagram, the bandstop filter 816 may comprise an inductor L2 connected in parallel with a capacitor C2. The Bandpass filter 818 can comprise an inductor L1 in series with a capacitor. The Diplex filter 720C is similar or identical to the diplex filter 720B in the subscriber optical interface 140.

Exemplary Control Interface 108B with Block Converter 900

Figures 9A, 9B:
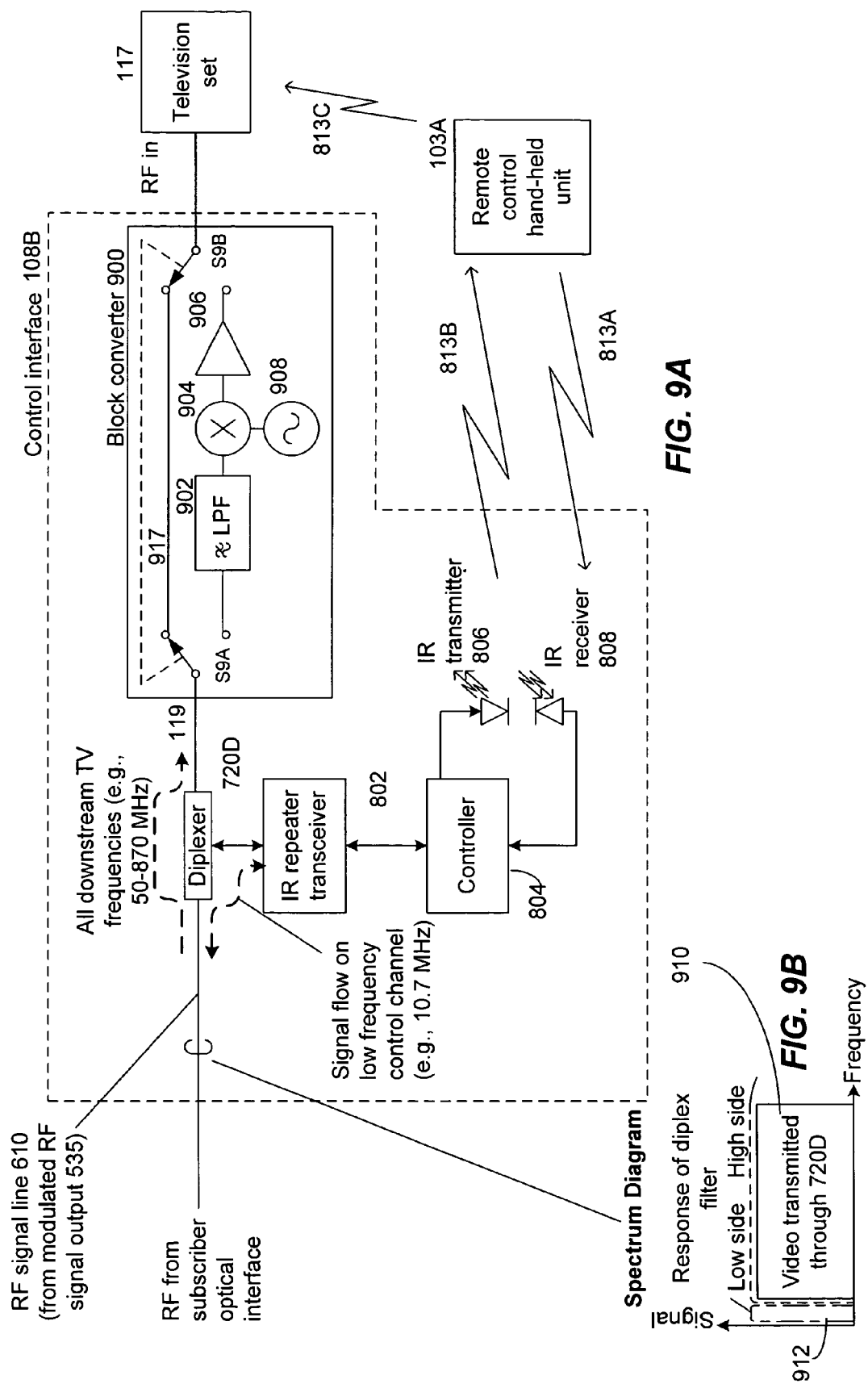
FIG. 9A is a functional block diagram illustrating an infrared control interface and an infrared remote controller according to another exemplary embodiment of the present invention.
FIG. 9B is a frequency spectrum diagram illustrating responses of a diplexer that may be part of a control interface according to the exemplary embodiment illustrated in FIG. 9A.

Referring now to FIG. 9A, this Figure is a functional block diagram illustrating an infrared control interface 108B and an infrared remote controller 103A according to another exemplary embodiment of the present invention. FIG. 9A is similar to FIG. 8A, so only the differences between these two Figures will be discussed below.

The diplex filter 720D cuts off below 54 MHz where this part of the spectrum is used to transmit signals processed in Subscriber Optical Interface 140. Agile RF Modulators 718 of the SOI 140 can output signals in this spectrum. For example, one channel could be transmitted in the frequency band 34-40 MHz. Another channel could be transmitted in the frequency band 28-34 MHz, and another could be transmitted from 22-28 MHz.

Because these channels cannot be tuned by a normal TV 117, it is necessary to include a block converter 900 within the control interface 108B. The block converter 900 is known to those skilled in the art. It can comprise switches S9A and S9B, which remove the block converter 900 from the signal path when the TV 117 is tuning an analog channel coming in on RF signal line 119. The switches S9A, SB under control of controller 804, which must be aware of commands coming from the Subscriber Optical Interface 140.

The block converter 900 also comprises a low pass filter (LPF) 902, which removes signals above 40 MHz (in the example) before they reach mixer 904. Those skilled in the art understand that if such signals reach mixer 904, they could produce undesired image responses, which will interfere with the desired signals. Furthermore, the block converter 900 comprises a mixer 904 and a local oscillator 908, which convert the block of frequencies containing the channels generated in the Subscriber Optical Interface 140, from their frequency range that cannot be tuned, to a frequency range that can be tuned. By way of example, suppose the frequency range from 22-40 MHz is used to transport three channels from the Subscriber Optical Interface 140 to the TV 117. This band could be converted to 54-72 MHz, which can be tuned by any TV, as channels 2, 3, and 4.

To effect this conversion would require a local oscillator 908 frequency of 94 MHz. The mixer then supplies the difference frequency between the input and the local oscillator. The mathematical equation is $$f_{out} = f_{LO} - f_{in}.$$

With $f_{LO}$=94 MHz, and $f_{in}$=22 MHz, $$f_{out} = 94 - 22 = 72 \text{ MHz}.$$

Similarly, for $f_{LO}$=94 MHz and $f_{in}$=40 MHz, $$f_{out} = 94 - 40 = 54 \text{ MHz}.$$

As is understood by those skilled in the art, the frequency spectrum is inverted, meaning that a lower frequency on the input is a higher frequency on the output. This is not a problem so long as the agile RF modulators 718 are configured to put out an inverted, or reversed, spectrum. Those skilled in the art understand how to do this.

The block converter 900 may comprise an amplifier 906 used to amplify or increase the strength of the signal. As is understood by those skilled in the art, the mixing process in mixer 904 can reduce the signal amplitude. When a channel is selected that is to be processed by the Subscriber Optical Interface 140, switches S9A and S9B are thrown to the down position, enabling the block converter 900 to convert the signals originated in the Subscriber Optical Interface 140, to a channel that the TV 117 can receive. At all other times, when the TV 117 is receiving a signal that is passed through direct path 702 in the Subscriber Optical Interface 140, the switches S9A & S9B are in the up position, permitting signal to take path 917 directly to the TV. Controller 804 must monitor the communications back and forth between the processor 550 in the Subscriber Optical Interface 104, and the remote control handheld unit 103, so that it will know when to set switch S9A and S9B to one position or the other.

Referring now to FIG. 9B, this Figure is a frequency spectrum diagram illustrating responses of a diplexer 720D that may be part of a control interface 108B according to the exemplary embodiment illustrated in FIG. 9A. FIGS. 9B illustrates an alternative way to transmit signals from the Subscriber Optical Interface 140 to the TV 117. According to this exemplary embodiment, the signals are transmitted in the low frequency band 912, below the 54 MHz spectrum that is normally not used for TV signal transmission. As shown in FIG. 9B, diplex filter 720D allows the entire downstream band 910 of 54 to 870 MHz, to pass through.

Exemplary Control Interface 108C with RF Link to Remote Control 103B

Figure 10A:
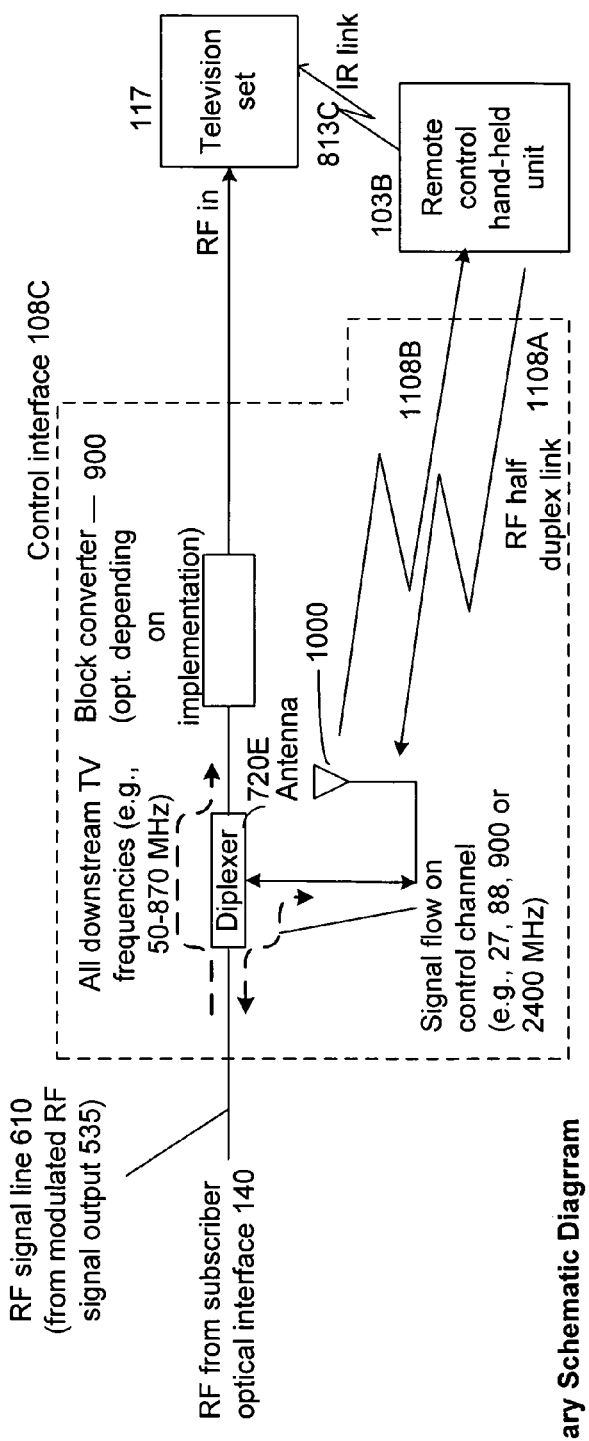
FIG. 10A is a functional block diagram illustrating an RF control interface and an RF remote controller according to a further exemplary embodiment of the present invention.

Referring now to FIG. 10A, this Figure is a functional block diagram illustrating an RF control interface 108C and an RF remote control 103B according to a further exemplary embodiment of the present invention. FIG. 10A is similar to FIG. 8A, so only the differences between these two Figures will be discussed below.

The Remote Control Handheld Unit 103 according to this exemplary embodiment has an RF transmitter and receiver built into it, so the link to the control interface 108 comprises RF signals rather than infrared signals. The link to the TV 117 is still an IR link, as it is necessary to maintain compatibility with existing TVs that use IR links. The block converter 900 is shown as an option, as it is possible to use the RF link with the configuration of FIGS. 9A-9B. However, using the RF link of FIGS. 10A-10B with the signal configuration of FIGS. 8A-8D is particularly advantageous, as the control interface 108 does not have to be powered. It may be a small box hidden behind the TV set and in line with the incoming RF signal line 119.

Figure 10B:
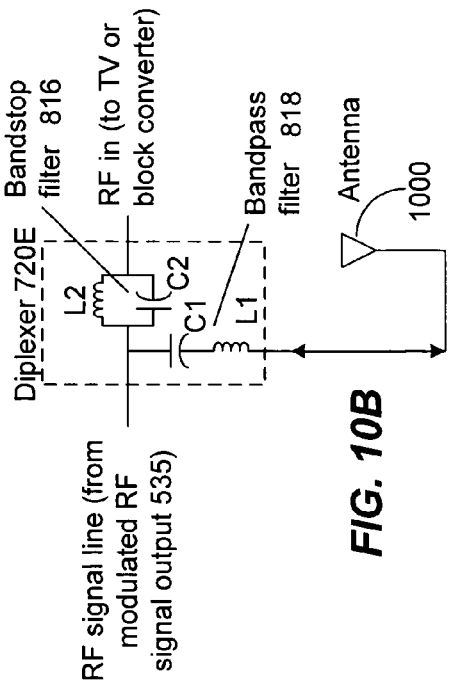
FIG. 10B is a circuit diagram illustrating exemplary components of the diplexer illustrated in FIG. 10A.

Referring now to FIG. 10B, this Figure is a circuit diagram illustrating exemplary components of the diplexer 720E illustrated in FIG. 10A. This exemplary schematic diagram shows the diplexer 720E to comprise only a parallel bandstop filter L2-C2 in series with the signal path, and a bandpass filter L1-C1, connected to antenna 1000. The controller function 804 has been moved to within the remote control handheld unit 103. The IR repeater transceiver 802 becomes an RF transmitter and receiver located within the remote control handheld unit 103. The IR transmitter and receiver 816 and 808 are effectively moved to within the remote control handheld unit 103 in this embodiment.

Figure 11:
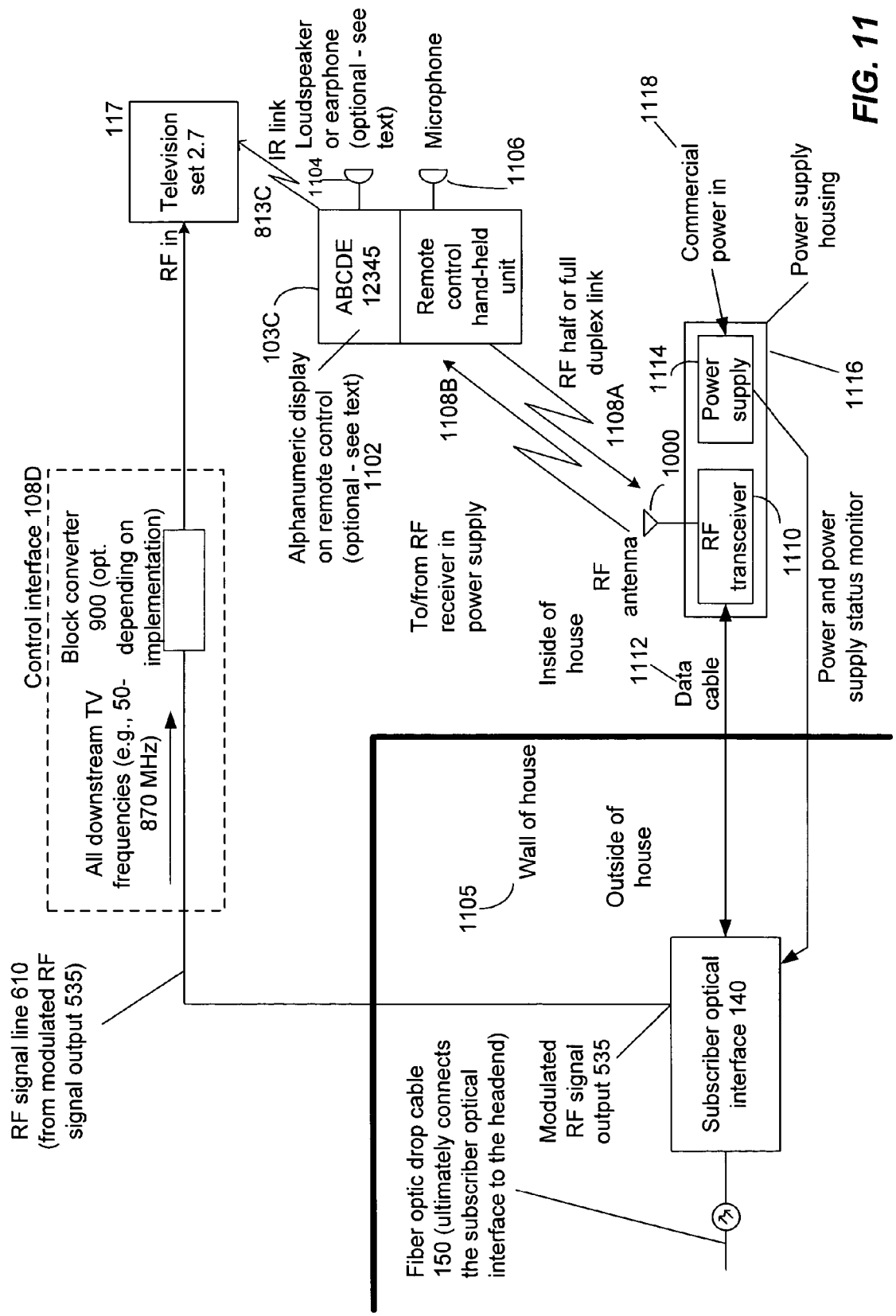
FIG. 11 is a functional block diagram illustrating a control interface, an RF remote controller, and an RF transceiver contained within a power supply housing according to a another exemplary embodiment of the present invention.

Referring now to FIG. 11, this Figure is a functional block diagram illustrating a control interface 108D, an RF remote controller 103C, and an RF transceiver 1110 contained within a power supply housing 1116 according to a another exemplary embodiment of the present invention. This exemplary embodiment illustrates a direct wireless connection from the remote control hand-held unit 103 to the Subscriber Optical Interface 140. According to this exemplary embodiment, the remote control 103C can be provided with additional features such as an alphanumeric display 1102, a microphone 1106, and loudspeaker or earphone 1104. Further details of these additional features will be discussed more fully below in a section entitled, "Additional Services and Features with the SOI 140 and Remote Control 103."

The wireless interface of FIG. 11 needs more output RF power in this particular embodiment because it must work over a longer distance. Because the Subscriber Optical Interface 140 is normally mounted on the outside of a home, and because some materials used to construct outside walls tend to block RF signals, the RF transceiver 1110, which takes the place of control interface transceiver 722 of FIG. 7, may be located within the power supply housing 1116. It is common to locate the power supply inside the dwelling rather than on the outside, because it is easier to get commercial power to it.

Also, power supplies for this purpose often have batteries in them to provide standby operation when commercial power fails. These batteries perform better if located inside the house. However, if the power supply is located on the outside of the dwelling, it is still possible to put the RF transceiver 1110 and the antenna 1000 inside, in their own housing.

By locating the RF transceiver 1110 in the power supply housing 1116, the transceiver 1110 may be located inside, so that the signal doesn't have to penetrate the exterior wall of the house 1105. The RF antenna 1000 is located at the power supply housing 1116. Signals are sent from the remote control hand-held unit 103 to the RF antenna 1000 and from the RF antenna to the remote control hand-held unit 103C. Several standards are candidates for use as a communications protocol, and these are well known to those skilled in the art. For example, the IEEE 802.11 (popularly known as Wi-Fi) in its several known forms is a good candidate to use. It is fast enough to offer the needed services, and is popular, ensuring the availability of low cost components to implement it. A higher powered version of Bluetooth is also a possibility. Several other standards are known to those skilled in the art and are not beyond the scope and spirit of the present invention.

The Data cable 1112 carries the data between the power supply housing 1116 and the Subscriber Optical Interface 140. If some processing is included in the RF transceiver 1110, the data cable 1112 can carry Ethernet signals or similar signals. If processing is not included in RF transceiver 1110, the data cable 1112 can carry raw data flowing in each direction. Communications at RF and in the data cable may be half duplex, in which case data flows in one direction for a while, and is then shut down to allow data to flow in the opposite direction. It may also be sent in a full duplex mode, in which data flows simultaneously in both directions.

It is also possible to locate the antenna 1000 in power supply housing 1116, and to use a coaxial cable at 1112 to connect the antenna 1000 to the RF transceiver 1110 located in the subscriber optical interface 140. The communications to control TV tuning can take place as taught above, with the exception of the use of the over-the-air RF path. Several additional services not taught earlier may be added. These are practical with the communications paths taught above provided that the speed is fast enough. Due to the higher speed of an 802.11 interface, these services become quite practical. They will be taught below.

Contention Issues Among Remote Control Units 103

In any of the systems illustrated in FIGS. 8-11 and discussed above, it is possible for more than one handheld remote control unit 103 to try to transmit at the same time. Each unit 103 will not be able to receive signals from any other unit. Thus, a protocol must be chosen that works in this case. One such family of protocols is often known as "aloha." In aloha protocols, a handheld remote control unit 103 will transmit then wait for an acknowledgement. If it does not get one in a predetermined time, it waits a random time then transmits again.

Control of Television Tuning Functions

How the system works to allow the subscriber convenient control over functions taking place in the Subscriber Optical Interface 140 will now be described. It is understood that any reference to the remote control unit 103 sending a command to the Subscriber Optical Interface 140, that the communications path used can be from the remote control handheld unit 103 through IR receiver 808, controller 804, IR repeater transceiver 802, diplexer 720, back through the modulated RF signal output 535, through diplexer 720B, control interface transceiver 722, and to processor 550.

In most cases, processor 550 makes the decision of what to do with the command, based on the command, what it knows of the equipment involved, and other inputs that may be available to it. In some cases it may communicate with systems further upstream to get information and instructions. Commands and other responses flow back to the remote control handheld unit 103. On the other hand, if an RF path is used such as in FIGS. 10A-11B, the signal flow is modified, but the end points (remote control hand-held unit 103 and processor 550) are the same.

The Subscriber Optical Interface 140 will be referred to as responding, in which case it is understood that the above events are taking place. In many cases, the remote control handheld unit 103 will then act as a relay, transmitting commands to the TV 117. The remote control handheld unit 103 is uniquely identified to the processor 550. This unique identification is handled in any of a number of known manners of establishing identification.

The most common method it for the manufacturer of the remote control handheld unit 103 to assign a MAC address to each unit at the time of manufacturer. Yet another MAC address may be assigned to the Subscriber Optical Interface 140 for the purpose of identifying it to the remote control hand-held unit 103. Yet another satisfactory method of identification is the automatic building of a logical tree structure that is practiced in IEEE 1394 systems, in which the devices automatically discover what device(s) is/are attached to what other device(s), and agree on a logical structure with every device assigned a unique identification within that tree structure.

Remote Control Discovery

It is useful that when a new device, such as a new remote control hand-held unit 103 is added by the subscriber, that the appropriate Subscriber Optical Interface 140 become aware that it is present, and learn the remote control codes for the TV and other devices it will control. One way to achieve this is for the Subscriber Optical Interface 140 to send out periodic query messages that are relayed by all control interfaces 108 connected to that Subscriber Optical Interface 140. Any remote control hand-held unit 103 that has not been registered with the Subscriber Optical Interface 140 responds, informing the Subscriber Optical Interface 140 of its presence. The Subscriber Optical Interface 140 then proceeds to assign the remote control hand-held unit 103 a unique identifier analogous to a temporarily-assigned IP address.

Next, the Subscriber Optical Interface 140 should know some degree of the capabilities of the TV 117 and other devices (such as a recorder 119 like a VCR and a stereo system) that the remote control hand-held unit 103 is going to control. For example, it needs to know the remote control codes used for the TV 117 and other devices with which that remote control hand-held unit 103 is to be used. The SOI 140 should also know the highest channel to which the TV 117 or other device can tune, because if the subscriber calls for a channel number exceeding this, the Subscriber Optical Interface 140 is will need to tune the channel for the TV 117, even if the signal is a simple, unscrambled analog signal. This information may be ascertained in several ways, which are discussed below.

It is useful to also have a unique identifier assigned to each control interface 108 as well, as this will allow a subscriber to carry one remote control hand-held unit 103 from room to room, and in each, the Subscriber Optical Interface 140 will know the capabilities of the TV.

TV Remote Control Codes

Each different brand of TV 117 has its own remote control code set, and sometimes a brand will have several different sets of remote control codes, depending on when the TV 117 was made. It is known to build universal remote controls, wherein a plurality of remote control codes, for many different TVs 117, recorders 119 like VCRs and other devices, may be stored in the remote control 103 itself. Several algorithms have been developed to allow the subscriber to select the proper remote control code for his particular devices (TV 117, recorder 119, etc.). Storing all possible remote control codes in the remote control hand-held unit 103 could be done according to one exemplary embodiment, but it is also possible to store the plurality of remote control codes in the Subscriber Optical Interface 140, since it has a processor 550 with memory that can be useful for storing remote control codes.

Since typical homes have multiple TV sets, it is expected that most homes will use more than one remote control hand-held unit 103. Keeping the cost of the remote control hand-held unit 103 low is important, so if the storage of remote control codes can be moved back to the Subscriber Optical Interface 140, then the remote control codes need be stored only once for each household. This can save money in the remote control hand-held unit 103, because it will likely need less memory.

Furthermore, it is not necessary to store all remote control codes in the Subscriber Optical Interface 140. Since a wideband data channel is available back to the data service hub 110, it is possible to store remote control codes only at the data service hub 110. Here it is possible to maintain an up-to-date database of all remote control codes. Thus, if a TV manufacturer introduces a new set of codes, they can be incorporated immediately without having to update all devices in the field. This will reduce storage requirements at the Subscriber Optical Interface 140 to just those codes in use at a particular house.

Also, if the Subscriber Optical Interface 140 is involved in the remote control process, a more subscriber-friendly algorithm may be used to guide the subscriber through setting up the remote control codes needed. A common method now is to publish a booklet listing all brands of TVs, VCRs and other consumer devices. The subscriber looks up his brand and enters a code into the remote control. In the instant invention, it is possible to use the multimedia processor 714 to display interactive instructions on the consumer's TV.

The customer can tune to a default channel first, since at this point in the process, the remote control hand-held unit 103 doesn't know how to control his TV. Since the handheld remote control unit 103 knows it doesn't have a remote control code set, it can interpret, for example, the push of a menu button as being the command to put the subscriber optical interface 140 in a mode to set up one set of entertainment equipment. The operator can publish simple instructions telling the subscriber how to manually tune hi TV in order to get the instructions.

Once the subscriber has tuned the TV 117 to the default channel, he may be asked to highlight his brand of TV from a list on the screen (more than one page might be necessary to list all TV brands). He highlights the brand and pushes a "select" button. If necessary, a second layer of questions can be posed. Or the TV may be operated on by the remote control code to make sure it is responding. For example, it could be tuned to a different unused channel, where the subscriber is asked to press a button confirming that the TV did indeed tune properly.

The questions can then continue, asking him to identify his VCR at that location, and any other equipment he will control with the remote control hand-held unit 103. Not only can visual prompts on the TV 117 screen be used, but also audio prompts can be used, utilizing the TV's loudspeaker. Voice can be synthesized at the data service hub 110 if desired, and transmitted to the Subscriber Optical Interface 140 either on the data path or on the broadcast path. If a loudspeaker or earphone is supplied on the remote control hand-held unit 103 as taught below, then it can deliver audible instructions.

It is even possible to set up the remote control hand-held unit 103 such that it transmits more than one remote control code each time it is required to change a setting on the TV set 117. This way, if a subscriber has several TVs of different brands, he can set the remote control codes such that each remote control hand-held unit 103 transmits the same command to all of his TVs every time. This way, a person can walk from room to room carrying one remote control hand-held unit 103, and it will control whatever TV 117 and other equipment is located in that room.

Identification of Handheld Remote Controls

In view of FIGS. 8A-11A, it is apparent that all functions currently performed in set top terminals may be performed in the Subscriber Optical Interface 140, by relaying remote control button pushes to the Subscriber Optical Interface 140. It is possible to use either the remote control hand-held unit 103 or the control interface 108 to couple or associate the program request to the Subscriber Optical Interface 140. That is, it is not necessary for the Subscriber Optical Interface 140 to know the location of the TV requesting data, but it is necessary to know, when a new request comes in, which current set-up (channel being watched, etc.) is to be replaced with the new request. For example, suppose TV 117*a* is watching channel 256 and TV 117*b* is watching channel 193. If TV 117*b* changes his request to channel 118, then the Subscriber Optical Interface 140 must know to re-tune the circuitry handling channel 193, to channel 118.

But it must not change the setting of circuitry handling channel 256, which is going to another TV. There are at least two ways to do this. First, it is possible and desirable to give each remote control hand-held unit 103 a unique identifier similar to a MAC address that is well known to those skilled in the art. This ties the program being viewed to the corresponding remote control hand-held unit 103. The other possibility is to give each control interface 108 a unique identification and associate the program with it. However, in some cases the control interface 108 may be a passive device (see FIGS. 10A-10B), in which case this doesn't work.

Assigning a unique identifier to the control interface 108 has some advantages. The program being watched can be associated with the control interface 108. The control interface, being connected in the coaxial cable between the Subscriber Optical Interface 140 and the TV, stays with that TV. However, it is possible for a subscriber to carry the remote control hand-held unit 103 from one TV to another.

If identification is associated with the control interface 108, then as the subscriber carries the same remote control handheld unit 103 from one room to another, the Subscriber Optical Interface 140 should know how to tune the TV in that room. Furthermore, since it is aware of the TV the remote control hand-held unit 103 is being used with, the Subscriber Optical Interface 140 can send the remote control hand-held unit 103 the correct remote control code for that particular TV.

A MAC identifier was mentioned as an exemplary unique address. However, it is preferable to use a shorter number, in order to save transmission time. It is also possible to dynamically assign locally unique numbers to the remote control handheld unit 103 and/or to the control interface 108. This is done, for example, in IEEE 1394 communications links, as is understood by those skilled in the art. The only problem with doing so is that there is the potential for delays on the network while the network is organizing itself. (N.B. these sentences seem out of place, and are probably not necessary.) Another possibility is to use the same types of auto discovery mechanisms as are used in the Bluetooth protocol, again, understood by those skilled in the art.

The concept may be extended to serve TV picture-in-picture (PIP) services, and may serve VCRs by treating the VCR as a second TV at the same location as the first TV. The same remote control may be used to control other consumer appliances, such as a DVD player and an audio amplifier. These will not need to be controlled from the Subscriber Optical Interface 140, but in the interest of keeping the remote control hand-held unit 103 as simple as possible, the remote control codes for these other devices could be stored in the Subscriber Optical Interface 140 or in the data service hub 110, and the same protocol used to disseminate codes as that shown above.

According to an alternate exemplary embodiment, DVD and audio remote control codes can be stored in the remote control hand-held unit 103 as is done today, and not have the remote control hand-held unit 103 communicate with the Subscriber Optical Interface 140 when it is communicating with these other devices. Even then, the remote control codes may be stored in the Data Service Hub 110 and downloaded on demand. This will still have the advantage of allowing the subscriber perpetual access to the most up-to-date remote control code sets, while minimizing that data that must be stored in the remote control hand-held unit 103.

Television Tuning and Control Examples—Overview

Once a Subscriber Optical Interface 140 knows the makeup of devices connected to it, tuning and other functions proceed generally in the following manner. The subscriber presses a key, which keystroke is relayed to the Subscriber Optical Interface 140. The processor 550 in the Subscriber Optical Interface 140 makes a decision as to what to do with the keystroke and sets the Subscriber Optical Interface 140 up to accommodate what the subscriber is asking for. It also sends back to the remote control hand-held unit 103 instructions for what to tell the TV to do.

Methods for Tuning a Television with the SOI 140 and Remote Control 103

The processes and operations described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

Exemplary Method for Tuning a TV to an Analog Channel

Figure 12:
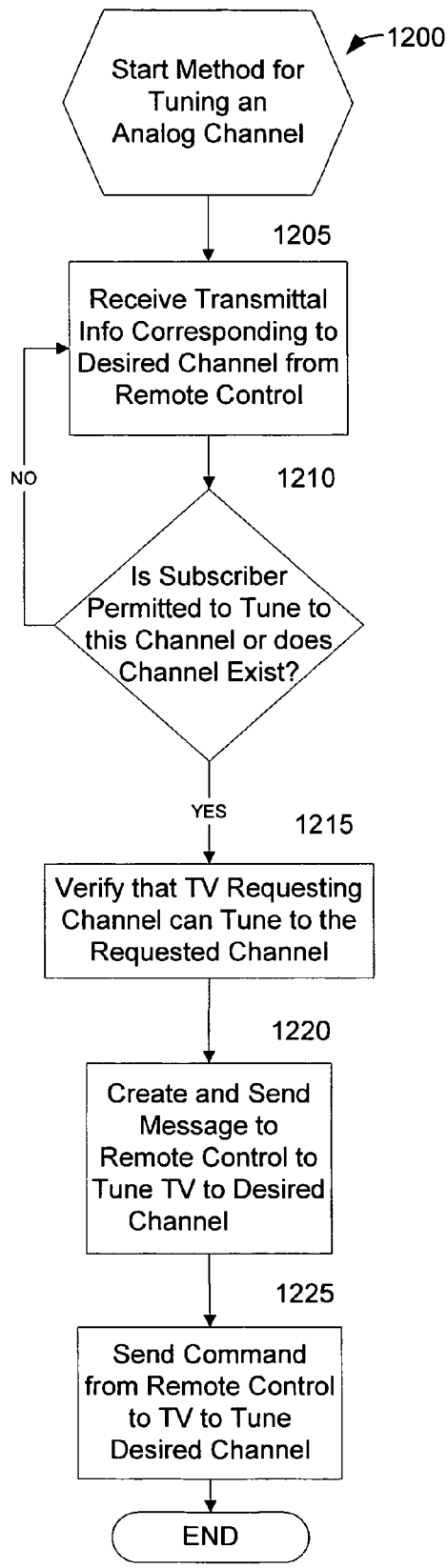
FIG. 12 is a logic flow diagram illustrating an exemplary method for tuning a television to an analog RF channel according to an exemplary embodiment of the present invention.

Referring now to FIG. 12, this Figure is a logic flow diagram illustrating an exemplary method 1200 for tuning a television to an analog RF channel according to an exemplary embodiment of the present invention. The steps of method 1200 generally correspond with a communication stream between control interfaces 108 and remote controls 103 illustrated in FIGS. 8A-11A.

Step 1205 is the first step of method 1200 in which a transmission corresponding to a desired channel is received from a remote control 103. Step 1205 can correspond to the SOI 140 receiving a channel change request from the remote control 103 that can be received as an infrared transmission or an RF transmission or a transmission along any other like wireless medium, or along a wire-based medium.

Next in decision step 1210, it is determined if the subscriber is permitted to tune to the desired channel or if the desired channel exists for the services currently offered to the subscriber. This step can correspond to the SOI 140 determining what level of access a subscriber may have with respect to channels of a programming package. If the inquiry to decision step 1210 is negative, then the "No" branch is followed back to step 1205.

If the inquiry to decision step 1210 is positive, then the "Yes" branch is followed to step 1215 in which the SOI 140 can verify that the TV 117 requesting the channel is capable of tuning the requested or desired channel. In this step, the SOI can look up a TV's capabilities in table to verify this information. If the TV 117 can tune the desired channel, the process continues. Otherwise, the SOI 140 will have to tune for the TV. This alternative path is not shown, but is identical to the next example.

In step 1220, a message can be created and sent to the remote control 103 to tune the TV 117 to the desired channel. And in Step 1225, a command can be sent to the TV 117 from the remote control 217 to tune the TV 117 to the desired channel. The process then ends.

Exemplary Method for Tuning a TV to a Digital Channel

Figure 13:
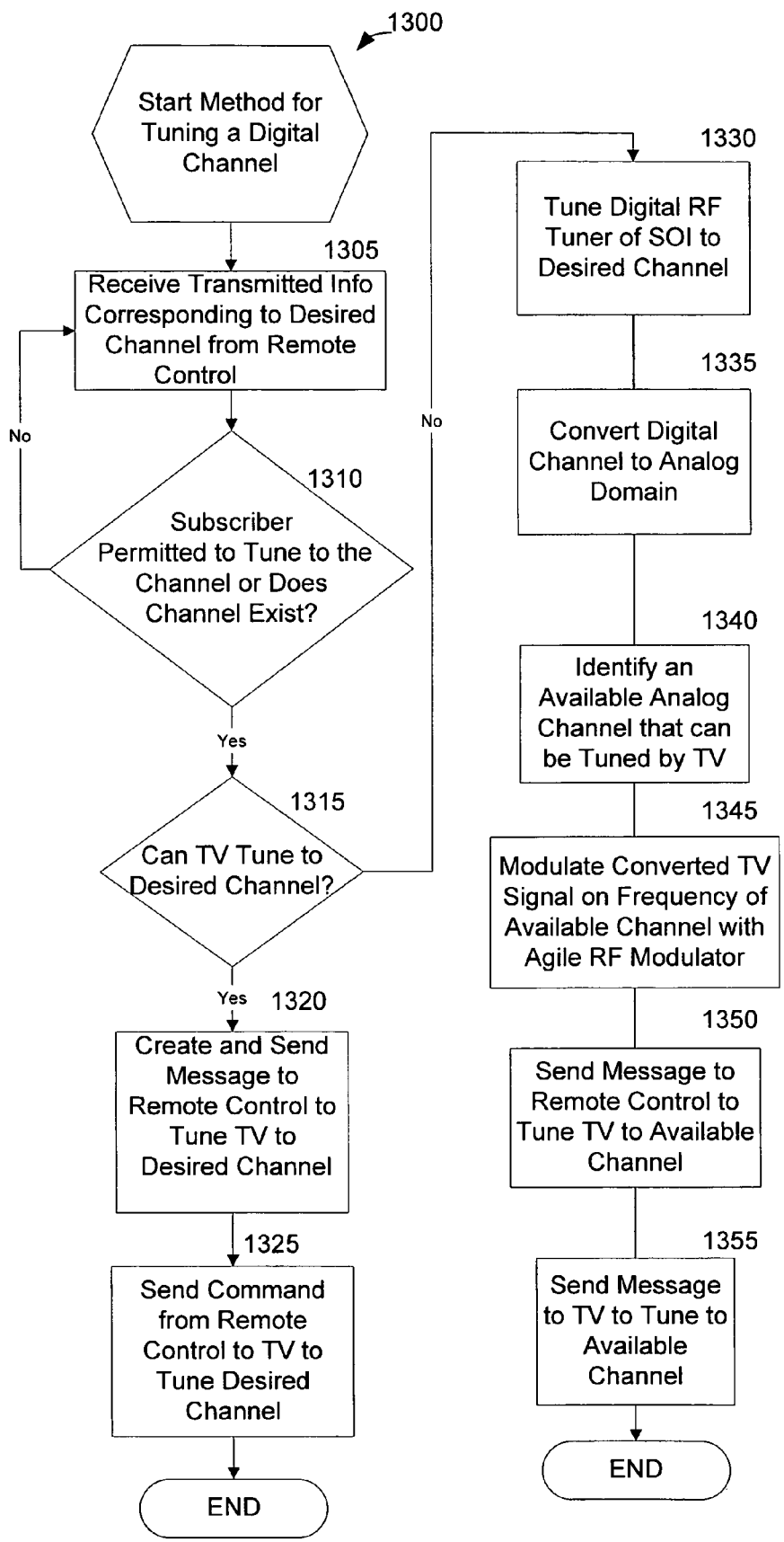
FIG. 13 is a logic flow diagram illustrating an exemplary method for tuning a television to a digital channel according to an exemplary embodiment of the present invention.

Referring now to FIG. 13, this Figure is a logic flow diagram illustrating an exemplary method 1300 for tuning a television 117 to a digital channel according to an exemplary embodiment of the present invention. The steps of method 1300 generally correspond with a communication stream between the control interfaces 108 and remote controls 103 illustrated in FIGS. 8A-11A.

Step 1305 is the first step of method 1300 in which transmitted information corresponding to a desired channel is received from a remote control 103 by an SOI 140. Step 1305 can correspond to the SOI 140 receiving a channel change request from the remote control 103 that can be received as an infrared transmission or an RF transmission or a transmission along any other like wireless medium, or along a wire-based medium.

Next in decision step 1310, it is determined if the subscriber is permitted to tune to the desired channel or if the desired channel exists for the services currently offered to the subscriber. This step can correspond to the SOI 140 determining what level of access a subscriber may have with respect to channels of a programming package. If the inquiry to decision step 1310 is negative, then the "No" branch is followed back to step 1305.

If the inquiry to decision step 1310 is positive, then the "Yes" branch is followed to decision step 1315 in which the SOI 140 can verify that the TV 117 requesting the channel is capable of tuning the requested or desired channel. In this decision step, the SOI 140 can look up a TV's capabilities in table to verify this information. For example, if a subscriber requested viewing of a digital channel, the SOI 140 can determine if the TV 117 is capable of tuning digital channels. If the TV 117 can tune the desired channel and the inquiry is positive, then the yes branch is followed to step 1320.

In step 1320, a message can be created and sent to the remote control 103 to tune the TV 117 to the desired channel. And in Step 1325, a command can be sent to the TV 117 from the remote control 217 to tune the TV 117 to the desired channel.

Meanwhile, if the inquiry to decision step 1315 is negative, the "No" branch is followed to step 1330 in which a digital RF tuner 704 in the SOI is tuned to the desired channel. Next, in step 1335, the digital channel is converted into the analog domain with a digital demodulator 706A.

And in Step 1340, an available channel that can be tuned by the TV 117 can be identified by the SOI. In this step, the SOI can check all the channels that are not being used, so that one of them can be used to send this signal to the TV available to a particular TV and determine which ones are not being used, so that one of them can be used to send this signal to the TV.

Next in step 1345, the converted channel can be modulated on a frequency of the available channel with an agile RF modulator 718.

In step 1350, a message can be created and sent to the remote control 103 to tune the TV 117 to the available channel. And in Step 1355, a command can be sent to the TV 117 from the remote control 217 to tune the TV 117 to the available channel. The process then ends.

Exemplary Method for Tuning a TV to an IP Program

Figure 14:
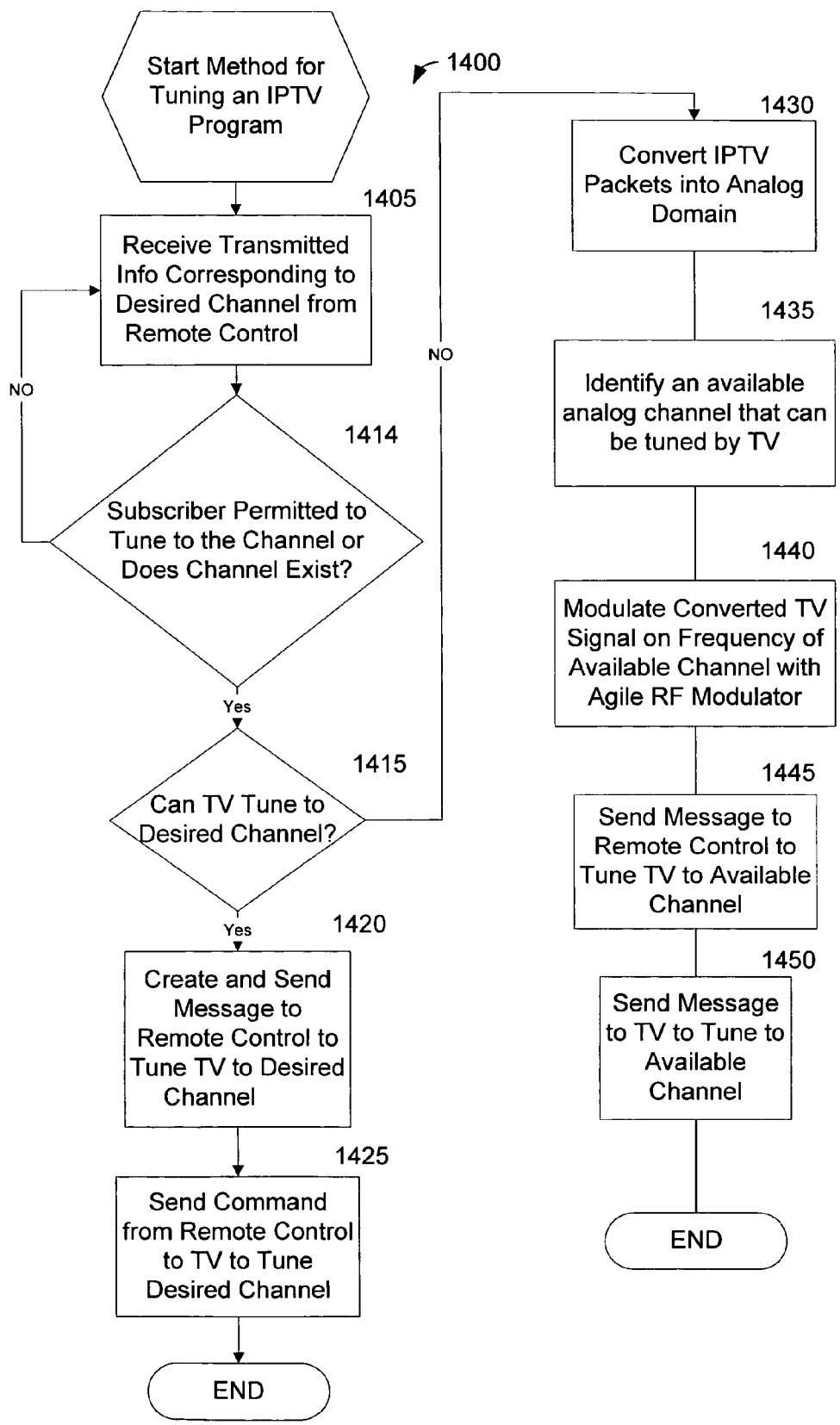
FIG. 14 is a logic flow diagram illustrating an exemplary method for tuning a television to an Internet Protocol formatted channel according to an exemplary embodiment of the present invention.

Referring now to FIG. 14, this Figure is a logic flow diagram illustrating an exemplary method 1400 for tuning a television to an Internet Protocol formatted channel according to an exemplary embodiment of the present invention. The steps of method 1400 generally correspond with a communication stream between the control interfaces 108 and remote controls 103 illustrated in FIGS. 8A-11A.

Step 1405 is the first step of method 1400 in which transmitted information corresponding to a desired channel is received from a remote control 103 by an SOI 140. Step 1405 can correspond to the SOI 140 receiving a channel change request from the remote control 103 that can be received as an infrared transmission or an RF transmission or a transmission along any other like wireless medium, or along a wire-based medium.

Next in decision step 1410, it is determined if the subscriber is permitted to tune to the desired channel or if the desired channel exists for the services currently offered to the subscriber. This step can correspond to the SOI 140 determining what level of access a subscriber may have with respect to channels of a programming package. If the inquiry to decision step 1410 is negative, then the "No" branch is followed back to step 1405.

If the inquiry to decision step 1410 is positive, then the "Yes" branch is followed to decision step 1415 in which the SOI 140 can verify that the TV 117 requesting the channel is capable of tuning the requested or desired channel. In this decision step, the SOI 140 can look up a TV's capabilities in table to verify this information. For example, if a subscriber requested viewing of a digital channel, the SOI 140 can determine if the TV 117 is capable of tuning digital channels. If the TV 117 can tune the desired channel and the inquiry is positive, then the yes branch is followed to step 1420.

In step 1420, a message can be created and sent to the remote control 103 to tune the TV 117 to the desired channel. And in Step 1425, a command can be sent to the TV 117 from the remote control 217 to tune the TV 117 to the desired channel.

Meanwhile, if the inquiry to decision step 1415 is negative, the "No" branch is followed to step 1430 in which a IPTV-MPEG TS converter 736 can convert the video packets into an MPEG transport stream that can be operated upon by the POD module 708. Switch S2 is thrown to the down position to couple the signal to the POD module.

And in Step 1435, an available channel that can be tuned by the TV 117 can be identified by the SOI 140. In this step, the SOI 140 can check all channels are not being used, so that one of them can be used to send this signal to the TV available to a particular TV 117 and determine which ones are not being used, so that one of them can be used to send this signal to the TV 117. Next in step 1440, the converted channel can be modulated on the frequency of the available channel with an agile RF modulator 718.

In step 1445, a message can be created and sent to the remote control 103 to tune the TV 117 to the available channel. And in Step 1450, a command can be sent to the TV 117 from the remote control 217 to tune the TV 117 to the available channel. The process then ends.

Exemplary Method for Displaying and Processing an Electronic Program Guide

Figure 15:
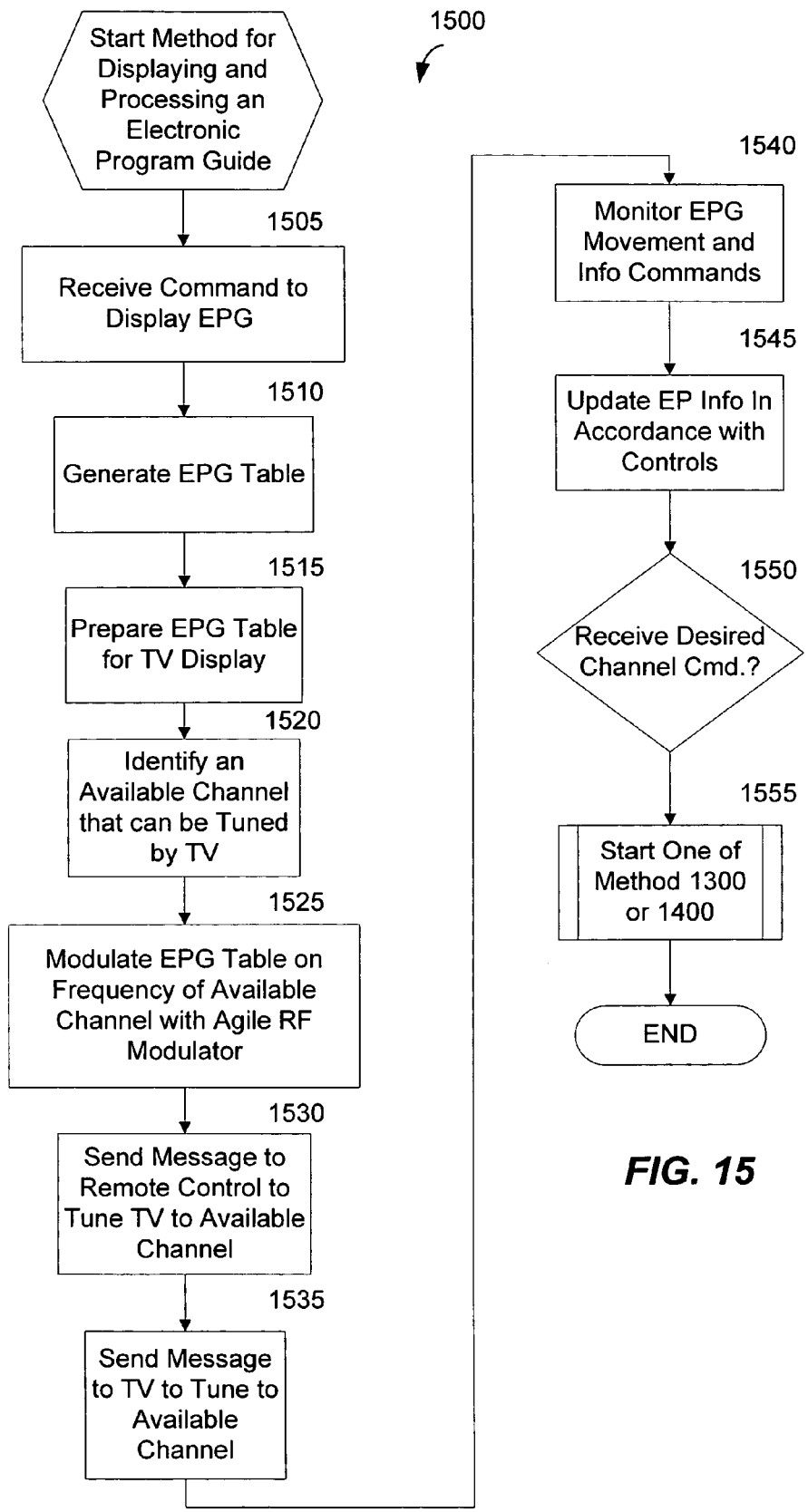
FIG. 15 is a logic flow diagram illustrating an exemplary method for tuning a television to an electronic program guide (EPG) according to an exemplary embodiment of the present invention.

Referring now to FIG. 15, this Figure is a logic flow diagram illustrating an exemplary method 1500 for tuning a television 117 to an electronic program guide (EPG) according to an exemplary embodiment of the present invention. The steps of method 1500 generally correspond with a communication stream between the control interfaces 108 and remote controls 103 illustrated in FIGS. 8A-11A.

Step 1505 is the first step of method 1500 in which an SOI 140 receives a command to display an electronic program guide (EPG) from a remote control 103. Next, in step 1510, the processor 550 of the SOI can generate an EPG table. In step 1515, the processor 550 can prepare the EPG for display by sending it to the multimedia processor 714A.

In step 1520, an available channel that can be tuned by the TV 117 can be identified by the SOI 140. In this step, the SOI 140 can check all channels available to a particular TV 117 and determine which ones are not being used, so that one of them can be used to send this signal to the TV 117. Next in step 1525, the EPG table can be modulated on a frequency of the available channel with the agile RF modulator 718.

In step 1530, a message can be created and sent to the remote control 103 to tune the TV 117 to the available channel. And in Step 1535, a command can be sent to the TV 117 from the remote control 217 to tune the TV 117 to the available channel.

In step 1540, movement and any commands received from the remote control 103 are monitored by the multimedia processor 714. In step 1545, as commands and control signals for the EPG are received, the EPG info can be updated in response to the commands and control signals by the multimedia processor 714 or processor 550.

In decision step 1550, the SOI determines if a channel has been selected. If the inquiry to decision step 1550 is negative, then the "No" branch is followed back to step 1545 in a loop. If the inquiry to decision step is positive, then the "Yes" branch is followed to routine 1555 that may comprise one of method 1200, 1300, and 1400 for tuning an analog channel, a digital channel, or an IP TV channel. After routine 1555, the process ends.

Exemplary Method for Displaying an Instant Replay on a Television 117

Figure 16:
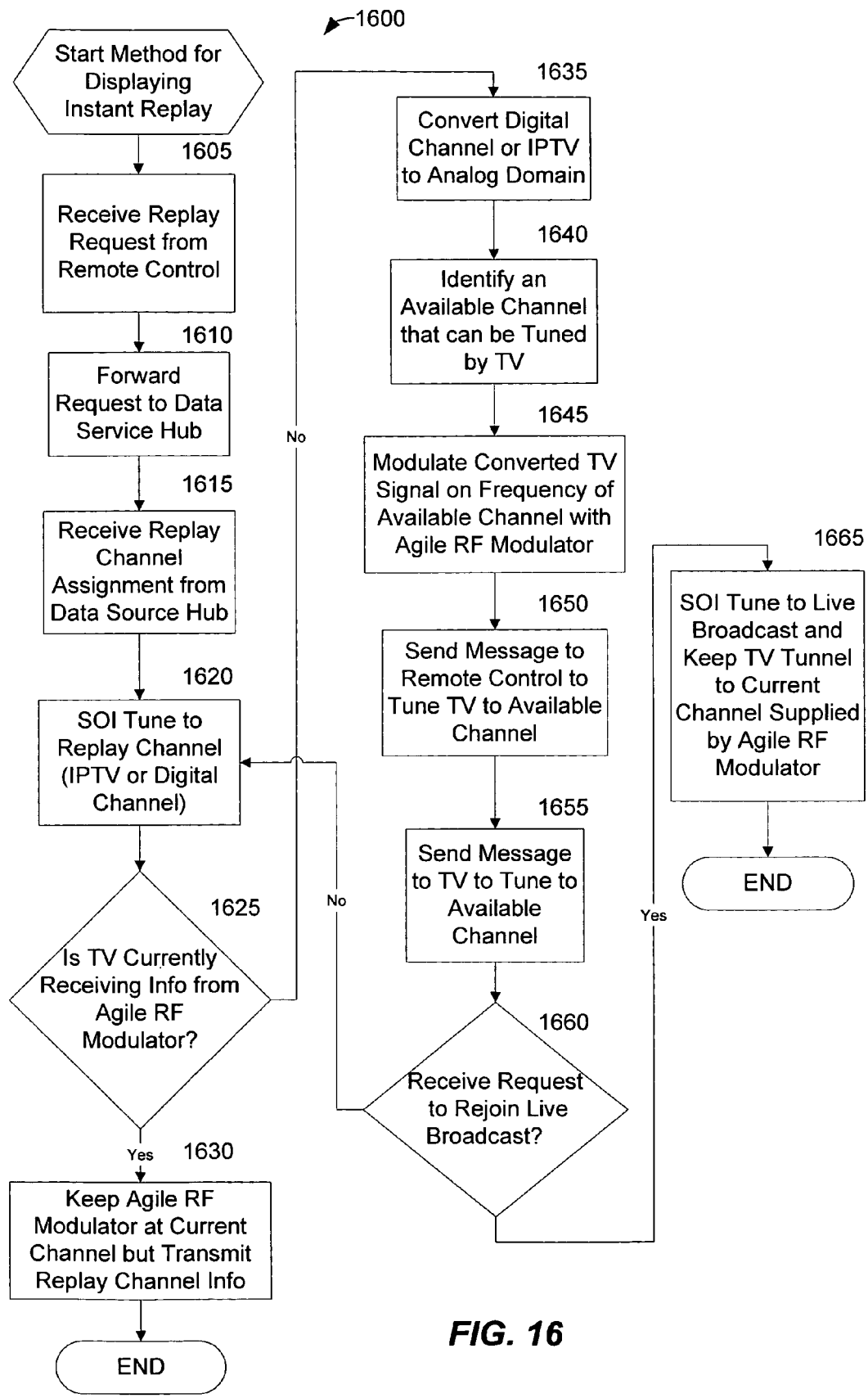
FIG. 16 is a logic flow diagram illustrating an exemplary method for displaying an instant replay according to an exemplary embodiment of the present invention.

Referring now to FIG. 16, this Figure is a logic flow diagram illustrating an exemplary method 1600 for displaying an instant replay according to an exemplary embodiment of the present invention. This Figure generally corresponds with communications between a subscriber optical interface 140, a remote control 103, and a data service hub 110.

Step 1605 is the first step of method 1600 in which an a replay request is received by the SOI 140 from a remote control 103. Next, in step 1610, the SOI 140 forwards this request to the data service hub 110 which comprises a central personal video recorder. Next, in step 1615, the data service hub informs the SOI 140 of the replay channel assignment.

In step 1620, the SOI 140 tunes to the replay channel assigned by the data service hub 110. The replay channel could be a digital channel or it could be an IP TV channel. Next, in decision step 1625, the SOI 140 can determine if the TV is currently receiving programming from one of the agile RF modulators 718. If the inquiry to decision step 1625 is positive, then the "Yes" branch is followed to step 1630 in which the SOI 140 keeps the RF modulator 718 at the current channel but switches to the replay channel programming instead of sending the current programming.

If the inquiry to decision step 1625 is negative, the "No" branch is followed to step 1635 in which the SOI converts the digital replay channel or IPTV replay channel into the optical domain. In step 1640, an available channel that can be tuned by the TV 117 can be identified by the SOI 140. In this step, the SOI 140 can check all channels available to a particular TV 117 and determine which ones are not being used, so that one of them can be used to send this signal to the TV 117.

Next in step 1645, the converted channel can be modulated on a frequency of the available channel with an agile RF modulator 718. In step 1650, a message can be created and sent to the remote control 103 to tune the TV 117 to the available channel. And in Step 1655, a command can be sent to the TV 117 from the remote control 217 to tune the TV 117 to the available channel.

In decision step 1660, the SOI 140 determines if a request to rejoin the live broadcast has been received from the remote control 103. If the inquiry to decision step 1620 is negative, then "No" branch is followed back to step 1620. If the inquiry to decision step 1660 is positive, then the "Yes" branch is followed to step 1665. In step 1665, the SOI 140 tunes the RF tuner 704A to the live broadcast and keeps the TV 117 tuned to the current channel supplied by the agile RF modulator 718. In this way, the SOI 140 can prevent or substantially reduce any programming delays associated with returning to the live broadcast.

Exemplary Method for Displaying a Recorded Program on a Television 117

Figure 17:
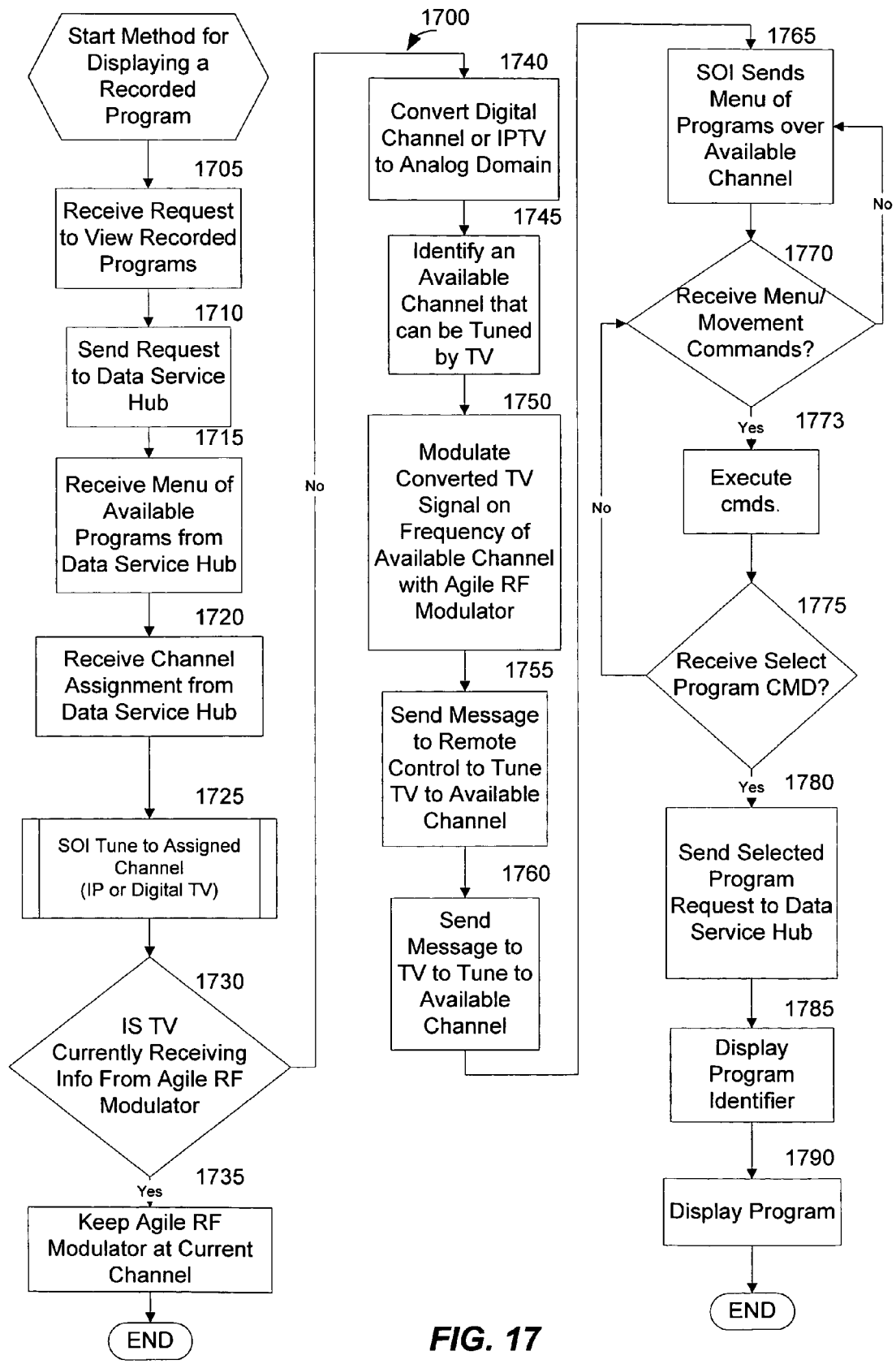
FIG. 17 is a logic flow diagram illustrating an exemplary method for displaying a recorded program according to an exemplary embodiment of the present invention.

Referring now to FIG. 17, this Figure is a logic flow diagram illustrating an exemplary method 1700 for displaying a recorded program according to an exemplary embodiment of the present invention. This Figure generally corresponds with communications between a subscriber optical interface 140, a remote control 103, and a data service hub 110.

Step 1705 is the first step of method 1700 in which an a request to view available recorded programs is received by the SOI 140 from a remote control 103. Next, in step 1710, the SOI 140 forwards this request to the data service hub 110 which comprises a central video file server. Next, in step 1715, the data service hub 110 forwards to the SOI 140 a menu of available programs. In step 1720, the data service hub 110 sends to the SOI 140 a channel assignment for the replay of any programs selected.

In step 1725, the SOI 140 tunes to the replay channel assigned by the data service hub 110. The replay channel could be a digital channel or it could be an IP TV channel. Next, in decision step 1730, the SOI 140 can determine if the TV is currently receiving programming from one of the agile RF modulators 718. If the inquiry to decision step 1730 is positive, then the "Yes" branch is followed to step 1735 in which the SOI 140 keeps the RF modulator 718 at the current channel but switches to the replay channel programming instead of sending the current programming.

If the inquiry to decision step 1730 is negative, the "No" branch is followed to step 1740 in which the SOI converts the digital replay channel or IPTV replay channel into the optical domain. In step 1745, an available channel that can be tuned by the TV 117 can be identified by the SOI 140. In this step, the SOI 140 can check all channels available to a particular TV 117 and determine which ones are not being used, so that one of them can be used to send this signal to the TV 117.

Next in step 1750, the converted channel can be modulated on a frequency of the available channel with an agile RF modulator 718. In step 1755, a message can be created and sent to the remote control 103 to tune the TV 117 to the available channel. And in Step 1760, a command can be sent to the TV 117 from the remote control 217 to tune the TV 117 to the available channel.

In Step 1765, the SOI sends the menu of programs over the available channel. In decision step 1770, the SOI 140 determines if any menu movement commands have been received from the remote control 103. If the inquiry to decision step 1770 is negative, the "No" branch is followed back to step 1765. If the inquiry to decision step 1770 is positive, then the menu is changed in accordance with the movement commands and the process continues to decision step 1775.

In decision step 1775, the SOI 140 determines if the select program command has been received from the remote control 103. If the inquiry to decision step 1775 is negative, the "No" branch is followed back to step 1770. If the inquiry to decision step 1775 is positive, then the process continues to step 1780 in which the data service hub 110 starts transmitting to the SOI 140 the selected recorded program.

In step 1785, the SOI 140 displays a program identifier with the multimedia processor 714. In step 1790, The SOI continues to allow the display of the recorded program to the subscriber. The process then ends.

Networked Personal Video Recorder Exemplary Embodiment

Figure 18A:
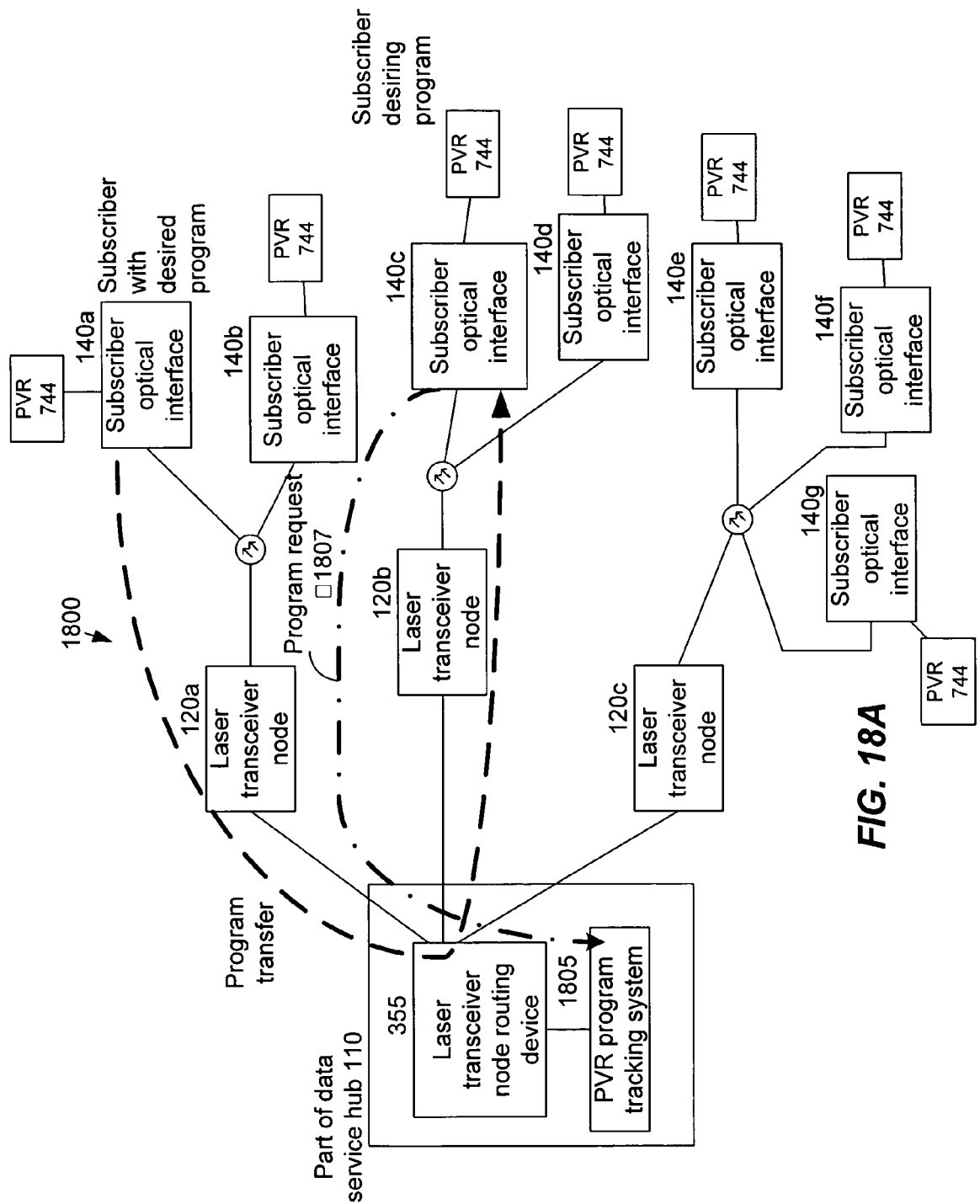
FIG. 18A is a functional block diagram illustrating a how personal video recorders contained within subscriber optical interfaces may be networked according to a one exemplary embodiment of the present invention.

Referring now to FIG. 18A, this Figure is a functional block diagram illustrating how personal video recorders 744 contained within subscriber optical interfaces 140 may be networked according to a one exemplary embodiment of the present invention. Subscriber optical interfaces 140a through 140g are located on different subscribers' homes. They are supplied service via laser transceiver nodes 120a through 120c, and each (or some portion) of them can have built-in PVRs 744. Among other connections, the laser transceiver nodes 120 are all connected to the laser transceiver node routing device 355 in the data service hub 110. Also connected to the laser transceiver node routing device 355 is a PVR program tracking system 1805, located in the data service hub. The purpose of the PVR program tracking system 1805 is to keep track of the program(s) that are stored on each PVR 744 in the various Subscriber Optical Interfaces 140.

When any PVR 744 in any Subscriber Optical Interface 140 records a program, it reports that recording to the PVR program tracking system 1805. When a program is deleted from a PVR 744, this deletion is also reported to the PVR program tracking system 1805. Thus, the PVR program tracking system 1805 always has an up-to-date database of all the programs recorded on all PVRs 744 in all Subscriber Optical Interfaces 140 in the system.

Suppose the subscriber served by Subscriber Optical Interface 140c wishes to watch a particular program that has already been broadcast. He sends a program request 1807 to the PVR program tracking system 1805, requesting a program guide of all available back programs. In the manner described above for accessing a network PVR (FIG. 17), the PVR tracking system 1805 supplies a program guide of its database, to Subscriber Optical Interface 140c, which then displays it for the subscriber. When the subscriber selects a program, a command is sent to the PVR 744 in Subscriber Optical Interface 140a to play out the program, sending it to the requestor.

In FIG. 18A, Subscriber Optical Interface 140c requests a program that is available at Subscriber Optical Interface 140a. Subscriber optical interface 140a sends the signal to Subscriber Optical Interface 140c via program transfer path 1804, which is nothing more than the normal data path available with the optical network of the present invention. Suitable protocols for setting up and managing the session, such as MGCP, are available and well known to those skilled in the art. Suitable encapsulation protocols for program transfer, such as those provided by RealVideo, Apple, and Microsoft, are also known to those skilled in the art.

Exemplary Method for Locating a Program Across Network PVRs 744

Figure 18B:
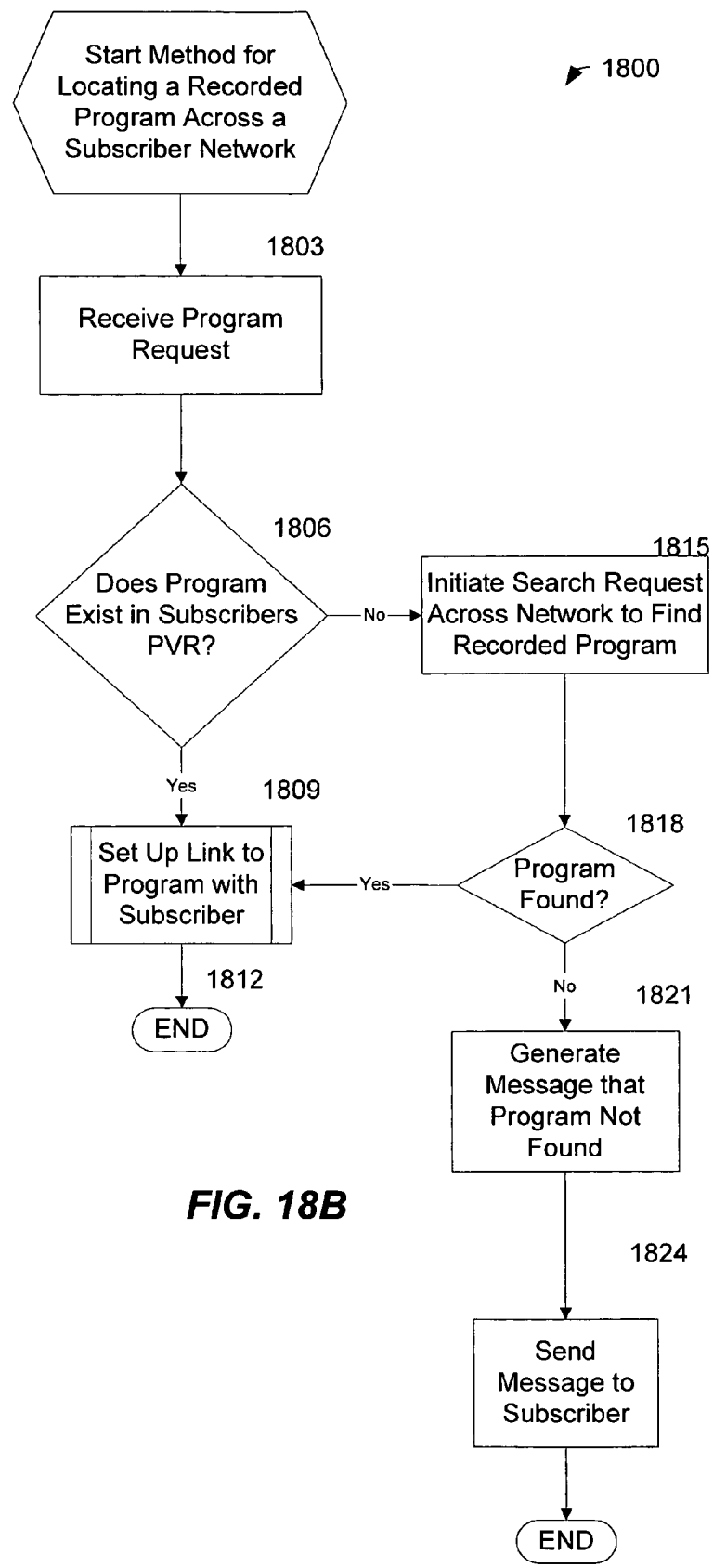
FIG. 18B is a logic flow diagram illustrating an exemplary method for locating a recorded program that may be stored on one or more personal video recorders according to an exemplary embodiment of the present invention.

Referring now to FIG. 18B, this Figure is a logic flow diagram illustrating an exemplary method 1800 for locating a recorded program that may be stored on one or more personal video recorders 744 within SOIs 140 according to an exemplary embodiment of the present invention. This method 1800 generally corresponds to communications that can occur between subscriber optical interfaces 140 and a data service hub 110.

Step 1803 is the first step of the method in which a subscriber requests his or her SOI 140 for a recorded program. In decision step 1806, the subscriber optical interface 140 determines if the program exists in the subscriber's own personal video recorder. If the inquiry to decision step 1806 is positive, then the "Yes" branch is followed to routine 1809 in which the SOI 140 sets up a link to the program for the subscriber so that the recorded program is played back to the subscriber. In step 1812, the process ends.

If the inquiry to decision step 1806 is negative, then the "No" branch is followed to step 1815 in which a search is initiated by the data service hub 110 of its database of PVRs 744. Next, in decision step 1818, it is determined if the program is found by the search. If the inquiry to decision step 1818 is positive, then the "Yes" branch is followed to step 1809 in which a link is set up between the program and the subscriber.

If the inquiry to decision step 1818 is negative, the "No" branch is followed to step 1821 in which a message is generated by the data service hub 110 that the program has not been found. In step 1824, messages are send to the subscriber and to the PVR having the program. The messages set up the communication between the subscribers, that enable the one subscriber to watch the program stored on the other subscriber's PVR. Then the process ends.

Exemplary S-Video Interface

Figure 19:
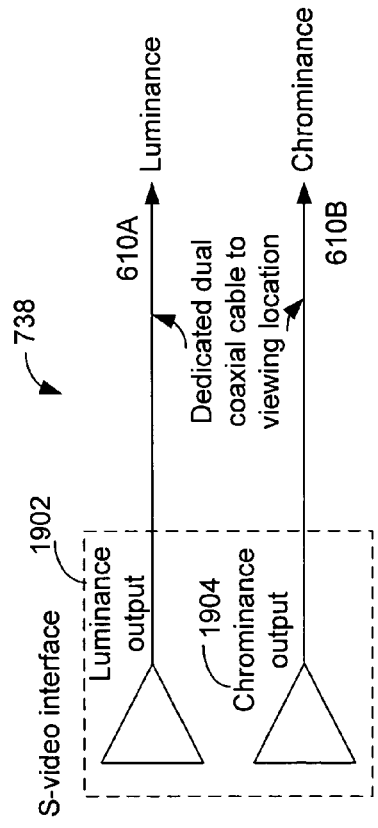
FIG. 19 is a functional block diagram illustrating an S-Video interface according to a one exemplary embodiment of the present invention.

Referring now to FIG. 19, this Figure is a functional block diagram illustrating an S-Video interface 738 according to a one exemplary embodiment of the present invention. An agile modulator 718 has been taught in this description as a way of getting video and audio signals to a TV from the subscriber optical interface 140. While this is satisfactory in many instances, there are times when it is not desirable.

For example, the quality of the picture delivered over such an interface is usually not satisfactory for home theater applications. The video signal is typically not good enough for large screens and surround sound audio cannot be delivered this way. Accordingly, advanced interfaces have been developed, which may be adapted for use in the instant invention. One of the more promising interfaces is illustrated in FIG. 19.

FIG. 19 illustrates an S-video interface 738 that is standard on many pieces of consumer video equipment. S-video is also called S-VHS because it was first developed as part of an improved VHS taping system. The S-video interface is well known to those skilled in the art, and is an improved analog interface using two coaxial cables, one to carry the luminance 1902, or black-and-white portion of the picture, and one to carry the chrominance 1904, or color, information.

The chrominance signal consists of two components modulated onto the same carrier in quadrature, as is understood by those skilled in the art. Normally the modulated chrominance is added to the luminance signal, such that luminance and chrominance signals occupy the same spectrum. This causes artifacts when the picture is recovered, such as rainbow patterns in small diagonal stripes in the picture. Much work has been done over the past half century to minimize these artifacts, and good success has been obtained. However, the best solution of all is to not mix the luminance and chrominance signals together, and this is what the S-video connection does.

FIG. 19 illustrates the standard S-video connection 738. It comprises two output amplifiers which drive signals onto two coaxial cables 610A and 610B. These must be dedicated cables, in the instant case from the Subscriber Optical Interface 140 to the TV 117. This can be made to work, but may in some cases require equalization of the cables to compensate for frequency-dependent loss. This is understood by those skilled in the art. One draw back with this approach is that it requires two new cables to be run from the Subscriber Optical Interface 140 to every place that the subscriber wants to take advantage of the improved quality of signal provided by the S-video interface.

Exemplary and Alternate S-Video Interface System 2000

Figure 20A:
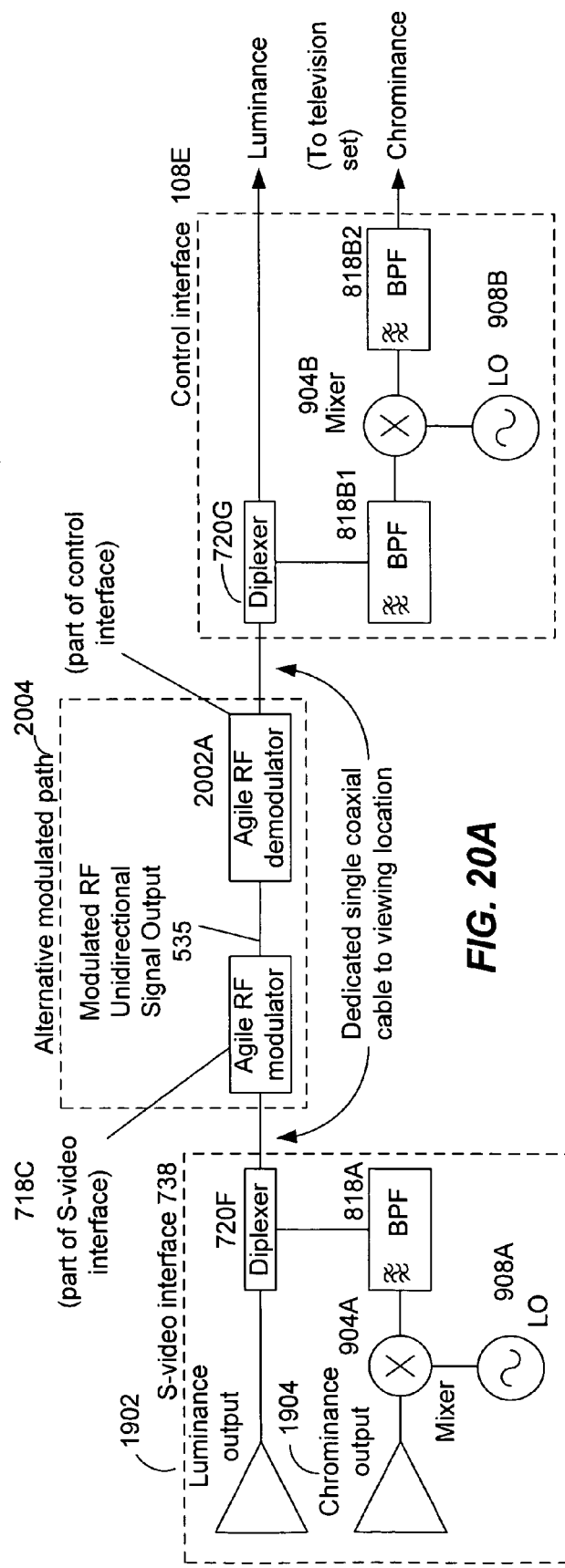
FIG. 20A is a functional block diagram illustrating an S-Video interface system comprising agile modulators positioned after diplexers and agile demodulators positioned before diplexers according to a one exemplary embodiment of the present invention.

FIG. 20A is a functional block diagram illustrating an S-Video interface system 2000 comprising agile modulators 718C positioned after diplexers 720F and agile demodulators 2002A positioned before diplexers 720G according to a one exemplary embodiment of the present invention. Specifically, FIG. 20A illustrates moving the chrominance subcarrier up to a higher frequency, then adding it to the luminance information. S-video interface 738 comprises the luminance output amplifier 1902 and the chrominance output amplifier 1904, as in FIG. 19.

Those skilled in the art recognize that the subcarrier frequency for the chrominance information in the NTSC television system used in North America, is approximately 3.58 MHz. Those skilled in the art also realize that the frequency of the luminance information extends from 30 Hz up to approximately 4.2 MHz. In mixer 904, the frequency of the chrominance subcarrier is mixed up to a higher frequency, such as 7.5 MHz. This can be done by operating local oscillator 908 at 3.58+7.5=11.08 MHz. The chrominance subcarrier is added to the luminance information in diplexer 720F.

The resulting signal is capable of being transported to the TV on a single coaxial cable 610. For the moment, ignore the alternative modulated path 2004. At the control interface 108, diplexer 720G separates the luminance signal from the chrominance signal, which was up converted to 1112 MHz in the exemplary case.

The luminance signal is supplied to the Luminance output 1904 (N.B., don't see 1904 on the drawing) and to the TV 117. The chrominance signal must be down converted to 3.58 MHz, which is accomplished in mixer 904. Local oscillator 908 must operate at the same frequency as does local oscillator 908. It is not necessary to phase lock the two oscillators 908 together, as the television system can tolerate a certain error in the subcarrier frequency.

The above may be used to transfer S-video signals from the Subscriber Optical Interface 140 to the TV 117 on a single dedicated coaxial cable 610. However, it is often more desirable to be able to use an existing coaxial cable network, such as RF signal line 610 and splitter 605. This avoids the need for adding more cable in the home.

Use of the existing network may be accomplished by using the alternative modulated path 2004. Alternative modulated path 2004 comprises an agile RF modulator 718C, which is very similar to agile RF modulator 718A,B of FIG. 11. The difference is that 718C must accommodate a much wider video bandwidth of up to approximately 10 MHz, as opposed to 802 MHz as is the case for RF modulator 718A,B in NTSC television systems.

The output of agile RF modulator 718C appears at modulated signal output 535, along with the other signals shown in FIG. 20A. Agile RF demodulator 2002A is located in control interface 108. It recovers the baseband signal at the control interface side. It's output is the same as the output of diplexer 720F.

Figure 20B:
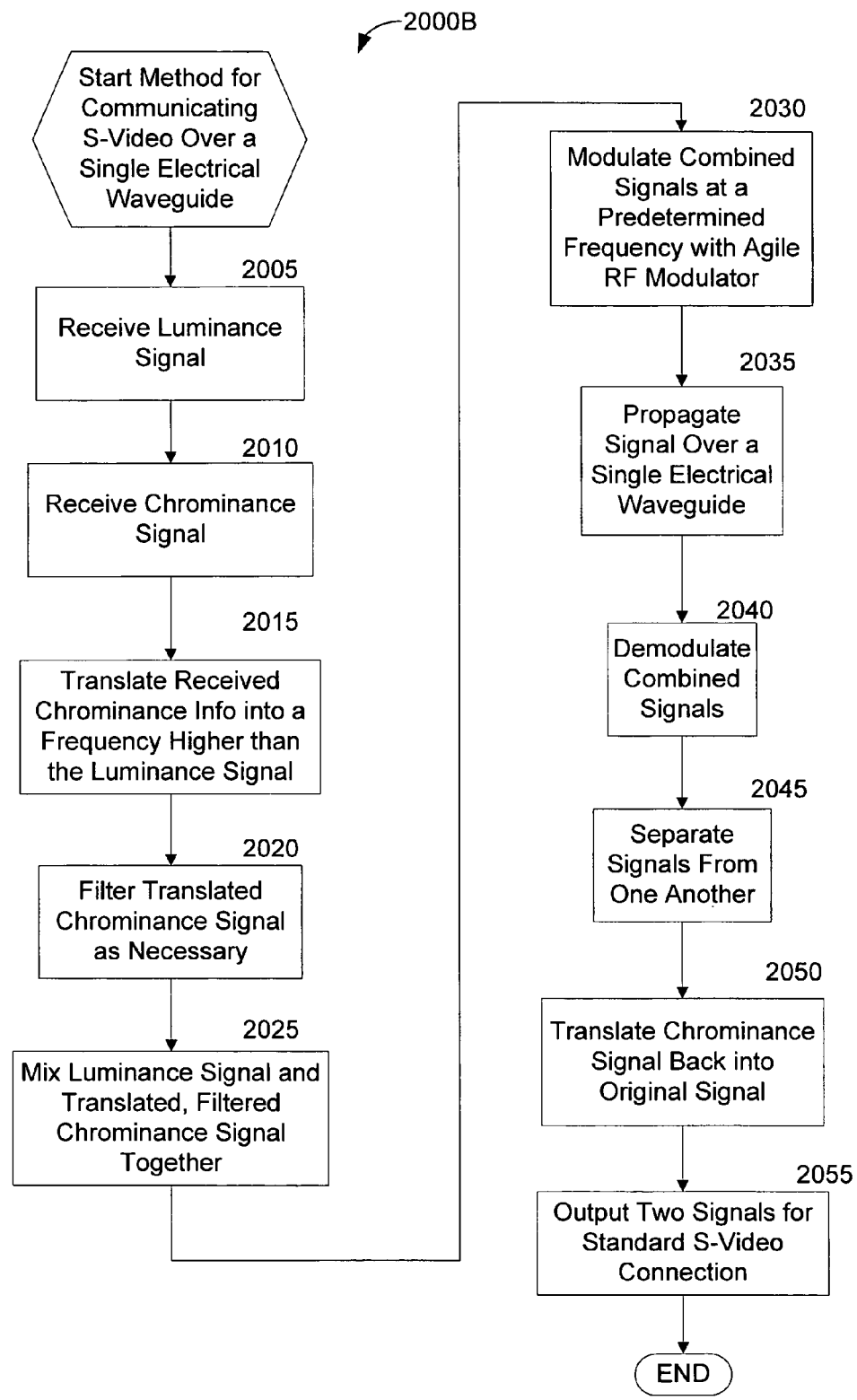
FIG. 20B is a logic flow diagram illustrating an exemplary method for communicating S-Video over a single electrical wave guide according to the exemplary embodiment illustrated in FIG. 20A.

FIG. 20B is a logic flow diagram illustrating an exemplary method 2000B for communicating S-Video over a single electrical wave guide according to an exemplary embodiment of the present invention. FIG. 20B generally corresponds to the hardware as illustrated in FIG. 20A.

Step 2005 is the first step in the process 2000B for communicating S-Video over a single electrical wave guide. In step 2005, a luminance signal is received. Generally, step 2005 corresponds to the luminance output 1902 as illustrated in the S-Video interface 738 of FIG. 20A.

Next, in step 2010, a chrominance signal is received. Step 2010 generally corresponds with the chrominance output 1904 of the S-Video interface 738 of FIG. 20A.

In step 2015, the received chrominance information or signal is translated into a frequency higher than the luminance signal. Step 2015 generally corresponds with the frequency conversion sub process carried out by the local oscillator 908A mixer 904A, and band pass filter 818A of the S-Video interface 738 of FIG. 20A.

In step 2020, the translated chrominance signal is filtered as necessary with a band pass filter 818A. In step 2025, the luminance signal and translated/filtered chrominance signal are mixed together in a diplexer 720F.

Next, in step 2030, the combined signals are modulated at a predetermined frequency with an agile radio frequency modulator 718C.

In step 2035, the combined modulated signal is propagated over a single electrical wave guide such as a single coaxial cable. Next, in step 2040 the modulated combined signals are demodulated with an agile RF demodulator 2002A. In step 2045, the luminance and chrominance signals are separated from one another with a diplexer 720G.

In step 2050, the chrominance signal is translated back into its original frequency domain by using the frequency conversion components of the control interface 108E. The control interface 108E has frequency conversion components that can include band pass filters 818B1, B2; a mixer 904B; and a local oscillator 908B. The signals are then outputted for a standard S-Video connection. The process then ends.

Figure 21A:
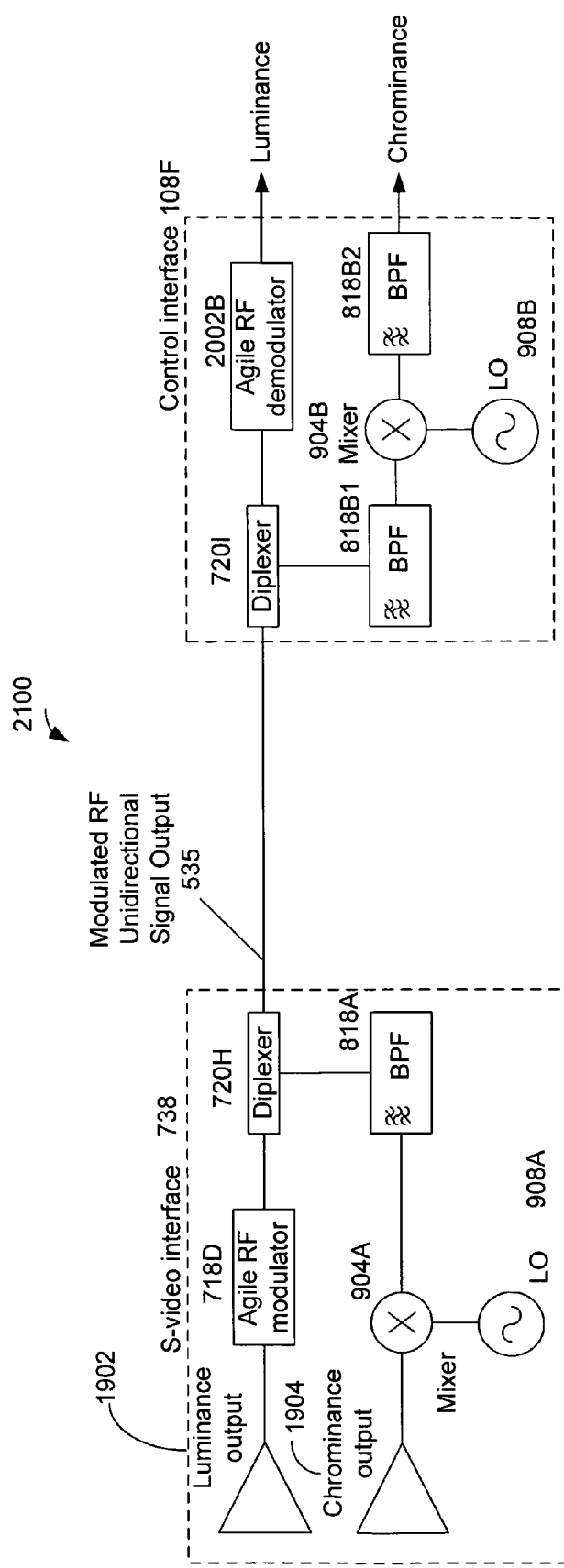
FIG. 21A is a functional block diagram illustrating an S-Video interface system comprising agile modulators positioned before diplexers and demodulators positioned after diplexers according to a one exemplary embodiment of the present invention.

Referring now to FIG. 21A, this Figure is a functional block diagram illustrating an S-Video interface system 2100 comprising agile modulators 718D positioned before diplexers 720H and agile demodulators 2002B positioned after diplexers according to a one exemplary embodiment of the present invention. FIG. 21A is similar to FIG. 20A except that the chrominance signal from chrominance output 1902 is not supplied to the agile RF modulator 718C. Rather, it is up converted directly to the frequency on which it will be sent over the cable. Compared with the solution of FIG. 20A, this reduces certain types of distortion between chrominance and luminance that can develop in the modulation and demodulation process, as is understood by those skilled in the art.

On the other hand, the exemplary embodiment of FIG. 21A makes the frequency tolerance between local oscillators 908 much more critical, necessitating some sort of frequency coordination between the two devices. This may be accomplished by leaking some of the LO 908 signal onto the cable and using it at the control interface 108 to reconstruct the local oscillator signal. Alternatively, a lower frequency signal may be transmitted on the cable to permit phase locking.

Besides the analog S-video connection, several digital interfaces are available for the Subscriber Optical Interface 140. These include but are not limited to, a DVI interface, a 1394 interface, and an Ethernet interface. All of these interfaces are known to those skilled in the art.

Figure 21B:
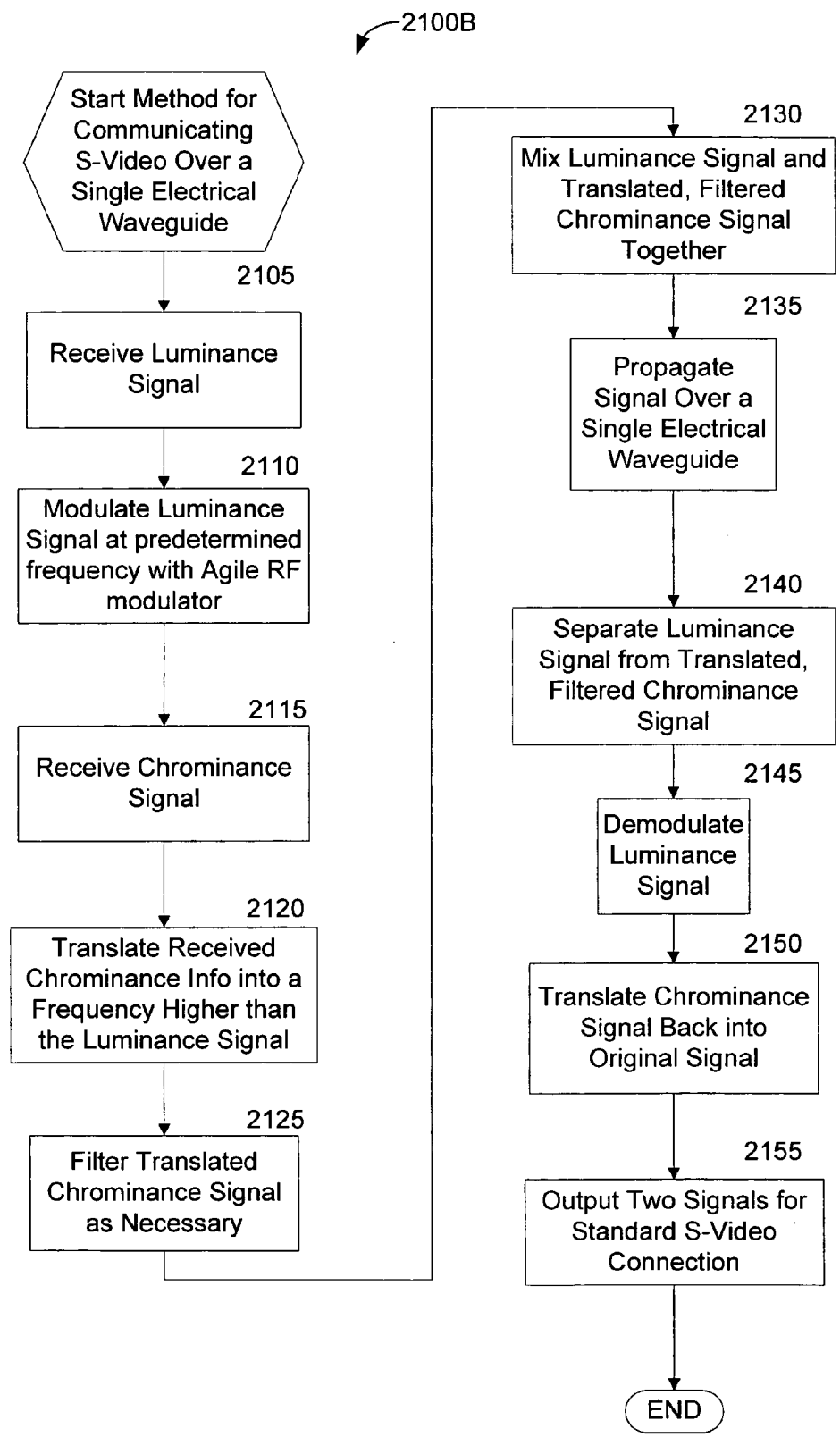
FIG. 21B is a logic flow diagram illustrating an exemplary method for communicating S-Video over a single electrical wave guide according to the exemplary embodiment illustrated in FIG. 21A.

Referring now to FIG. 21B, this Figure is a logic flow diagram illustrating an exemplary method 2100B for communicating S-Video over a single electrical wave guide. The method 2100B illustrated in FIG. 21B generally corresponds with the hardware illustrated in FIG. 21A.

Step 2105 is the first step in the process in which a luminance signal is received. Step 2105 generally corresponds with the luminance output 1902 of the S-Video interface 738 illustrated in FIG. 21A.

In step 2110, the luminance signal is modulated at a predetermined frequency with an agile RF modulator 718D.

Next, a chrominance signal is received. Step 2115 generally corresponds with the chrominance output 1904 of the S-Video interface 738 as illustrated in FIG. 21.

Next, in step 2120 the received chrominance information or signal is translated into a frequency higher than the luminance signal with a local oscillator 908A and a mixer 904A. In step 2125, the translated chrominance signal is filtered as necessary with a band pass filter 818A.

The modulated luminance signal and translated filtered chrominance signal are mixed together in an RF diplexer 720H.

In step 2135, the combined signals are propagated over a single electrical wave guide such as a coaxial cable. In step 2140, the luminance signal is separated from the translated filtered chrominance signal with an RF diplexer 7201. In step 2145, the luminance signal is demodulated with an agile RF demodulator 2002B.

Next, in step 2150, the chrominance signal is then translated back into its original frequency domain with band pass filters 818B1, B2; a mixer 904B; and a local oscillator 908B. The luminance and chrominance signals are then outputted for a standard S-Video connection. The process then ends.

DVI

DVI is a digital video interface originally developed for high quality computer monitors, but specified as an HDTV interface by the SCTE. It uses three balanced pair for data transmission and a fourth pair for clock. As such, it is not extremely appropriate for an interface unit mounted on the side of a house, but it might be used if distances are short enough. HDCP is the copy protection system designed to work with DVI. If a DVI interface is used, another audio interface is needed. The S/P DIF interface is suitable, and is well known to those skilled in the art.

IEEE 1394

1394 is a popular interface used for audio and video devices. It is suitable for use with either HDTV or SDTV (standard definition TV), and includes audio. DTCP is the copy protection protocol specified to be used with 1394 video. The -b version of the specification is shown in FIG. 7 because it is intended to go over long distances. The original and -a versions are intended for shorter distances, up to about 808 meters, and so may not be optimum for the instant application. Specification 1394b includes an optical interface, which is shown as item 430 in FIG. 7.

Ethernet Interface

Many homes are being wired with Ethernet cabling today. The data interface 560 (see FIG. 7) is an Ethernet interface in a preferred embodiment. It is possible to transmit video as part of the in-home data wiring, assuming a suitable outboard interface at the TV set. This is facilitated by multiplexing and format conditioning 746 of FIG. 7 above. This block as shown extracts the copy protected MPEG packets from the 1394 interface 742, removes the 1394 protocol, adds suitable IP and Ethernet protocols and interfaces the resultant video on IP (IPTV) signal to allow it to interface to the internal routing function 748. This internal routing function 748 is simply a low-end routing function used to allow data from the processor 550 to be merged with data from the multiplexing and format conditioning function 746, and both applied to the in-home data network by way of data interface 560.

In order to use the Ethernet interface it is necessary to provide a descrambling function at the TV, along the lines of those that must be used with the 1394 interface, and along with a converter that converts the IPTV signal on Ethernet back to 1394 format. This latter function does not exist in commercial form at the present time, but the standards exist to allow it to be built. The necessary standards are well known to those skilled in the art.

Wireless Interface

A wireless interface may be added for transmission of video as well as for two-way transmission of control information as taught above. Refer again to FIG. 11, which illustrates an RF antenna 1000 and an RF transceiver 1110 in the power supply housing 1116. This RF transceiver 1110 and antenna 1000 may be used to transmit video to the subscriber equipment using a variation of the multiplexing and format conditioning 746. IEEE 802.11 is one of several specifications that is capable, in its faster forms, of being able to transmit MPEG-compressed video to subscriber equipment. The video must be scrambled, such as with the DTCP algorithm 740. The location in the power supply for the transceiver and antenna 1110 and 1000 respectively, is good for wireless transmission of video as well as wireless transmission of control signaling.

Additional Services and Features with the SOI 140 and Remote Control 103

Referring briefly back to FIG. 11, new services can be provided by adding a microphone 1106 to the remote control hand-held unit 103. One new service allows the user to speak commands rather than pushing buttons.

According to one exemplary embodiment, the subscriber, rather than pressing buttons to bring up an electronic program guide (EPG), could ask for what he program that he wants to view: "Show me all the movies that start in the next 15 minutes." Many other phrases could be added, as is understood by those skilled in the art. Speech recognition has progressed significantly over the last few years, but still requires a relatively large amount of processing power, much more than that practical to put in a remote control hand-held unit 103.

So in the exemplary embodiment of FIG. 11, the remote control hand-held unit 103 can digitize the voice signal and relay it over the RF connection 1108A and 1108B, to the Subscriber Optical Interface 140 (by way of the power supply housing 1116 in the embodiment shown).

As it becomes practical, the processing power required for voice recognition may be located within the processor 550 in the Subscriber Optical Interface 140. However, sophisticated voice recognition may be too complex to be practical in the processor 550 today. In this case, the voice signal may be returned to the data service hub 110, where a larger computer may process the signals and send appropriate instructions back to processor 550 in the Subscriber Optical Interface 140, which in turn implements the subscriber's request.

By way of example, suppose the subscriber requested a listing of all the movies starting in the next 15 minutes, as mentioned above. The data service hub 110 computer consults its master program guide and extracts all the programs matching the request. It sends the titles and possibly a small graphic for each, to processor 550 in the Subscriber Optical Interface 140. The processor instructs the TV to tune to an available channel, and loads the program information received from the data service hub 110 into the corresponding multimedia processor 714. The process is similar to that taught in FIG. 15 for EPG searching.

As the subscriber moves through a grid showing all movies starting in the next 15 minutes, the processor 550 follows what the subscriber is doing by highlighting the appropriate grid square. When the subscriber selects a movie, the processor 550 consults a table it received from the data service hub 110, which associates the program with tuning instructions. It can then set up tuning as described above, depending on how the program is delivered (analog broadcast, digital broadcast, IP, or other).

Two-way Voice Communication Via Remote Control Hand-Held Unit 103

A loudspeaker or earphone 1104 may also be added to the remote control hand-held unit 103, enabling two-way voice communications. This may be used for computer-generated voice messages to the subscriber. It may also be used to incorporate a cordless telephone in the remote control hand-held unit 103. This function integrates nicely with the telephone input/output functions 555 shown in FIG. 11. A keypad can be used for dialing, and a voice recognition system can be used to allow for voice dialing, as is available in crude form on some cellular telephones today.

Having processing at the data service hub 110 would allow more sophisticated dialing instructions, such as "call Mary at home, but if she doesn't answer, try her office then her cell phone. Give me a visual indication on the TV when she answers." The subscriber can continue watching TV, but will be notified by a message on the TV when Mary is located.

Yet another application of the loudspeaker or headphone 1104 may be to serve a hard-of-hearing viewer. The headphone can be set to capture audio from the program being tuned by the Subscriber Optical Interface 140, amplifying it for someone who is having difficulty hearing the program. When the signal is processed for this application, the Subscriber Optical Interface 140 may process the audio to compress the dynamic range and to increase the response at higher voice frequencies (around 2-5 kHz), which is known to make voice easier to understand by those with hearing impairments.

Another exemplary embodiment can incorporate voice descriptions of video scenes in the video signal sent from the data service hub 110. The voice description may be sent to earphone 15.7, allowing a visually-impaired subscriber to hear the description without disturbing people in the room who have normal vision.

Display on Remote Control Hand-Held Unit 103

According to another exemplary embodiment, the remote control hand-held unit 103 can include an alphanumeric display 1102, using any of a number of technologies known to those skilled in the art. The alphanumeric display 1102 can be used to communicate additional information to the subscriber, and in some instances can be used in place of TV 117 for simple messages. For example, it is popular to provide music programming on cable TV systems. It is known to transmit title, track and artist (TTA) information with each song. The TTA information may be displayed on the TV, but it could also be displayed on the remote control hand-held unit 103 alphanumeric display.

The display may also be used for additional information related to a TV program. For example, the display 1102 may be used for closed captioning information. It is known to transmit closed captioning information to hearing-impaired viewers, for display on the TV screen. This is the purpose of VBI decoder 710 in FIG. 7. Rather than sending the captioning information to the TV, where it might interfere with the enjoyment of non-hearing impaired viewers, the captioning information may be sent to the remote control hand-held unit 103, where it can be read by the one who needs it.

The display 1102 can be used to display supplemental information about a show if that information is transmitted, and it may be used to provide information regarding advertisements seen on TV. Perhaps a more popular application would be to use it to display caller ID information if someone calls. If the alphanumeric display 1102 is also a graphic display, it may be used to transmit actual video information or still pictures, to supplement what is shown on the TV.

Furthermore, the display 1102 can be useful in coaching a subscriber through the initial stages of setting up a hand-held remote control unit to work with a particular TV. This can be done by putting instructions on the display 1102 rather than on the TV.

Targeted Advertising Insertion

It is desired by some operators to be able to place targeted advertising in programs, aimed at individuals in a particular demographic group. For instance, it is known that some demographic groups prefer one flavor of ice cream, while other demographic groups prefer another. Advertising targeted at a particular group is more valuable to an advertiser than is one advertisement which appeals to a small percentage of the viewers. The instant system may be used to effect targeted advertising.

To use the system for targeted advertising, the demographics of the subscriber are determined using techniques known to those skilled in the art. This information is stored at the data service hub 110, and when a program using targeted advertising is transmitted, advertising aimed at the correct demographic may be downloaded and switched into the signal, almost without the subscriber being aware of the switch. At the appropriate time in the program, a signal is sent to processor 550, informing it of the time to switch to the commercial and telling it where to get the commercial. It then causes the switch to take place, for example, at the multimedia processor 714B if the signal is being handled by it, and if the commercial is stored on the PVR 744.

The commercial may be downloaded in advance via IPTV (Internet Protocol TV, via the digital optical receiver 540) and saved to the PVR 744. Alternatively the commercial may be delivered via IPTV in real time, being delivered via IPTV to MPEG TS converter 736, in which case switching takes place at S2. Finally, the commercial may be delivered over a separate program stream in the broadcast video, or it may be delivered in a different program stream. In either case, it is handled via RF tuner 704B and digital demodulator 706 or the equivalent.

Door Camera Display and Door Control

Signals can be sent from a door camera to either a TV set or a special purpose video display for the purpose of allowing a home occupant to see who is at the door, and also to send signals to the door to unlock it. This may be accomplished using the instant invention with the remote control handheld unit 103, preferably configured as shown in FIG. 11 above. Some functions may be accomplished with a simpler remote control handheld unit 103.

Home/Office Event Manager

Figure 22A:
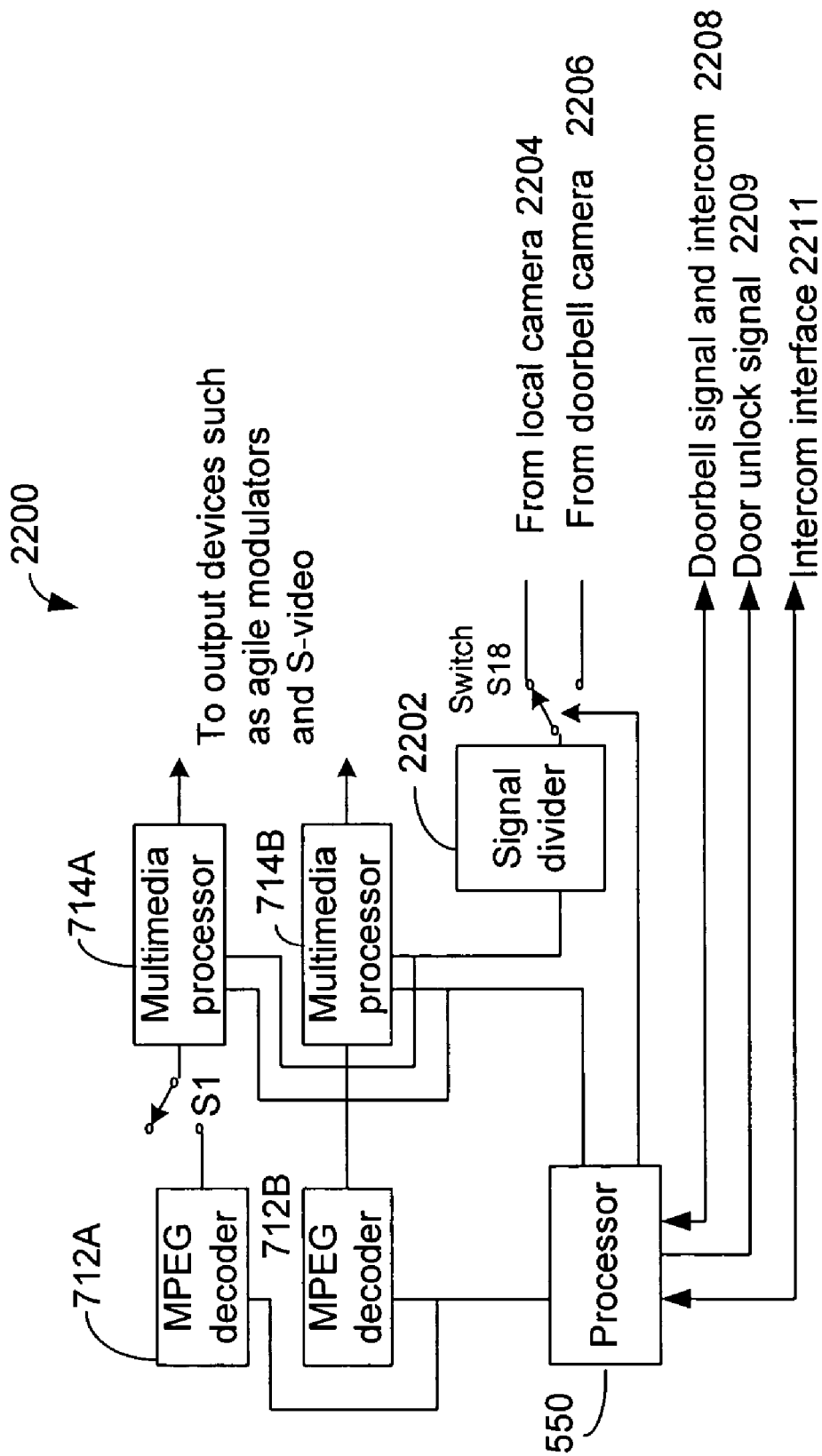
FIG. 22A is a functional block diagram illustrating additional components such as door bells, cameras, intercoms, and doors that can be controlled with the SOI according to one exemplary embodiment of the present invention.

FIG. 22A is a functional block diagram illustrating additional components such as door bells, cameras, intercoms, and doors that can be controlled with the SOI 140 according to one exemplary embodiment of the present invention. Specifically, local cameras can be used to monitor areas such as a swimming pool and a nursery, as well as doors. These local cameras 2204, 2206, etc., may be brought to the subscriber optical interface 140, where the multimedia processor (or the MPEG decoder 712, depending on detailed design) may place the camera picture on the video being sent to one or more TVs 117. The video may be switched to a full-screen, or it may be presented as a small picture inside a larger picture (picture-in-picture, or PIP). PIP is a known feature to incorporate in TV sets 117.

Switch S18 can select a signal to display on one or more TVs 117. The switch is under the control of processor 550. Processor 550 gets its commands from one of several places. The remote control handheld unit 103 may relay a command from the subscriber to put a picture from one of several cameras on the screen. Alternatively, if the doorbell rings, a doorbell signal 2208 may be applied to the processor 550, which will cause it to put the picture from the doorbell camera 2206 on all TVs 117 in use.

Preferably this is done as a PIP, so that the subscriber may continue to watch his program while seeing who is at the door. Signal divider 2202 is used to divide the signal among a plurality of multimedia processors 714A,B that would need to process the selected picture. This signal divider is known to those skilled in the art.

An intercom interface 2211 may be provided so that the remote control handheld unit 117, when configured with a loudspeaker or earphone 1104 and a microphone 1106 as in FIG. 11, can be used as part of an intercom system.

The subscriber optical interface 140 may also be used to supply caller identification information on the TV screen 117, possibly in an expanded form. Caller ID is a known function provided by telephone companies, whereby a signal is sent to the subscriber with the number of the calling party, when the telephone rings. It is known to transfer the caller ID information to telephones connected to the telephone input/output 555 of FIG. 11. However, it is also possible in the instant invention, to display the caller ID information, either the phone number or the name of the calling party, on TV screens or the alphanumeric display 1102 of FIG. 11. Processor 550 can extract caller ID information from the downstream data, and if necessary, looks up the name of the calling party locally. It can then send the information to the TVs 117 by way of multimedia processor 714.

Alternatively, the data service hub 110 may send caller ID information separately on the data path (receiver 540 and transmitter 530), with instructions to display the information on the screen 117. This removes another storage function from the subscriber optical interface 140.

Figure 22B:
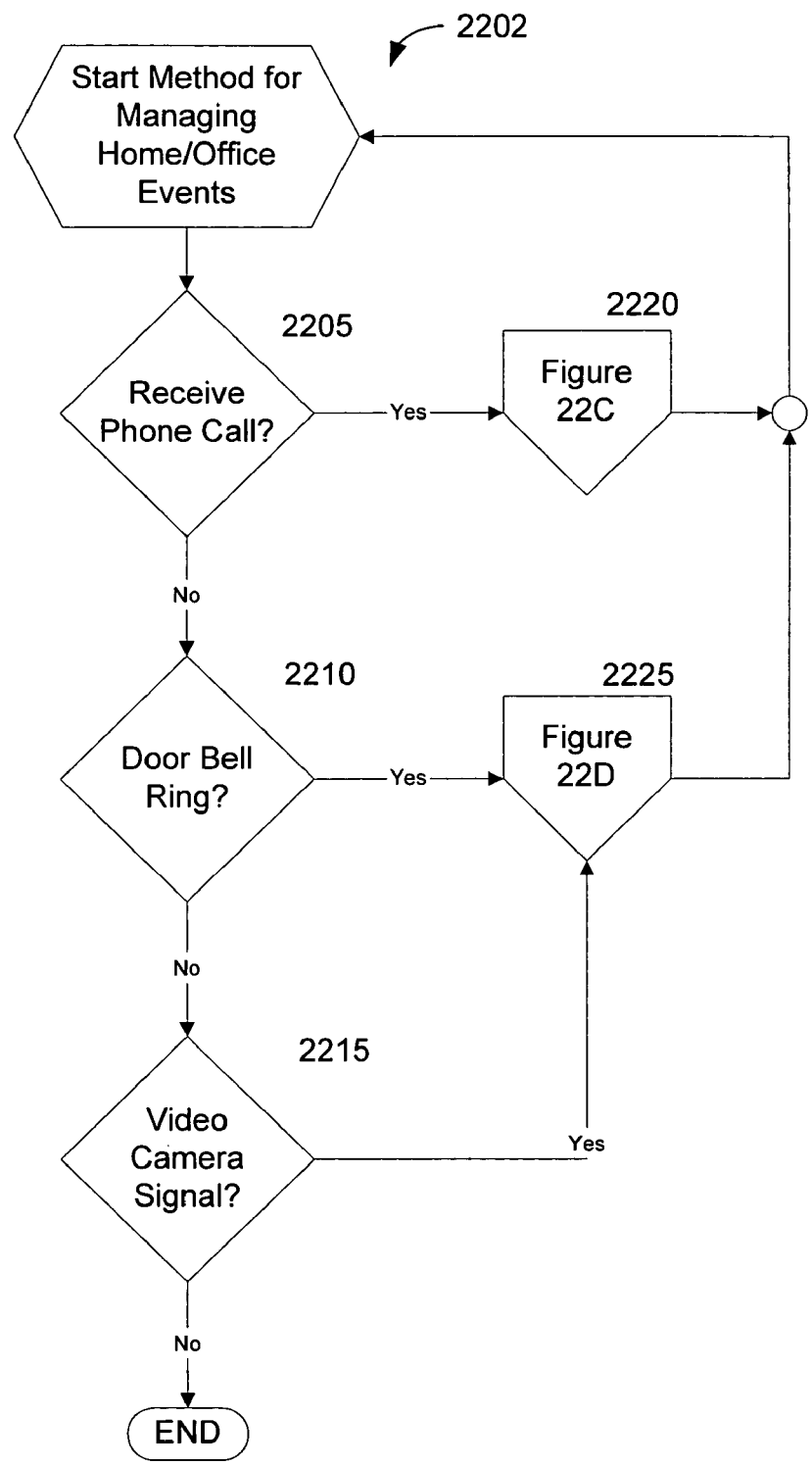
FIG. 22B is a logic flow diagram illustrating an exemplary method for managing home or office events according to one exemplary embodiment of the present invention.

Referring now to FIG. 22B, this Figure is a logic flow diagram illustrating an exemplary method 2202 for managing home or office events. The process 2202 illustrated in FIG. 22B generally corresponds with the functionality and processes performed by the hardware or software (or both) of the processor 550 and multimedia processors 714 as illustrated in FIG. 22.

Figure 22C:
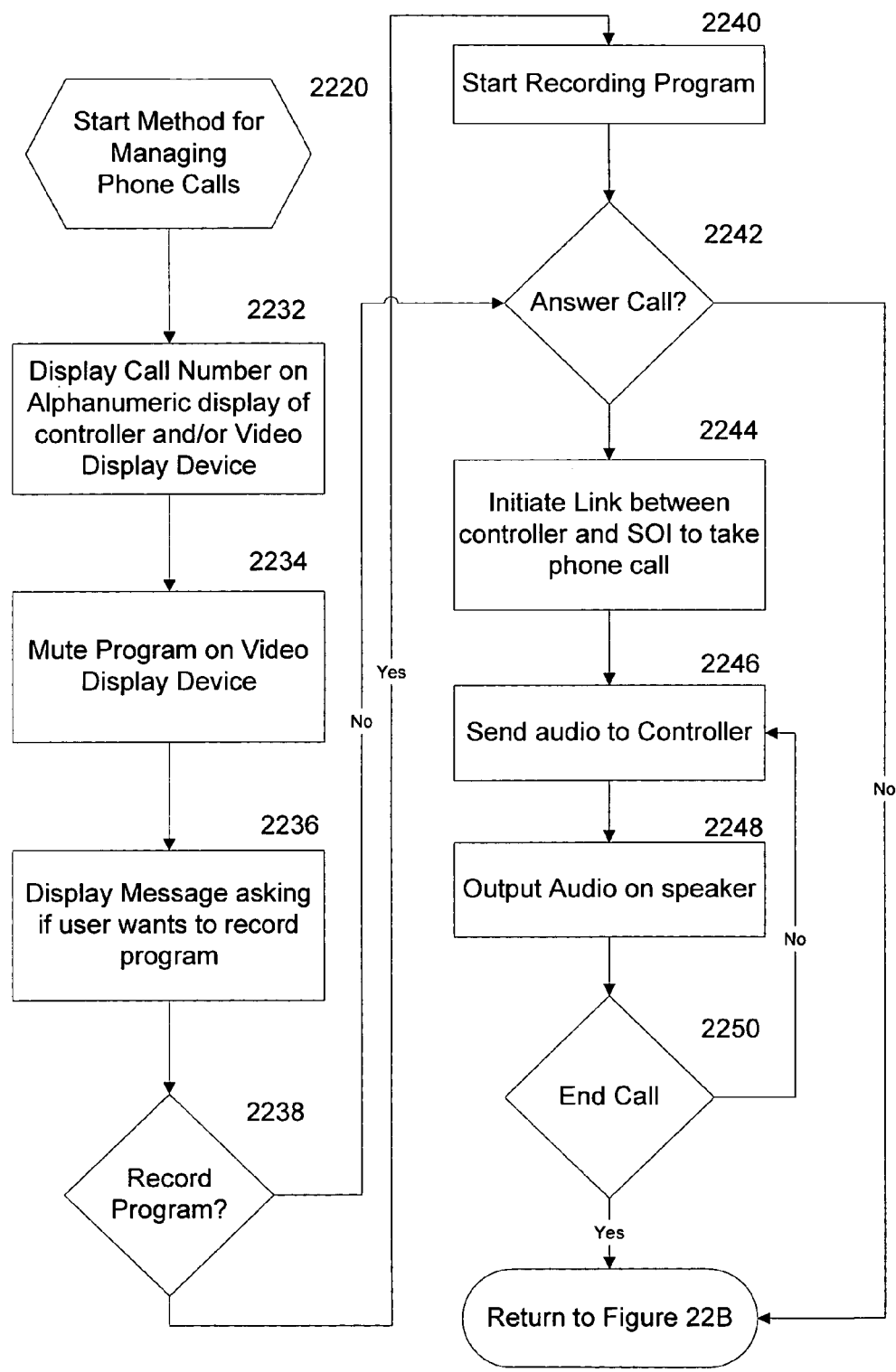
FIG. 22C is a functional block diagram illustrating a sub-method or routine for managing phone calls that corresponds to the method illustrated in FIG. 22B.

Decision step 2205 is the first step of the process 2202 in which it is determined whether a phone call has been received. If the inquiry to decision step 2205 is positive, then the "yes" branch is followed to step 2220 in which the process continues onto a sub routine or sub process as illustrated in FIG. 22C.

If the inquiry to decision step 2205 is negative, then the "no" branch is followed to decision step 2210. In decision step 2210, it is determined whether a door bell has been rung. If the inquiry to decision step 2210 is positive, then the "yes" branch is followed to step 2225 in which the process proceeds to a sub routine or sub process illustrated in FIG. 22D.

If the inquiry to decision step 2210 is negative, then the "no" branch is followed to decision step 2215 in which it is determined whether a signal has been received by a video camera. In other words, in decision step 2215 it is determined whether any video cameras attached to the subscriber optical interface are detecting signals in which a response may be needed from a user who is viewing programming with the present invention.

Figure 22D:
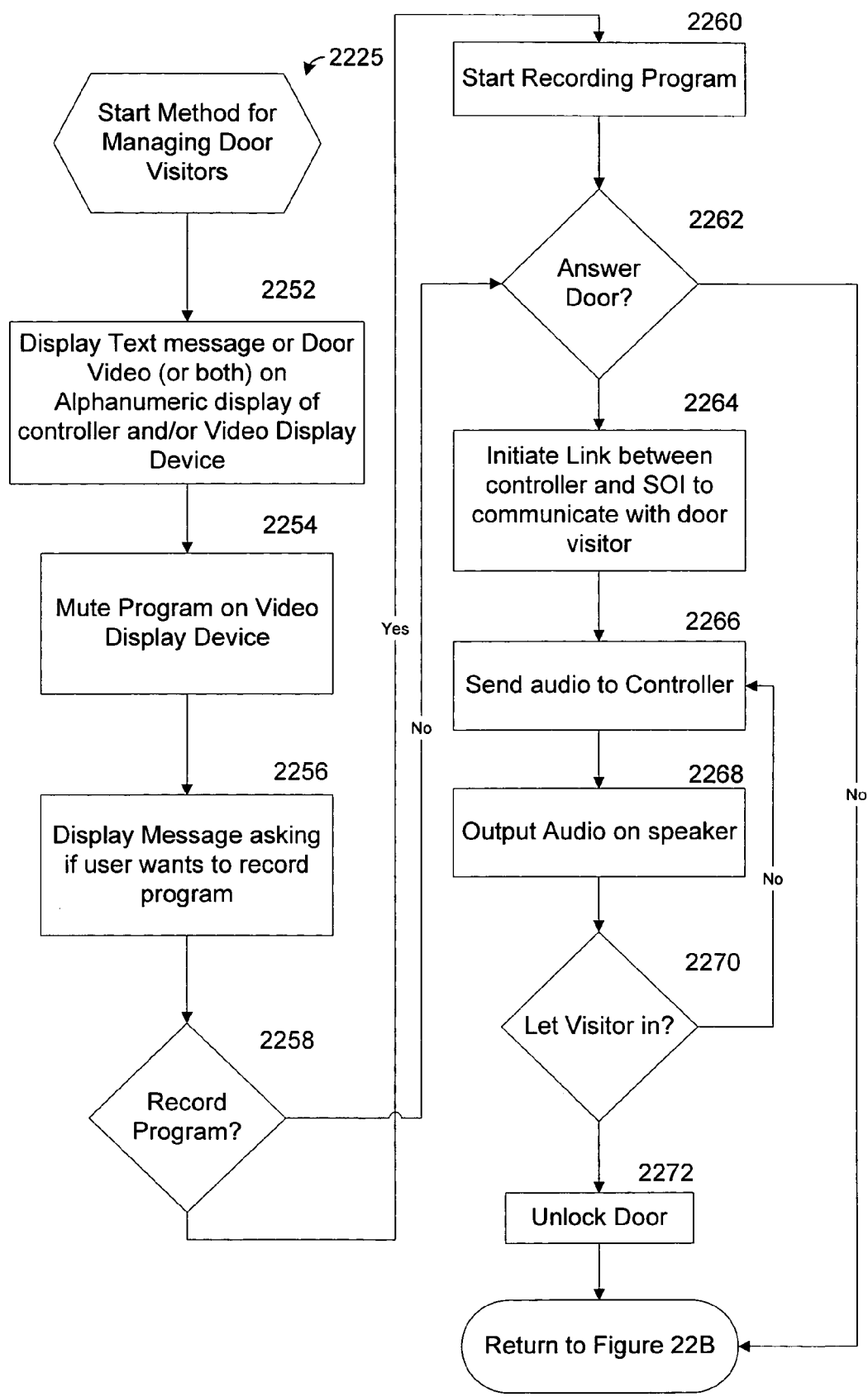
FIG. 22D is a logic flow diagram illustrating an exemplary sub-method or routine for managing door visitors that corresponds to the method illustrated in FIG. 22B.

If the inquiry to decision step 2215 is positive, then the "yes" branch is followed to step 2225. In step 2225, the process continues to a sub process or routine as illustrated in FIG. 22D. If the inquiry to decision step 2215 is negative, then the "no" branch is followed in which the process then ends.

Referring to FIG. 22C, this Figure is a functional block diagram illustrating a sub method or routine 2220 for managing phone calls that corresponds to routine 2220 as illustrated in FIG. 22B. FIG. 22C generally corresponds with the processor 550 and multimedia processor 714 illustrated in FIG. 22.

Step 2232 is the first step of process 2220 in which a call number is displayed on the alphanumeric display 1102 of the remote control 103C and/or a video display device such as a television set 117. In step 2234, the program on the video display device can be muted so that the audio portion of the program is not provided to the video display device 117. Alternatively, the remote control 103C can be requested by the subscriber optical interface 140 to initiate a command to order the television set 117 to initiate a mute option that may already be available from the television set 117.

In step 2236, a message is displayed on the video display device 117 asking if the user wants to record the program currently being viewed. Step 2236 generally corresponds to a multimedia processor 714 producing text on the video display device 117 in accordance with commands from the processor 550 that has received or is aware of a phone call made to a subscriber's premises.

In decision step 2238, it is determined whether a user wants to record the current program being viewed. If the inquiry to decision step 2238 is positive, then the "yes" branch is followed to step 2240 in which the program being viewed is recorded. Step 2240 can correspond with the processor 550 issuing a command to a personal video recorder 744 that may be present within the subscriber optical interface 140 or a personal video recorder system present at the data service hub 110.

If the inquiry to decision step 2238 is negative, then the "no" branch is followed to decision step 2242. In decision step 2242, it is determined whether the user desires to answer the call. If the inquiry to decision step 2242 is negative, then the "no" branch is followed to the end of the sub process in which the entire process returns to FIG. 22B. If the inquiry to decision step 2242 is positive, the "yes" branch is followed to step 2244 in which a link is initiated between the remote controller 103C and the subscriber optical interface 140 in order to take the phone call.

In step 2246, audio from the phone call is forwarded to the remote controller 103C. In step 2248, the audio sent to the remote controller 103C is outputted on a speaker such as speaker 1104 as illustrated in FIG. 11.

In step 2250, it is determined whether a user desires to end the call. The inquiry to decision step 2250 is negative, then the "no" branch is followed back to step 2246. If the inquiry to decision step 2250 is positive, then the "yes" branch is followed to the end of sub process 2220 in which the entire process returns to FIG. 22B.

Referring now to FIG. 22D, this Figure is a logic flow diagram illustrating an exemplary method 2225 for managing door visitors. FIG. 22D generally corresponds with routine 2225 as illustrated in FIG. 22B and discussed above.

Step 2252 is the first step in the process 2230 in which a text message or video from a camera that is monitoring a door is displayed on the alphanumeric display 1102 of the remote controller 103C or the video display device such as the television set 117 (or both). In step 2254, the program being displayed on the video display device such as television set 117 can be muted. According to one exemplary embodiment, the program can be muted by the processor 550 by lowering the volume of the audio signal being sent to the television set 117.

Alternatively, the processor 550 can issue an instruction to the remote controller 103C to command the television set to initiate its own muting function that may already exist in the video display device 117. In step 2256, a message asking if the user wants to record the program can be displayed on the video display device such as the television set 117. Step 2256 generally corresponds with the processor 550 and the multimedia processor 714 of the subscriber optical interface 140. The multimedia processor 714 can generate the text that may be received from the processor 550 which forms the message content.

Next, in decision step 2258, it is determined whether the user wants to record the program currently being viewed. If the inquiry to decision step 2258 is positive, then the "yes" branch is followed to step 2260 in which the program being viewed is recorded. Step 2260 can generally correspond to the processor 550 generating a command to a personal video recorder 744 that may be part of the subscriber optical interface 140.

Alternatively, the processor 550 can generate a command or message or a request for a personal video recorder system present at the data server hub 110 to initiate recording of the current program being viewed by the subscriber. If the inquiry to decision step 2258 is negative, then the "no" branch is followed to decision step 2262. In decision step 2262, it is determined whether the user desires to answer the door. If the inquiry to decision step 2262 is negative, then the "no" branch is followed to the end of the sub process 2230 in which the entire process returns to FIG. 22B.

If the inquiry to decision step 2262 is positive, then the "yes" branch is followed to step 2264 in which a link between the controller 103C and the subscriber optical interface 140 is initiated in order to communicate with the visitor at the door.

In step 2266, audio from the door is sent to the remote controller 103C. This audio is then output on a speaker 1104 as illustrated in FIG. 11 of the remote controller 103C.

Next, in decision step 2270, it is determined whether a user desires to let the visitor at the door into the subscriber's premises. If the inquiry to decision step 2270 is negative, then the "no" branch is followed back to step 2266. If the inquiry to decision step 2270 is positive, then the "yes" branch is followed to step 2272 in which the door corresponding to the visitor is unlocked. Step 2272 generally corresponds to the processor 550 issuing a command along the door unlock signal line 2209 to activate or deactivate locks at a door. The sub process then ends and the entire process returns to FIG. 22B.

It should be understood that the foregoing relates only to illustrative embodiments of the present invention, and that numerous changes may be made therein without departing from the spirit and scope of the invention as defined by the following claims

What is claimed is:

1. A method for formatting programming for a television coupled to an optical network comprising:

receiving an optical signal from the optical network comprising digital and analog programming with a subscriber optical interface contained within a first housing;

converting the optical signal into an electrical domain with the subscriber optical interface;

receiving a wireless request with a control interface from a wireless remote controller, the control interface contained within a second housing separate from the first housing;

converting the wireless request into an electrical domain with a wireless receiver that is part of the control interface, the wireless request being formed into an electrical request;

relaying the electrical request from the control interface in the electrical domain over an electrical waveguide to the subscriber optical interface;

receiving the electrical request from the control interface with the subscriber optical interface to tune the television to a first channel contained within the electrical domain of the converted optical signal;

processing the electrical request from the control interface with the subscriber optical interface; and instructing the remote controller with the subscriber optical interface via the control interface to tune to a second channel comprising programming of the first channel.

2. The method of claim 1, further comprising converting the first channel into the second channel.

3. The method of claim 1, wherein receiving the wireless request from the remote controller further comprises receiving and converting an infrared signal comprising the request.

4. The method of claim 1, wherein receiving the wireless request from the remote controller further comprises receiving and converting a wireless radio frequency signal comprising the request.

5. A method for formatting programming for a television coupled to an optical network comprising:

with a subscriber optical interface, receiving an optical signal from the optical network through an optical waveguide comprising digital and analog programming, the subscriber optical interface contained within a first housing;

with a subscriber optical interface, converting the optical signal into the electrical domain;

propagating the electrical signal in a downstream direction over an electrical waveguide towards the television;

receiving a wireless request with a control interface to tune the television to a first channel present within the electrical domain of the converted optical signal, the control interface contained within a second housing separate from the first housing;

converting the wireless request with a wireless receiver which is part of the control interface to the electrical domain in a form of an upstream electrical radio-frequency signal;

with the control interface, propagating the upstream electrical radio-frequency signal over the electrical waveguide in an upstream direction to the subscriber optical interface;

upon receiving the upstream electrical radio-frequency signal from the electrical waveguide with the subscriber optical interface, determining with the subscriber optical interface if the television can tune to the first channel; and if the television cannot tune to the first channel, then with the subscriber optical interface performing the following:

converting the first channel to an analog frequency domain;

identifying a second channel within the analog frequency domain that is available to the television and is tunable by the television;

modulating the converted analog first channel onto a frequency of the identified second channel.

6. The method of claim 5, wherein receiving a request to tune the television to a first channel further comprises receiving a request from a remote controller to tune the television to the first channel.

7. The method of claim 5, wherein determining if the television can tune to the first channel further comprises scanning a database of television types.

8. The method of claim 5, further comprising identifying a capability for a particular type of television.

9. The method of claim 5, wherein converting the first channel to an analog frequency domain further comprises converting a digital television channel to an analog frequency domain.

10. The method of claim 5, wherein converting the first channel to an analog frequency domain further comprises converting internet protocol television signals into an analog frequency domain.

11. The method of claim 5, wherein identifying a second channel within the analog frequency domain that is available to the television further comprises scanning a database of channels available to the television and identifying an unused channel.

12. The method of claim 5, further comprising sending a message to a remote control to tune the television to the second channel.

13. The method of claim 5, further comprising sending a command to the television to tune to the second channel.

* * * * *